United States Patent
Limon et al.

(10) Patent No.: US 10,578,515 B2
(45) Date of Patent: Mar. 3, 2020

(54) APPARATUS, SYSTEM AND METHOD OF DETERMINING ONE OR MORE OPTICAL PARAMETERS OF A LENS

(71) Applicant: 6 OVER 6 VISION LTD., Kfar Saba (IL)

(72) Inventors: Ofer Limon, Kfar Saba (IL); Shahar Levy, Rishon Le Zion (IL); Alexander Zlotnik, Petah Tikva (IL); Maya Aviv, Tel Aviv (IL)

(73) Assignee: 6 OVER 6 VISION LTD., Kfar Saba (IL)

( * ) Notice: Subject to any disclaimer, the term of this patent is extended or adjusted under 35 U.S.C. 154(b) by 0 days.

(21) Appl. No.: 15/767,205

(22) PCT Filed: Jan. 23, 2017

(86) PCT No.: PCT/IB2017/050338
§ 371 (c)(1),
(2) Date: Apr. 10, 2018

(87) PCT Pub. No.: WO2017/125902
PCT Pub. Date: Jul. 27, 2017

(65) Prior Publication Data
US 2019/0072455 A1    Mar. 7, 2019

Related U.S. Application Data

(63) Continuation-in-part of application No. PCT/IB2016/052673, filed on May 10, 2016.
(Continued)

(51) Int. Cl.
*G01M 11/02*    (2006.01)
*G06K 9/00*    (2006.01)
*G02C 13/00*    (2006.01)

(52) U.S. Cl.
CPC .... *G01M 11/0207* (2013.01); *G01M 11/0221* (2013.01); *G01M 11/0235* (2013.01); *G06K 9/0061* (2013.01); *G02C 13/003* (2013.01)

(58) Field of Classification Search
CPC ............ G06K 9/0061; G01M 11/0214; G01M 11/0228; G01M 11/02; G01M 11/0235; G01M 11/0207; G02C 13/003; G01B 9/00
(Continued)

(56) References Cited

U.S. PATENT DOCUMENTS 3,880,525 A    4/1975  Johnson
4,070,115 A    1/1978  Humphrey
(Continued)

FOREIGN PATENT DOCUMENTS

CN    1410747    4/2003
CN    101561347    10/2009
(Continued)

OTHER PUBLICATIONS

International Preliminary Report on Patentability for PCT/IB2016/052672, dated Nov. 23, 2017, 6 pages.
(Continued)

*Primary Examiner* — Hoa Q Pham
(74) *Attorney, Agent, or Firm* — Shichrur & Co.

(57) ABSTRACT

Some demonstrative embodiments include apparatuses, systems and/or methods of determining one or more optical parameters of a lens of eyeglasses. For example, a product may include one or more tangible computer-readable non-transitory storage media including computer-executable instructions operable to, when executed by at least one computer processor, enable the at least one computer processor to process at least one captured image of at least one reflection of a flash on a lens of eyeglasses; and determine
(Continued)

one or more optical parameters of the lens based at least on the at least one captured image.

12 Claims, 36 Drawing Sheets

Related U.S. Application Data

(60) Provisional application No. 62/286,331, filed on Jan. 23, 2016, provisional application No. 62/286,330, filed on Jan. 23, 2016, provisional application No. 62/216,757, filed on Sep. 10, 2015, provisional application No. 62/159,295, filed on May 10, 2015.

(58) Field of Classification Search
USPC .................. 356/124–127; 351/205, 206, 246
See application file for complete search history.

(56) References Cited

U.S. PATENT DOCUMENTS

| | | | |
|---|---|---|---|
| 4,611,913 | A | 9/1986 | Sugino |
| 5,331,394 | A | 7/1994 | Shalon et al. |
| 5,396,324 | A | 3/1995 | Kurachi et al. |
| 5,855,074 | A | 1/1999 | Abitbol et al. |
| 5,971,537 | A | 10/1999 | Fukuma et al. |
| 5,973,772 | A | 10/1999 | Fukuma et al. |
| 6,061,123 | A | 5/2000 | Ikezawa et al. |
| 6,349,145 | B1 | 2/2002 | Nakayama et al. |
| 9,835,519 | B2 * | 12/2017 | Meng ................ G01M 11/0228 |
| 2001/0055111 | A1 | 12/2001 | Yoda et al. |
| 2005/0068495 | A1 | 3/2005 | Jojiki |
| 2005/0190360 | A1 | 9/2005 | Kajino |
| 2006/0152709 | A1 | 7/2006 | Imaizumi |
| 2010/0220285 | A1 | 9/2010 | Simmonds |
| 2013/0155393 | A1 | 6/2013 | Blonde et al. |
| 2014/0300726 | A1 | 10/2014 | Gladnick |
| 2015/0070650 | A1 | 3/2015 | Seriani |
| 2015/0109577 | A1 | 4/2015 | Haddadi et al. |
| 2015/0330865 | A1 | 11/2015 | Meng |
| 2018/0038768 | A1 * | 2/2018 | Hofmann ........... G01M 11/0228 |
| 2018/0106700 | A1 | 4/2018 | Limon et al. |
| 2018/0140182 | A1 * | 5/2018 | Limon ..................... A61B 3/02 |
| 2019/0368970 | A1 | 12/2019 | Limon et al. |

FOREIGN PATENT DOCUMENTS

| | | |
|---|---|---|
| CN | 103163663 | 6/2013 |
| CN | 103217273 | 7/2013 |
| CN | 203132816 | 8/2013 |
| DE | 19646360 | 5/1998 |
| DE | 10341161 | 2/2005 |
| DE | 102007057260 | 6/2009 |
| EP | 1679499 | 7/2006 |
| EP | 2608109 | 6/2013 |
| JP | S58156828 | 9/1983 |
| JP | 09243514 | 9/1997 |
| KR | 20060093596 | 8/2006 |
| KR | 101528132 | 6/2015 |
| WO | 2015051573 | 4/2015 |
| WO | 2016141333 | 9/2016 |

OTHER PUBLICATIONS

International Search Report and Written Opinion for PCT/IB2016/052672, dated Sep. 11, 2016, 8 pages.
International Preliminary Report on Patentability for PCT/IB2016/052673, dated Nov. 23, 2017, 8 pages.
International Search Report and Written Opinion for PCT/IB2016/052673, dated Aug. 29, 2016, 12 pages.
International Search Report and Written Opinion for PCT/IB2017/050338, dated Jun. 14, 2017, 14 pages.
Office Action for Russian Patent Application No. 2017139574, dated Dec. 24, 2018, 15 pages (Including 7 pages of English translation).
International Preliminary Report on Patentability for International Application No. PCT/IB2017/050338, dated Aug. 2, 2018, 9 pages.
European Search Report for European Patent Application No. 16792277.2, dated Jan. 2, 2019, 23 pages.
European Search Report for European Patent Application No. 16792278.0, dated Jan. 7, 2019, 19 pages.
Office Action for U.S. Appl. No. 15/572,893, dated Mar. 18, 2019, 26 pages.
Office Action for Chinese Patent Application No. 201680040458.7, dated Mar. 29, 2019, 12 pages.
Office Action for Chinese Patent Application No. 201680040517.0, dated Mar. 29, 2019, 35 pages (Including 20 pages of English translation).
European Search Report for European Patent Application No. 16792277.2, dated Apr. 3, 2019, 22 pages.
European Search Report for European Patent Application No. 16792278.0, dated Apr. 9, 2019, 18 pages.
Office Action for Russian Patent Application No. 2017139574/28, dated Apr. 25, 2019, 17 pages (Including 8 pages of English translation).
Notice of Allowance for U.S. Appl. No. 15/572,893, dated May 13, 2019, 9 Pages.
Office Action for U.S. Appl. No. 15/572,893, dated Oct. 22, 2018, 18 pages.
Office Action for U.S. Appl. No. 15/572,920, dated Jul. 23, 2019, 54 pages.
Office Action for Russian Patent Application No. 2017139576 dated Sep. 26, 2019, 16 pages (Including 8 pages of English translation).
Notice of Allowance for U.S. Appl. No. 15/572,893, dated Nov. 5, 2019, 12 Pages.
European Search Report for European Patent Application No. 17741169.1, dated Sep. 12, 2019, 8 pages.
Office Action for Chinese Patent Application No. 201680040517.0, dated Nov. 4, 2019, 33 pages (Including 21 pages of English translation).
Office Action for Chinese Patent Application No. 201680040458.7, dated Nov. 14, 2019, 35 pages (Including 20 pages of English translation).
Ru Zheng et al., "A device for detecting progressive addition lenses", Optical Technique, vol. 41, Issue 4, chaps. 1-3, Jul. 2015, 3 pages.

* cited by examiner

APPARATUS, SYSTEM AND METHOD OF DETERMINING ONE OR MORE OPTICAL PARAMETERS OF A LENS

CROSS REFERENCE

This Application claims the benefit of and priority from US Provisional Patent Application No. 62/286,330 entitled "APPARATUS, SYSTEM AND METHOD OF DETERMINING ONE OR MORE OPTICAL PARAMETERS OF A LENS", filed Jan. 23, 2016, and is Continuation in Part of PCT application No. PCT/IB2016/052673 entitled "APPARATUS, SYSTEM AND METHOD OF DETERMINING ONE OR MORE OPTICAL PARAMETERS OF A LENS", filed May 10, 2016, which in turn claims the benefit of and priority from U.S. Provisional Patent Application No. 62/159,295 entitled "APPARATUS, SYSTEM AND METHOD OF DETERMINING ONE OR MORE OPTICAL PARAMETERS OF A LENS", filed May 10, 2015, from U.S. Provisional Patent Application No. 62/216,757 entitled "APPARATUS, SYSTEM AND METHOD OF DETERMINING ONE OR MORE OPTICAL PARAMETERS OF A LENS", filed Sep. 10, 2015, and from U.S. Provisional Patent Application No. 62/286,331 entitled "APPARATUS, SYSTEM AND METHOD OF DETERMINING ONE OR MORE OPTICAL PARAMETERS OF A LENS", filed Jan. 23, 2016, the entire disclosures of all of which are incorporated herein by reference.

TECHNICAL FIELD

Embodiments described herein generally relate to determining one or more optical parameters of a lens.

BACKGROUND

Eyeglasses and/or prescription eyeglasses may include lenses assembled in a frame of the eyeglasses.

The lenses may have one or more optical parameters. The optical parameters of a lens may include, for example, a spherical power, a cylindrical power and/or a cylindrical axis.

Determining the spherical power, the cylindrical power, and/or the cylindrical axis of the lens may be useful, for example, if a user of the eyeglasses wishes to duplicate the eyeglasses and/or to produce spare lenses for the eyeglasses.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
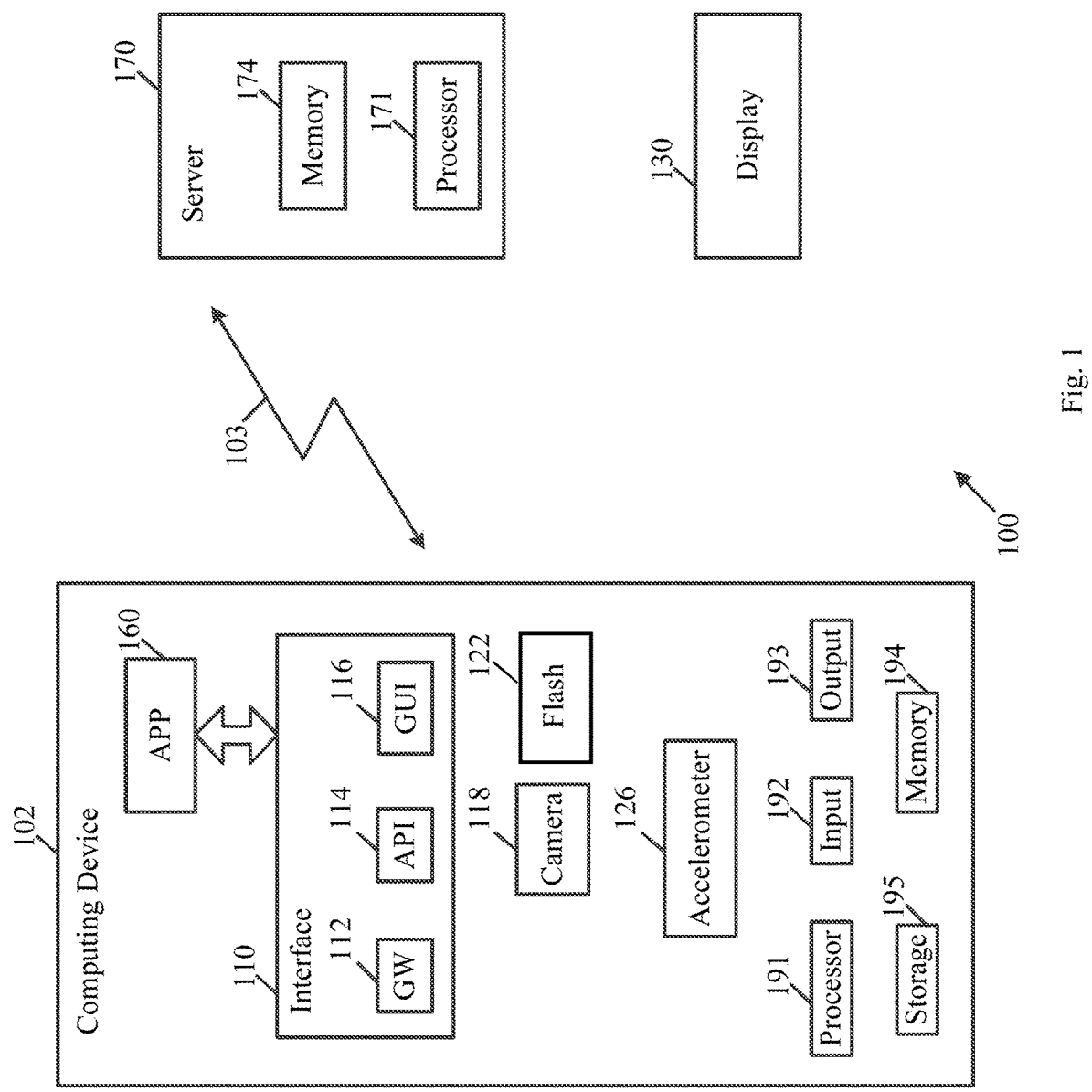
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities capture the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments, for example, may capture the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may capture the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some demonstrative embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a FLASH memory, a rigid magnetic disk, and an optical disk. Some demonstrative examples of optical disks include compact disk-read only memory (CD-ROM), compact disk-read/write (CD-R/W), and DVD.

In some demonstrative embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some demonstrative embodiments, input/output or I/O devices (including but not limited to keyboards, displays, pointing devices, etc.) may be coupled to the system either directly or through intervening I/O controllers. In some demonstrative embodiments, network adapters may be coupled to the system to enable the data processing system to become coupled to other data processing systems or remote printers or storage devices, for example, through intervening private or public networks. In some demonstrative embodiments, modems, cable modems and Ethernet cards are demonstrative examples of types of network adapters. Other suitable components may be used.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a mobile phone, a Smartphone, a mobile computer, a laptop computer, a notebook computer, a tablet computer, a handheld computer, a handheld device, a Personal Digital Assistant (PDA) device, a handheld PDA device, a mobile or portable device, a non-mobile or non-portable device, a cellular telephone, a wireless telephone, a device having one or more internal antennas and/or external antennas, a wireless handheld device, or the like.

Reference is now made to FIG. 1, which schematically illustrates a block diagram of a system 100, in accordance with some demonstrative embodiments.

As shown in FIG. 1, in some demonstrative embodiments system 100 may include a computing device 102.

In some demonstrative embodiments, device 102 may be implemented using suitable hardware components and/or software components, for example, processors, controllers, memory units, storage units, input units, output units, communication units, operating systems, applications, or the like.

In some demonstrative embodiments, device 102 may include, for example, a computing device, a mobile phone, a Smartphone, a Cellular phone, a notebook, a mobile computer, a laptop computer, a notebook computer, a tablet computer, a handheld computer, a handheld device, a PDA device, a handheld PDA device, a wireless communication device, a PDA device which incorporates a wireless communication device, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may be configured to communicate with one or more other devices via a wireless and/or wired network 103.

In some demonstrative embodiments, network 103 may include a wired network, a local area network (LAN), a wireless LAN (WLAN) network, a radio network, a cellular network, a Wireless Fidelity (WiFi) network, an IR network, a Bluetooth (BT) network, and the like.

In some demonstrative embodiments, device 102 may allow one or more users to interact with one or more processes, applications and/or modules of device 102, e.g., as described herein.

In some demonstrative embodiments, device 102 may be configured to perform and/or to execute one or more operations, modules, processes, procedures and/or the like.

In some demonstrative embodiments, device 102 may be configured to determine a one or more optical parameters of a lens of eyeglasses, e.g., provided by a user of device 102, e.g., as described below.

In some demonstrative embodiments, system 100 may be configured to perform lensmeter or lensometer analysis of the lens of the eyeglasses, for example, even without using any auxiliary optical means, e.g., as described below.

In some demonstrative embodiments, the one or more optical parameters of the lens may include a spherical power, a cylindrical power and/or a cylindrical axis of the lens.

In some demonstrative embodiments, system 100 may be configured to analyze a focal power of a spherical lens, a focal power and a cylindrical axis of a cylindrical lens, a distance between the centers of two lenses assembled in a frame of the eyeglasses, and/or any other optical parameters of the lens, e.g., as described below.

In some demonstrative embodiments, system 100 may include at least one service, module, controller, and/or application 160 configured to determine the one or more optical parameters of the lens provided by the user of device 102, e.g., as described below.

In some demonstrative embodiments, application 160 may include and/or may perform the functionality of a lensometer module, e.g., configured to perform the lensmeter or lensometer analysis of the lens of the eyeglasses.

In some demonstrative embodiments, application 160 may include, or may be implemented as, software, a software module, an application, a program, a subroutine, instructions, an instruction set, computing code, words, values, symbols, and the like.

In some demonstrative embodiments, application 160 may include a local application to be executed by device 102. For example, memory unit 194 and/or storage unit 195 may store instructions resulting in application 160, and/or processor 191 may be configured to execute the instructions resulting in application 160, e.g., as described below.

In other embodiments, application 160 may include a remote application to be executed by any suitable computing system, e.g., a server 170.

In some demonstrative embodiments, server 170 may include at least a remote server, a web-based server, a cloud server, and/or any other server.

In some demonstrative embodiments, the server 170 may include a suitable memory and/or storage unit 174 having stored thereon instructions resulting in application 160, and a suitable processor 171 to execute the instructions, e.g., as descried below.

In some demonstrative embodiments, application 160 may include a combination of a remote application and a local application.

In one example, application 160 may be downloaded and/or received by the user of device 102 from another computing system, e.g., server 170, such that application 160 may be executed locally by users of device 102. For example, the instructions may be received and stored, e.g., temporarily, in a memory or any suitable short-term memory or buffer of device 102, e.g., prior to being executed by processor 191 of device 102.

In another example, application 160 may include a front-end to be executed locally by device 102, and a backend to be executed by server 170. For example, one or more first operations of determining the one or more optical parameters of the lens of the user may be performed locally, for example, by device 102, and/or one or more second operations of determining the one or more optical parameters may be performed remotely, for example, by server 170, e.g., as described below.

In other embodiments, application 160 may include any other suitable computing arrangement and/or scheme.

In some demonstrative embodiments, system 100 may include an interface 110 to interface between a user of device 102 and one or more elements of system 100, e.g., application 160.

In some demonstrative embodiments, interface 110 may be implemented using any suitable hardware components and/or software components, for example, processors, controllers, memory units, storage units, input units, output units, communication units, operating systems, and/or applications.

In some embodiments, interface 110 may be implemented as part of any suitable module, system, device, or component of system 100.

In other embodiments, interface 110 may be implemented as a separate element of system 100.

In some demonstrative embodiments, interface 110 may be implemented as part of device 102. For example, interface 110 may be associated with and/or included as part of device 102.

In one example, interface 110 may be implemented, for example, as middleware, and/or as part of any suitable application of device 102. For example, interface 110 may be implemented as part of application 160 and/or as part of an OS of device 102.

In some demonstrative embodiments, interface 160 may be implemented as part of server 170. For example, interface 110 may be associated with and/or included as part of server 170.

In one example, interface 110 may include, or may be part of a Web-based application, a web-site, a web-page, a plug-in, an ActiveX control, a rich content component (e.g., a Flash or Shockwave component), or the like.

In some demonstrative embodiments, interface 110 may be associated with and/or may include, for example, a gateway (GW) 112 and/or an application programming interface (API) 114, for example, to communicate information and/or communications between elements of system 100 and/or to one or more other, e.g., internal or external, parties, users, applications and/or systems.

In some embodiments, interface 110 may include any suitable Graphic-User-Interface (GUI) 116 and/or any other suitable interface.

In some demonstrative embodiments, system 100 may include a display 130 configured to display one or more objects to be captured by an image capturing device, and/or to display information, objects, instructions and/or any other content, for example, to a user, e.g., as described below.

In some demonstrative embodiments, display 130 may include a separate display, a stand-alone display and/or a display device, e.g., separate from other elements of system 100.

In some demonstrative embodiments, display 130 may be part of device 102 or part of server 170.

In some demonstrative embodiments, display 130 may be part of any other computing system, e.g., a laptop, a desktop, and/or the like.

In some demonstrative embodiments, display 130 may include, for example, a monitor, a screen, a touch-screen, a flat panel display, a LED display unit, an LCD display unit, a plasma display unit, one or more audio speakers or earphones, and/or any other suitable components.

In some demonstrative embodiments, the GUI 116 of interface 110 may be displayed on display 130.

In some demonstrative embodiments, application 160 may be configured to determine the one or more optical parameters of the lens, for example, based on at least one captured image, e.g., as described below.

In some demonstrative embodiments, device 102 may include an image capturing device, e.g., a camera 118, or any other device, configured to capture the at least one image.

In some demonstrative embodiments, application 160 may be configured to control, cause, trigger, and/or instruct camera 118 to capture the at least one captured.

In some demonstrative embodiments, application 160 may be configured to instruct a user of device 102 to capture the captured image.

In some demonstrative embodiments, application 160 may be configured to receive the at least one captured image, e.g., directly or indirectly from the camera 118.

In one example, application 160 may be configured to determine the one or more optical parameters of the lens locally, for example, if application 160 is locally implemented by device 102. According to this example, camera 118 may be configured to capture the image, and application 160 may be configured to receive the captured image, e.g., from camera 118, and to determine the one or more optical parameters of the lens, e.g., as described below.

In another example, application 160 may be configured to determine the one or more optical parameters of the lens remotely, for example, if application 160 is implemented by server 170, or if the back-end of application 160 is implemented by server 170, e.g., while the front-end of application 160 is implemented by device 102. According to this example, camera 118 may be configured to capture the image; the front-end of application 160 may be configured to receive the captured image; and server 170 and/or the back-end of application 160 may be configured to determine the one or more optical parameters of the lens, e.g., based on information received from the front-end of application 160.

In one example, device 102 and/or the front-end of application 160 may be configured to send the captured image and, optionally, additional information, e.g., as described below, to server 170, e.g., via network 103; and/or server 170 and/or the back-end of application 160 may be configured to receive the captured image, and to determine the one or more optical parameters of the lens, for example, based on the captured image from device 102.

In some demonstrative embodiments, the at least one captured image may include at least one reflection of a flash on a lens of eyeglasses.

In some demonstrative embodiments, application 160 may be configured to control, cause, trigger, and/or instruct camera 118 to capture the at least one captured image including the at least one reflection of the flash on the lens of eyeglasses.

In some demonstrative embodiments, application 160 may be configured to instruct a user of device 102 to capture the captured image to include the at least one reflection of the flash on the lens of eyeglasses.

In some demonstrative embodiments, application 160 may be configured to instruct the user of device 102 to capture the at least one captured image, for example, while tilting the eyeglasses, for example, while causing device 102 to capture a plurality of images, e.g., as described below.

In other embodiments, the at least one captured image may include at least one reference object captured via the lens of the eyeglasses, e.g., as described below.

In one example, the at least one captured image may include both the at least one reference object captured via the lens of the eyeglasses and the at least one reflection of the flash on the lens of the eyeglasses, e.g., as described below.

In another example, the at least one captured image may include a plurality of captured images. For example, a first captured image may include the at least one reference object captured via the lens of the eyeglasses, and a second captured image may include the at least one reflection of the flash on the lens of the eyeglasses. According to this example, the first and second images may be captured sequentially, for example, the second image may be captured after the first image, or the first image may be captured after the second image.

In some demonstrative embodiments, the at least one reflection may include a first reflection of the flash from a front surface of the lens, and a second reflection of the flash from a back surface of the lens, e.g., as described below In some demonstrative embodiments, device 102 may include a flash device 122 configured to produce a flash-light ("flash"), which may be reflected on the lens of the eyeglasses, e.g., when the captured image is captured.

In one example, application 160 may be configured to control, cause, trigger, and/or instruct flash device 122 to produce the flash, for example, when the captured image is captured.

In another example, application 160 may be configured to instruct the user of device 102 to capture the captured image using flash device 122.

In some demonstrative embodiments, flash device 122 may include a flash lamp, a light emitting diode (LED), and/or any other light source.

In some demonstrative embodiments, application 160 may be configured to process the at least one captured image of the at least one reflection of the flash, e.g., from flash device 122, on the lens of the eyeglasses, e.g., as described below.

In some demonstrative embodiments, application 160 may be configured to determine one or more optical parameters of the lens based at least on the at least one captured image, e.g., as described below.

In some demonstrative embodiments, the one or more optical parameters may include at least a spherical power of the lens, e.g., as described below.

In some demonstrative embodiments, the one or more optical parameters may include a cylindrical power and/or a cylindrical axis of the lens, e.g., as described below.

In some demonstrative embodiments, application 160 may be configured to determine the one or more optical parameters of the lens, for example, based on the at least one reflection and a relative angle between a plane of the lens and a plane of the camera 118, e.g., as described below.

In some demonstrative embodiments, application 160 may be configured to determine the relative angle, for example, based on the at least one reflection, e.g., as described below.

In some demonstrative embodiments, application 160 may be configured to determine the relative angle, for example, based on at least one displacement between the first reflection of the flash on the front surface of the lens and the second reflection of the flash on the back surface of the lens, e.g., as described below.

In some demonstrative embodiments, the at least one displacement may include a vertical displacement and/or a horizontal displacement, e.g., between the first and second reflections, e.g., as described below.

In some demonstrative embodiments, application 160 may be configured to determine the relative angle, for example, based on a relative location of the at least one reflection relative to a center of the lens, e.g., as described below.

In one example, application 160 may be configured to determine the relative angle, for example, based on a first relative location of the first reflection relative to the center of the lens and/or a second relative location of the second reflection relative to the center of the lens, e.g., as described below.

In another example, application 160 may be configured to determine the relative angle, for example, based on a location of the first reflection relative to the second reflection, e.g., as described below.

In some demonstrative embodiments, application 160 may be configured to determine the center of the lens, e.g., as described below.

In some demonstrative embodiments, application 160 may be configured to determine the center of the lens, for example, based on a first reference object image of a first reference object captured via the lens in the captured image and a second reference object image of a second reference object captured not via the lens in the captured image, e.g., as described below.

In some demonstrative embodiments, application 160 may be configured to determine the one or more optical parameters of the lens, for example, based on one or more estimated optical parameters of the lens, e.g., as described below.

In some demonstrative embodiments, the relative angle may be used to apply a correction factor, for example, to the estimated optical parameters of the lens, e.g., by analyzing an aberration created from a tilt of the lens, for example, based at least on the first and second reflections, e.g., as described below.

In some demonstrative embodiments, application 160 may be configured to determine the one or more estimated optical parameters of the lens, for example, based on the captured image, e.g., as described below.

In some demonstrative embodiments, the captured image may include a reference object image of a reference object captured via the lens.

In one example, the reference object may be displayed on display 130, e.g., as described below.

In one example, the reference object may include a predefined object, e.g., an object drawn on a paper, a cardboard object, or the like.

In another example, the reference object may include an object displayed on a screen of device 102, e.g., a display of a Smartphone, and reflected from a mirror. According to this example, the captured image may include the reflection of the object in the mirror captured via the lens of the eyeglasses.

In some demonstrative embodiments, application 160 may be configured to determine the one or more estimated optical parameters of the lens, for example, based on a comparison between the reference object and the reference object image, e.g., as described below.

In some demonstrative embodiments, application 160 may be configured to determine the one or more estimated optical parameters of the lens, for example, based on the relative angle and the one or more estimated optical parameters, e.g., as described below.

In some demonstrative embodiments, application 160 may be configured to determine an estimated spherical power of the lens, for example, based on a magnification between a reference dimension of the reference object and an imaged dimension of the reference dimension in the reference object image, e.g., as described below.

In some demonstrative embodiments, application 160 may be configured to determine the spherical power of the lens, for example, based on the relative angle and the estimated spherical power, e.g., as described below.

In some demonstrative embodiments, application 160 may be configured to determine an estimated cylindrical power of the lens and/or an estimated axis of the lens, for example, based on a deformation between one or more reference dimensions of the reference object and one or more respective imaged dimensions of the one or more reference dimensions in the reference object image, e.g., as described below.

In some demonstrative embodiments, application 160 may be configured to determine the cylindrical power of the lens and/or the cylindrical axis of the lens, for example, based on the relative angle and the estimated cylindrical power and/or the estimated cylindrical axis, e.g., as described below.

In some demonstrative embodiments, application 160 may be configured to determine the one or more optical parameters of the lens, for example, based on the one or more estimated optical parameters of the lens, for example, even without using the relative angle, e.g., without applying the correction factor to the estimated optical parameters of the lens, e.g., as described below.

In some demonstrative embodiments, application 160 may be configured to determine the one or more optical parameters of the lens, for example, based on a comparison between the reference object and the reference object image when the first and second reflections coincide in the captured image, e.g., as described below.

In some demonstrative embodiments, application 160 may be configured to trigger an instruction to the user of device 102 to rotate the eyeglasses at least until the first and second reflections coincide, e.g., to allow to determine the one or more estimated optical parameters of the lens, for example, even without using the relative angle.

In some demonstrative embodiments, two reflections may be observed, e.g., a front reflection from the front surface of the lens and a back reflection from the back surface of the lens, for example, to allow tilting the lens with respect to the flash to a required angle.

In one example, when the lens plane is exactly parallel to the device plane, the two reflections, e.g., the front reflection and the back reflection, may overlap.

In some demonstrative embodiments, a bright reflection might be observed, for example, when relatively flat surfaces are involved.

In some demonstrative embodiments, a very bright light reflection may indicate that the lens plane is parallel with the camera plane.

In some demonstrative embodiments, two reflections that are separated either horizontally, vertically or both, may indicate the lens is to be tilted until both reflections coincide. In one example, a horizontal separation between the reflections may indicate to tilt the lens on the vertical axis. In another example, a vertical separation between the reflections may indicate to tilt the lens on the horizontal axis, e.g., as described below.

In some demonstrative embodiments, application 160 may be configured to determine the one or more optical parameters of the lens, for example, based on the at least one captured image including the at least one reflection of the flash, for example, even without using the relative angle, e.g., as descried below.

In some demonstrative embodiments, application 160 may be configured to determine a spherical power of the lens, for example, based on a diameter size of the at least one reflection in the image, e.g., as described below.

In some demonstrative embodiments, application 160 may be configured to determine a cylindrical power of the lens and/or a cylindrical axis of the lens, for example, based on a deformation of the at least one reflection in the image, e.g., as described below.

In some demonstrative embodiments, application 160 may be configured to determine the one or more optical parameters of the lens, for example, based on the at least one image including at least one reference object captured via the lens of the eyeglasses, e.g., as described below.

In some demonstrative embodiments, application 160 may be configured to trigger capturing of at least one image by camera 118 of at least one reference object via the lens of the eyeglasses.

In one example, application 160 may be configured to instruct the user of device 102 to capture the least one image of the at least one reference object via the lens of the eyeglasses e.g., as described below.

In some demonstrative embodiments, application 160 may be configured to determine a relative angle between a plane of the lens and a plane of the camera 118.

In some demonstrative embodiments, application 160 may be configured to determine one or more optical parameters of the lens based at least on the relative angle and the at least one image, e.g., as described below.

In one example, application 160 may be configured to determine or to processes information indicative of a relative angle between flash 122 and camera 118, for example, if camera 118 and flash 122 are not on the same plane. According to this example, application 160 may be configured to determine the one or more optical parameters using the relative location and/or angle between flash 122 and camera 118.

In some demonstrative embodiments, application 160 may be configured to determine the relative angle, for example, based on a comparison between the reference object and at least one object image of the reference object in the at least one image.

In some demonstrative embodiments, application 160 may be configured to determine the relative angle, for example, based on the comparison between the reference object and the at least one object image of the reference object in the at least one image, for example, even without using any reflections of a flash from the lens, e.g., as described below.

In some demonstrative embodiments, the relative angle may be used to determine a correction factor to one or more estimated optical parameters of the lens, e.g., as described below.

In some demonstrative embodiments, application 160 may be configured to determine one or more estimated optical parameters of the lens, e.g., as described below.

In some demonstrative embodiments, the at least one image may include at least one reflection of a flash on the lens.

In some demonstrative embodiments, application 160 may be configured to determine the one or more estimated optical parameters of the lens, for example, based on the at least one reflection.

In one example, application 160 may be configured to determine an estimated spherical power of the lens, for example, based on a diameter size of the at least one reflection in the image, e.g., as described below.

In another example, application 160 may be configured to determine an estimated cylindrical power of the lens and/or an estimated cylindrical axis of the lens, for example, based on a deformation of the at least one reflection in the image, e.g., as described below.

In some demonstrative embodiments, application 160 may be configured to determine the one or more optical parameters of the lens, for example, based on the relative angle and the one or more estimated optical parameters of the lens.

In one example, the captured image may include the at least one object image of the reference object and the at least one reflection. According to this example, application 160 may determine the one or more optical parameters of the lens, for example, based on one or more estimated optical parameters of the lens, which may be determined, for example, based on the at least one reflection in the/or captured image, and the relative angle, which may be determined, for example, based on the comparison between the reference object and the at least one object image.

In some demonstrative embodiments, application 160 may be configured to determine the one or more estimated optical parameters of the lens, for example, based on the comparison between the reference object and the at least one object image in the captured image, e.g., as described below.

In one example, application 160 may determine an estimated spherical power of the lens based on a magnification between a reference dimension of the reference object and an imaged dimension of the reference dimension in the image, e.g., as described below.

In another example, application 160 may determine an estimated cylindrical power of the lens and/or an estimated cylindrical axis of the lens, for example, based on a deformation between one or more reference dimensions of the reference object and one or more respective imaged dimensions of the two or more reference dimensions in the image, e.g., as described below.

In some demonstrative embodiments, application 160 may be configured to determine the relative angle, for example, based on the at least two reflections, e.g., even without using the comparison between the reference object and the at least one object image in the captured image, e.g., as described above.

In one example, application 160 may be configured to determine the relative angle, for example, based on the at least two reflections, for example, by determining a distance between the two reflections, and determining the relative angle based on the distance between the two reflections.

In one example, the captured image may include the at least one object image of the reference object and the at least one reflection. According to this example, application 160 may determine the one or more optical parameters of the lens, for example, based on the one or more estimated optical parameters of the lens, which may be determined, for example, based on the comparison between the reference object and the object image, and the relative angle, which may be determined, for example, based on the at least one reflection in the captured image.

In some demonstrative embodiments, one or more observed optical parameters of a lens may change, for example, when the lens is observed by a camera from a relative angle, e.g., between a plane of the lens and a plane of the camera, which is not a zero angle.

In one example, an observed spherical power may be different from a nominal spherical power of the lens, for example, if the spherical power is observed from a relative angle, which is different that a zero angle.

In another example, an observed cylindrical component of the lens, e.g., a cylindrical power of the lens and/or a cylindrical axis of the lens, may vary, for example, due to the relative angle between the plane of the lens and the plane of the camera.

In some demonstrative embodiments, the relative angle may be extracted, and a correction factor may be set based on the relative angle, for example, to refine the one or more optical parameters of the lens.

In some demonstrative embodiments, when capturing an image, e.g., by camera 118, of the lens using a flash, e.g., flash 122, the flash may be reflected from a front surface of the lens or a back surface of the lens. In one example, one or more secondary reflections may occur as well.

In some demonstrative embodiments, one or more reflections of the flash, e.g., from the front surface of the lens or the back surface of the lens, may be described as a virtual or a real image of the flash, which may be created, for example, by a curvature of a surface of the lens, which may act as a mirror, e.g., to reflect the flash.

In some demonstrative embodiments, locations of the one or more reflections with respect to a center of the lens, e.g., an angle and/or a distance from the center of the lens, may suggest the relative angle between the plane of the camera and the plane of the lens.

In one example, for a relative angle that is equal to zero, a location of a reflection of the flash may be exactly on the center of the lens, e.g., assuming the flash is close to a camera lens of the camera and a distance of the lens is far greater than a camera Effective Focal Length camera (EFL) of the camera, e.g., camera 118.

Figure 2A:
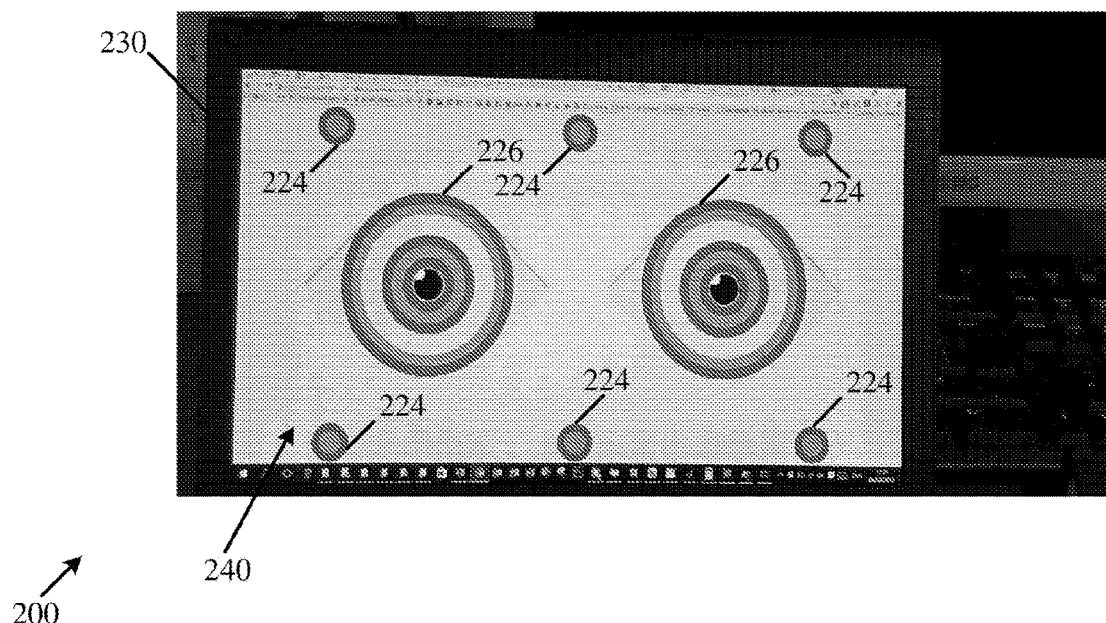
FIGS. 2A and 2B depict a first captured image and a second captured image, respectively, in accordance with some demonstrative embodiments.
Figure 2B:
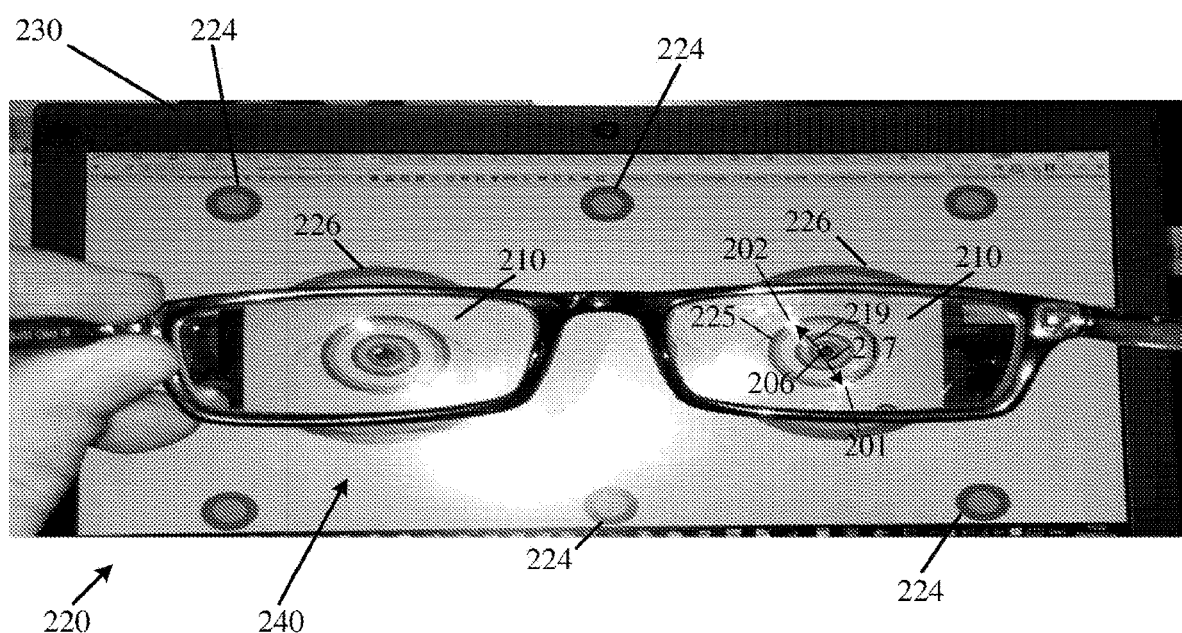

Reference is made to FIGS. 2A and 2B, which depict a first captured image 200 and a second captured image 220, in accordance with some demonstrative embodiments.

In one example, one or more elements of FIG. 1 may be arranged and/or operated according to the captured image 220, one or more parameters may be determined by application 160 (FIG. 1) based on captured image 220, and/or one or more measurements may be performed by one or more elements of FIG. 1 using captured image 220, e.g., as described below.

In some demonstrative embodiments, captured images 200 and 220 may be captured by a camera, e.g., camera 118 (FIG. 1).

In some demonstrative embodiments, as shown in FIGS. 2A and 2B, captured image 200 may include an image of a display 230 displaying an object 240. For example, display 230 may perform the functionality of display 130 (FIG. 1).

In some demonstrative embodiments, as shown in FIG. 2B, captured image 220 may include an image of eyeglasses including two lenses 210.

In some demonstrative embodiments, object 240 may include one or more known objects, e.g., having predefined and/or knows sizes and/or dimensions.

In some demonstrative embodiments, as shown in FIG. 2A, object 240 may include one or more objects 224 to be captured not via lens 210, and/or one or more objects 226 to be captured via lens 210.

In some demonstrative embodiments, one or more optical parameters of the lens 210, e.g., a spherical power, a cylindrical power and/or a cylindrical axis of lens 210, may be determined, for example, based on a magnification, for example, caused by lens 210, e.g., as described below.

In one example, the magnification may be determined based on comparison between dimensions of objects 224 and 226, and imaged dimensions of objects 224 and 226 in captured image 220, e.g., as described below.

In some demonstrative embodiments, application 160 (FIG. 1) may be configured to determine a center 206 of lens 210, e.g., as described below.

In some demonstrative embodiments, center 206 may be determined, for example, based on an object 224 and an object 226, and an image 225 of an object 226 and an image of object 224 in captured image 200.

In some demonstrative embodiments, object 224 and one or more dimensions of the object 204 may be known and/or predefined and may not be captured via lens 210, and therefore, the image of object 224 may not be affected by lens 210.

In some demonstrative embodiments, object 226 and one or more dimensions of the object 226 may be known and/or predefined and may be captured via lens 210, and therefore, the one or more dimensions of the object 226 may be changed in size and/or a location in the image 225 relative to their original location in object 226.

In some demonstrative embodiments, center 206 may be determined, for example, based on an axis of lens 210; locations, e.g., coordinates, of objects 224 and/or 226; locations e.g., coordinates, of image 225 of object 226 and/or the image of object 224; and a magnification of lens 210, for example, for a primary axis and/or a secondary axis of lens 210, e.g., for a sphero-cylindrical lens, e.g., as described below.

In some demonstrative embodiments, as shown in FIG. 2B, captured image 220 may be captured while a flash of the camera is activated.

In some demonstrative embodiments, as shown in FIG. 2, the flash may be reflected on a lens 210 in a first reflection 201 and/or a second reflection 202.

In some embodiments, first reflection 201 and/or second reflection 202 may be identified, for example, based on image processing of captured image 200.

In some demonstrative embodiments, as shown in FIG. 2, first reflection 201 and/or second reflection 202 may deviate from lens center 206, e.g., in the X-axis and/or in the Y-axis, e.g., in different amplitudes.

In some demonstrative embodiments, as shown in FIG. 2, object 240 may be behind the eyeglasses, and the eyeglasses are tilted at a relative angle between the plane of the lens 210 and a plane of the camera, e.g., when captured image 200 is captured.

In some demonstrative embodiments, as shown in FIG. 2, the eyeglasses are tilted in the X-axis and the Y-axis, which may cause the deviation of first reflection 201 and/or second reflection 202 from center 206.

In some demonstrative embodiments, application 160 (FIG. 1) may be configured to determine a first reflection vector 217, for example, between center 206 of lens 210 and first reflection 201, e.g., as described below.

In some demonstrative embodiments, first vector 217 may include a distance ("amplitude") between center 206 of lens 210 and first reflection 201, and a vector angle between center 206 of lens 210 and first reflection 201.

In some demonstrative embodiments, application 160 (FIG. 1) may be configured to determine a second reflection vector 219, for example, between center 206 of lens 210 and second reflection 201, e.g., as described below.

In some demonstrative embodiments, second reflection vector 219 may include a distance between center 206 of lens 210 and second reflection 202, and a vector angle between center 206 of lens 210 and second reflection 202.

In some demonstrative embodiments, a reflection vector corresponding to a reflection, for example, representing the distance, the amplitude, and/or the angle of the reflection from the center of the lens, may be determined, for example, based on the imaged reflection, and/or the calculated and/or given center of the lens, e.g., as described below.

In some demonstrative embodiments, application 160 (FIG. 1) may be configured to determine the relative angle between the plane of the lens 210 and the plane of the camera, for example, when captured image 220 is captured, e.g., as described below.

In some demonstrative embodiments, the relative angle may be determined for example, based on one or more calculated or provided optical parameters, e.g., lens spherical power, cylindrical power and/or axis, and/or reflection vectors, e.g., vectors 217 and 219, e.g., as described below.

In some demonstrative embodiments, application 160 (FIG. 1) may be configured to refine one or more estimated optical parameters, for example, based on an effect on the observed lens power, cylindrical power and/or axis of lens 210, e.g., by the relative angle between the plane of the lens 210 and the plane of the camera.

In some demonstrative embodiments, a dioptric matrix, denoted F, may be expressed, e.g., as follows:

$$F = \begin{pmatrix} P_x & P_t \\ P_t & P_y \end{pmatrix} = \begin{pmatrix} S + C\sin^2(\varphi) & -C\sin(\varphi)\cos(\varphi) \\ -C\sin(\varphi)\cos(\varphi) & S + C\cos^2(\varphi) \end{pmatrix} \quad (1)$$

wherein S denotes a spherical power of the lens, C denotes a cylindrical power of the lens.

In some demonstrative embodiments, a dioptric matrix, denoted $F_{tilted}$ for a lens tilted at a relative angle, denoted $\Phi$, may be determined, e.g., as follows:

$$F_{tilted} = \Phi F \Phi \qquad (2)$$

$$\text{wherein } \Phi = \sqrt{1 + \frac{\sin^2(\theta)}{2n}} \begin{pmatrix} 1 & 1 \\ 0 & 1/\cos(\theta) \end{pmatrix} \qquad (3)$$

In some demonstrative embodiments, the spherical power S of the lens, the cylindrical power C of the lens, and/or the angle Φ F may be deduced, for example, based on the dioptric matrix $F_{tilted}$, e.g., as described below.

In some demonstrative embodiments, a captured image, e.g., captured image 220, may include a single reflection of the flash.

In some demonstrative embodiments, the single reflection may enable to calculate the relative angle between a plane of the camera and a plane of the lens, for example, if a reflection vector, e.g., reflections vectors 217 and/or 219, and/or or a lens center, e.g., lens center 206, are calculated or provided.

In some demonstrative embodiments, a lens curvature may be determined according to a measured or a provided spherical power of the lens, for example, based on a lens maker equation, e.g., as follows:

$$\frac{1}{f} = (n-1)\left(\frac{1}{R_1} - \frac{1}{R_2}\right) \qquad (4)$$

wherein $R_1$ denotes a radius of a back surface of the lens, and $R_2$ denotes a radius of a front surface of the lens.

In some demonstrative embodiments, radius $R_1$ may be assumed to be infinity, and the radius $R_2$ may be calculated, for example, according to a given and/or a measured power of the lens.

In some demonstrative embodiments, the power of the lens at a relative angle may be determined, for example, according to a change in magnification of one or more objects, e.g., objects 226, captured via the lens, for example, when the image is captured.

In some demonstrative embodiments, a captured image, e.g., captured image 220, may include two reflections of the flash.

In some demonstrative embodiments, when the power of the lens at the relative angle of acquisition is given, each reflection may be related to another radius of the lens, e.g. as described below.

In some demonstrative embodiments, a first reflection may be related to a front surface of the lens, and may be created from the curvature of the front surface, for example, based on the radius $R_2$, e.g., $2/R_2$.

In some demonstrative embodiments, a second reflection may be a result of the first reflection being impacted from the front surface on the back surface.

In some demonstrative embodiments, the second reflection may correlate with the radius $R_2$, e.g., a double power of a mirror with a curvature equal to $1/R_2$, e.g., if $R_1$ is equal to infinity.

In some demonstrative embodiments, for a curvature of a lens in the front and back surfaces, the power of the second reflection may be correlated to a mirror power, e.g., as follows:

$$\frac{1}{f} = \frac{1}{R_1} - \frac{n-1}{R_2} + \frac{1}{R_1} = \frac{2}{R_1} - \frac{n-1}{R_2} \qquad (5)$$

In some demonstrative embodiments, the eyeglasses may be tilted, e.g., to one or more relative angles, and one or more images corresponding to the one or more relative angles may be captured, for example, to minimize an error in an angle correction, e.g., given that a nominal spherical power and/or a cylindrical power may remain constant for every relative angle, e.g., as described below.

In some demonstrative embodiments, a relative angle between the plane of the lens and the plane of the camera may be changed, for example, by tilting the camera and recording a camera angle, denoted delta_angle, of the camera, for example, based on gyroscope sensor of the camera and/or any other orientation sensor.

In some demonstrative embodiments, a plurality of data points corresponding to a plurality of camera angles delta_angle may be used, for example, to extract a refractive index of the lens.

In some demonstrative embodiments, a relative angle between the plane of the lens and the plane of the camera may be changed, for example, by tilting the eyeglasses.

In some demonstrative embodiments, application 160 may be configured to instruct the user of device 102 to capture the at least one captured image, for example, while tilting the eyeglasses, for example, while causing device 102 to capture a plurality of images, e.g., as described below.

In some demonstrative embodiments, application 160 may be configured to instruct the user of device 102 to capture a plurality of images, for example, while tilting the eyeglasses in a plurality of tilting angles. For example, a first image of the plurality of images may be captured in a first tilting angle of the eyeglasses, and a second image of the plurality of images may be captured in a second, e.g., different, tilting angle of the eyeglasses.

In one example, device 102 may cause camera 118 to capture a sequence of images while the user is tilting the eyeglasses. In another example, the user may capture the plurality of images, for example, by operating camera 118.

In some demonstrative embodiments, application 160 may be configured to determine the one or more optical parameters the lens, for example, based on the plurality of captured images, which correspond to the plurality of tilting angles.

Figure 3:
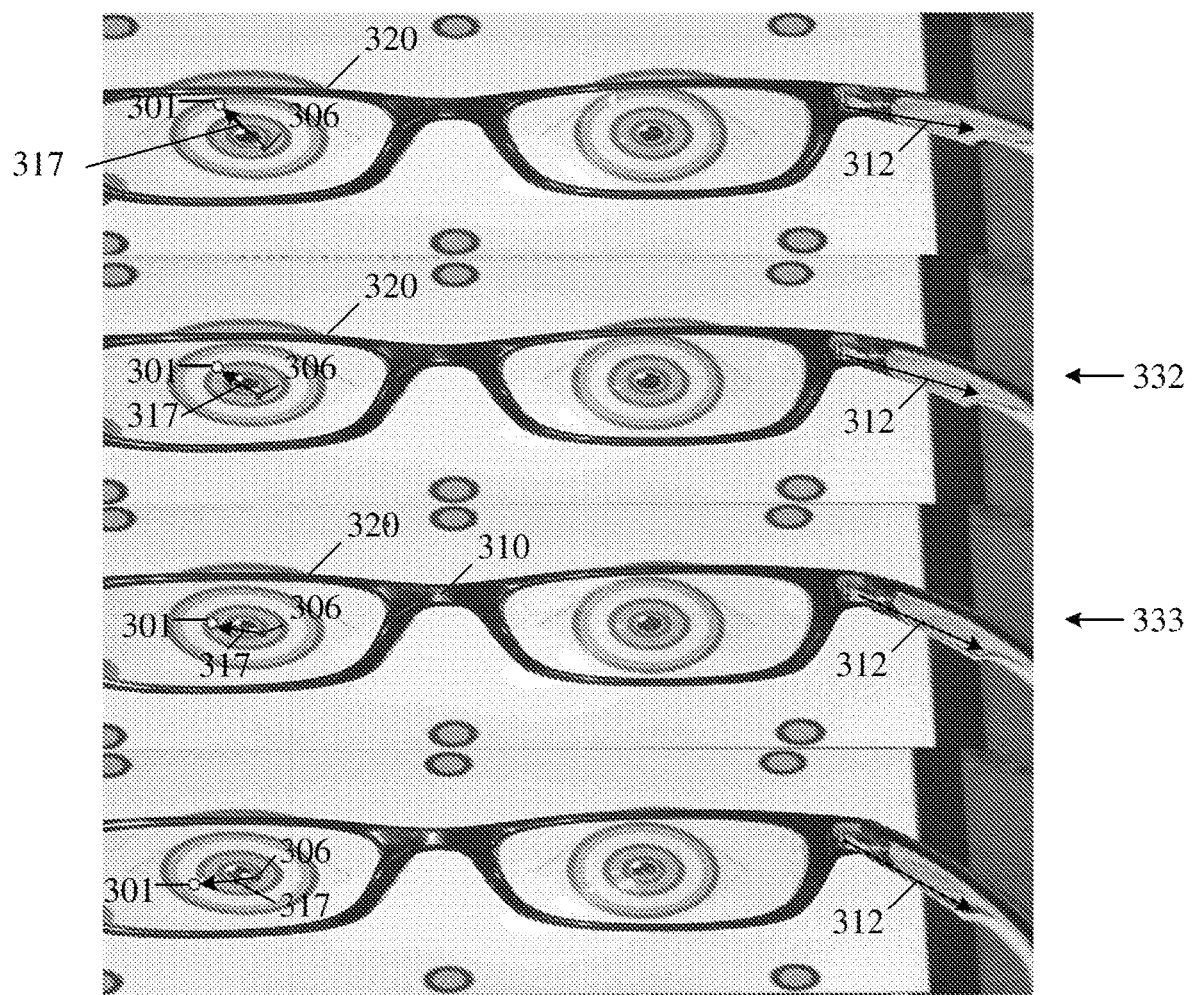
FIG. 3 schematically illustrates a plurality of captured images corresponding to a plurality of tilting angles of eyeglasses, in accordance with some demonstrative embodiments.

Reference is made to FIG. 3, which schematically illustrates a plurality of captured images corresponding to a plurality of tilting angles of eyeglasses.

In some demonstrative embodiments, as shown in FIG. 3, the plurality of captured images may include an object 340, e.g., object 240 (FIG. 2), behind a lens 320 of the eyeglasses.

In some demonstrative embodiments, as shown in FIG. 3, one or more elements of object 340 may be captured via lens 320, e.g., at the plurality of the tilting angles.

In some demonstrative embodiments, as shown in FIG. 3, a plurality of arrows 312 may correspond to the plurality of tilting angle of the eyeglasses.

In some demonstrative embodiments, as shown in FIG. 3, a lens center 306 of lens 320 may be marked on lens 310.

In some demonstrative embodiments, as shown in FIG. 3, a plurality of reflection vectors 317 between center of lens 306 and a plurality of first reflections 301 on lens 310 may be marked.

In some demonstrative embodiments, there may be a relationship between a tilting angle of the eyeglasses and a reflection vector, e.g., as described below.

In some demonstrative embodiments, as shown in FIG. 3, a first reflection vector 317 corresponding to a first tilting angle of the eyeglasses may be different from a second reflection vector 317 corresponding to a second tilting angle of the eyeglasses, In some demonstrative embodiments, the relative angle may be determined, for example, based on two or more images corresponding to two or more tilting angles of the eyeglasses.

In some demonstrative embodiments, while a nominal spherical, a cylindrical power and/or a cylindrical axis of lens 320 may remain constant, a change in magnification and deformation of one or more elements of object 340 may be different, for example, based on the tilting angle.

In some demonstrative embodiments, application 160 (FIG. 1) may be configured to instruct the user to tilt the eyeglasses with respect to at least one axis, and to capture with the camera at least two images, e.g., images 332 and 333, when object 340 is behind lens 320, for example, while tilting the eyeglasses.

In some demonstrative embodiments, application 160 (FIG. 1) may be configured to calculate for the at least two images an estimated spherical power, cylindrical power and/or a cylindrical axis of lens 310, for example, F(D), e.g., as described below.

In some demonstrative embodiments, an algorithm may be configured to determine one or more optical parameters, denoted $D_0$, of the lens, and/or a nominal spherical power of the lens, for example, by minimizing a function based on a set of different tilting angles, denoted K, e.g., as follows:

$$\min_{D_0, \underline{K}} \|\Phi(\underline{K}) F(\Gamma \underline{D}) \Phi(\underline{K}) - F(\underline{D_0})\|_P \quad (6)$$

wherein Γ{ } denotes selection of a set with a minimal correlation operator, P denotes a Norm order, and F=F(S, C, φ)=F(D).

Figure 4A:
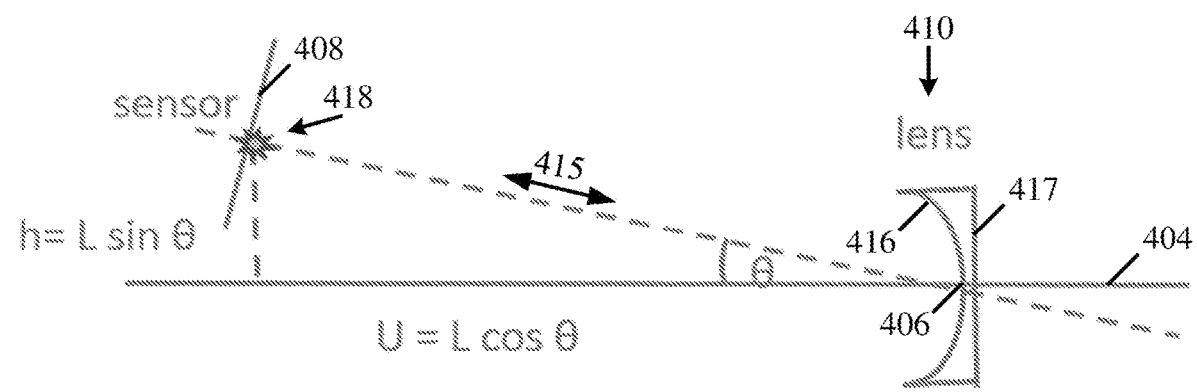
FIGS. 4A and 4B schematically illustrate a measurement scheme, in accordance with some demonstrative embodiments.
Figure 4B:
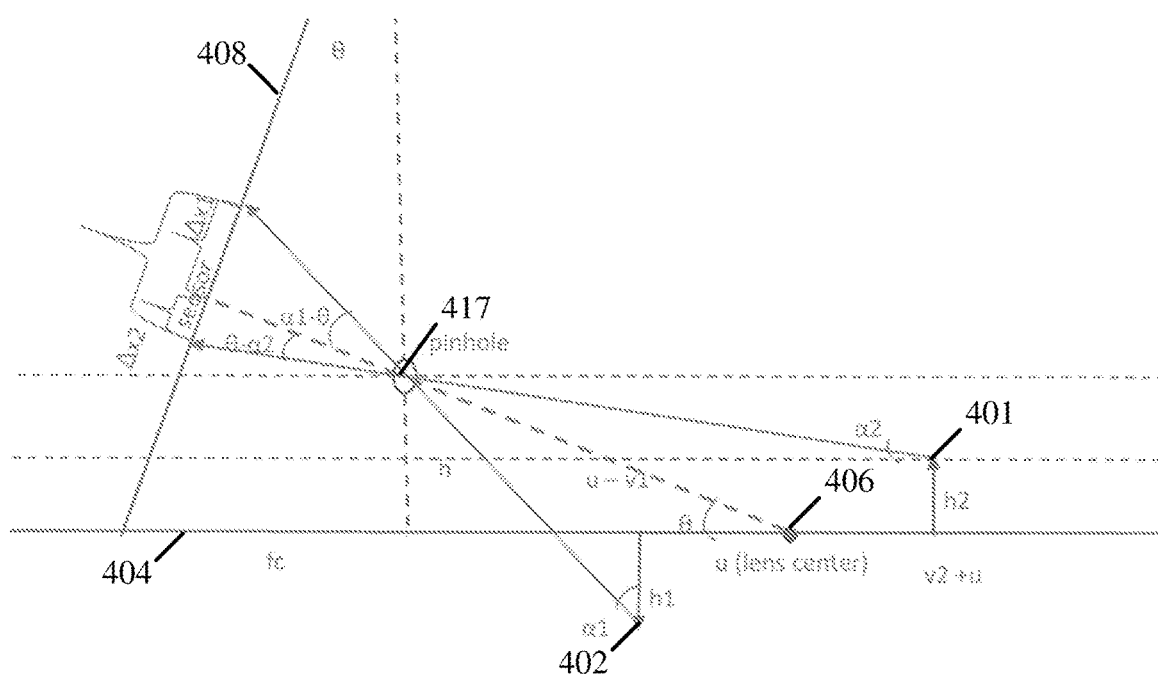

Reference is made to FIGS. 4A and 4B, which schematically illustrate a measurement scheme 400, in accordance with some demonstrative embodiments.

In some demonstrative embodiments, as shown in FIG. 4A, a lens 410 may be placed in front of a camera 418.

In one example, a flash of the camera may be located right next to a pinhole of camera 418.

In some demonstrative embodiments, as shown in FIGS. 4A and 4B, there may be a relative angle, denoted θ, between a plane 404 of lens 410 and a plane 408 of camera 418.

In some demonstrative embodiments, as shown in FIG. 4A, lens 410 may have a first, e.g., curved, surface 416 having a radius R1, and a second, e.g., flat, surface 417. In one example, surfaces 416 and/or 417 may be refractive and reflective surfaces.

In some demonstrative embodiments, a diffractive coefficient, denoted n, of lens 410 may be greater than zero, e.g., n>0.

In some demonstrative embodiments, as shown in FIG. 4A, there may be a distance 415, denoted L, between lens 410 and camera 418.

In some demonstrative embodiments, as shown in FIG. 4B, a first reflection 401 and a second reflection 402 of a flash on lens 410, may deviate from a lens center 406 of the lens.

In some demonstrative embodiments, a first magnification, denoted $M_1$, corresponding to first reflection 401, and a second magnification, denoted $M_2$, corresponding to second reflection 402, may be determined, e.g., as follows:

$$M_1 = \frac{1}{\frac{u}{f_M} - 1}, \quad M_2 = \frac{1}{\frac{u}{f_{L2}} - 1} \quad (7)$$

wherein, u is equal to L cos(θ), $f_M$ denotes a mirror focal length, and $f_{L2}$ denotes a lens focal length.

In some demonstrative embodiments, the relative angle θ, may be determined, for example, based on a first reflection, e.g., reflection 401, from a first surface, e.g., surface 416, with respect to the lens center 406, e.g., as follows:

$$\theta = \frac{\Delta x_1 * (1 - M_1)}{2 f_C * M_1} \quad (8)$$

wherein $\Delta x_1$ denotes a lateral displacement of reflection 401 from lens center 406, and fc denotes a focal length of camera 418.

In some demonstrative embodiments, the relative angle θ, may be determined, for example, based on a second reflection, e.g., reflection 402, from a second surface, e.g., surface 417, with respect to the lens center 406, e.g., as follows:

$$\theta = \frac{\Delta x_2 * (1 + M_2)}{2 f_C * M_2} \quad (9)$$

wherein $\Delta x_2$ denotes a lateral displacement of reflection 402 from lens center 406.

In some demonstrative embodiments, the relative angle θ, may be determined, for example, based on the first and second reflections, e.g., reflections 401 and 402, for example, based on a reflection distance, denoted Δx, between the first and second reflections, for example, even without locating a center of the lens, e.g., as follows:

$$\theta = \frac{\Delta x (1 - M_1)(1 + M_2)}{2 f_C * (M_1 + M_2)} \quad (10)$$

In some demonstrative embodiments, the reflection vector may be represented in a Cartesian axis, for example, by projecting the reflection vector on the X-axis and the Y-axis. For example, a relative X-axis angle may be determined based on the projection of the reflection vector on the X-axis, and/or a relative Y-axis angle may be determined based on the projection of the reflection vector on the Y-axis.

In one example, the relative X-axis angle may be determined according to Equation 10, for example, based on an X-axis projection of the reflection vector, and/or a relative Y-axis angle may be determined according to Equation 10, for example, based on a Y-axis projection of the reflection vector.

In some demonstrative embodiments, the relative angle θ may be used as a correction factor to correct one or more optical parameters of the lens, for example, by analyzing an aberration created from a tilt of the lens, e.g., as described below.

In some demonstrative embodiments, application 160 may be configured to determine a correction factor for measured optical parameters of the lens, for example, by analyzing the aberration created from a tilt of the lens based on the reflections of the flash on the back surface of the lens and/or on a front surface of the lens, e.g., as described below.

In some demonstrative embodiments, the correction factor may be set, for example, for an estimated spherical power, an estimated cylindrical power and/or an estimated cylindrical axis of the lens, e.g., to compensate for a tilt of the lens.

In some demonstrative embodiments, application 160 may determine a power correction, denoted $F_{NEWSPH}$, to correct an estimated spherical power, denoted $F_{SPH}$, for example, based on the relative angle θ, e.g., as follows:

$$F_{NEWSPH} = \left(1 + \frac{\sin^2\theta}{2n}\right) F_{SPH} \qquad (11)$$

In some demonstrative embodiments, application 160 may determine a cylinder correction, denoted $C_{INDCYL}$, to correct an estimated cylindrical power, for example, based on the relative angle θ and the power correction, e.g., as follows:

$$C_{INDCYL} = F_{NEWSPH} \cdot \tan^2\theta \qquad (12)$$

Figure 5A:
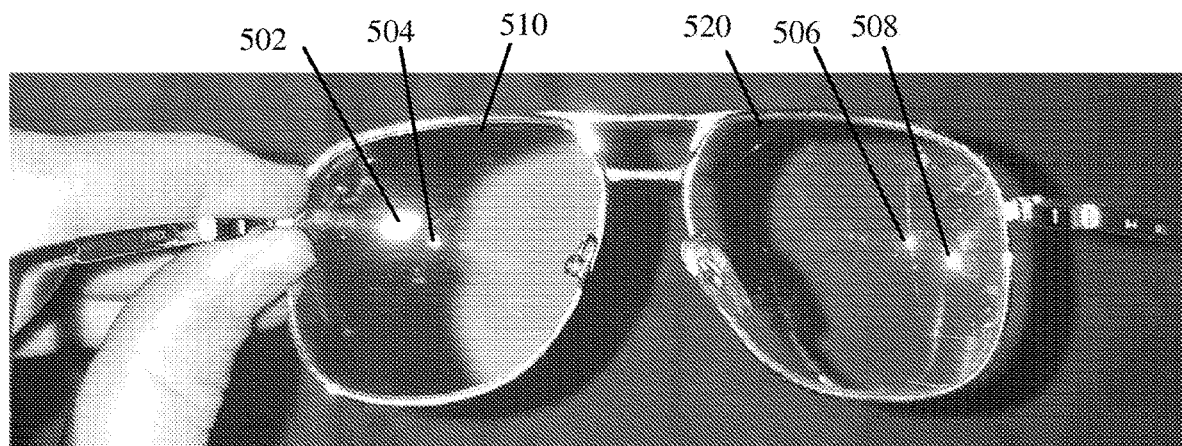
FIGS. 5A and 5B depict an image of eyeglasses, in accordance with some demonstrative embodiments
Figure 5B:
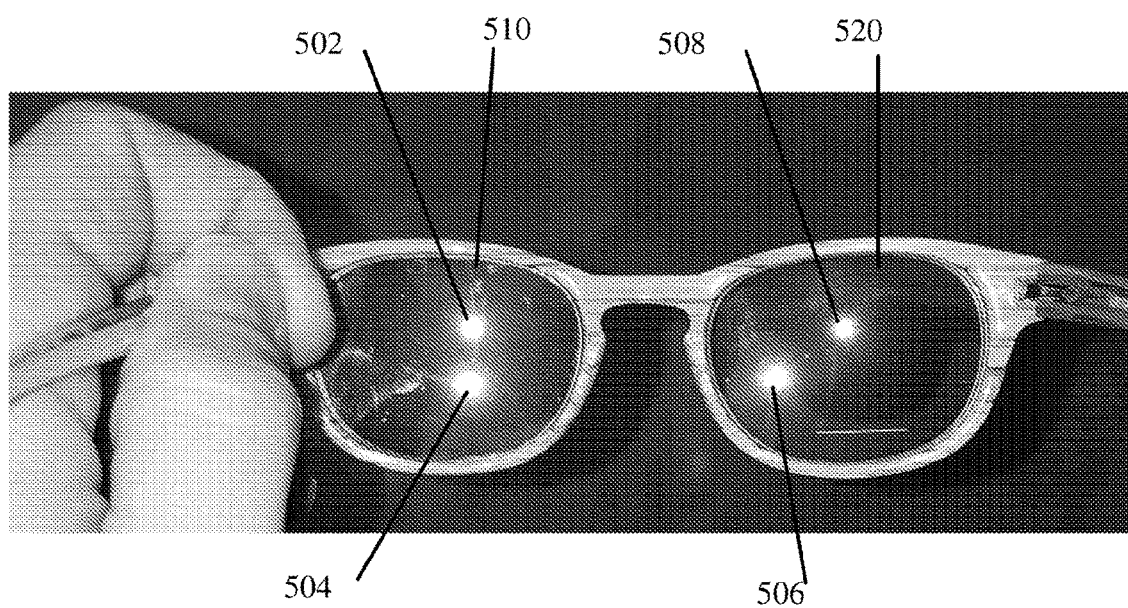

Reference is made to FIGS. 5A and 5B, which depict a first image 530 and a second image 550 of eyeglasses, in accordance with some demonstrative embodiments.

In some demonstrative embodiments, as shown in FIGS. 5A and 5B, image 530 and image 550 may include a front reflection 502 and a back reflection 504 of a flash on a right lens 510 of eyeglasses, and a front reflection 506 and a back reflection 508 of the flash on a left lens 520 of the eyeglasses.

In some demonstrative embodiments, two reflections on a lens, e.g., reflections 502 and 504 on lens 510, may indicate an angle generated between an optical axis of the lens and a camera, which captured the image.

In some demonstrative embodiments, when the two reflections are visible but do not coincide, a distance, horizontally and/or vertically, between a front reflection and a back reflection may be utilized, for example, to estimate a tilt angle of the lens from an optical axis of the lens, e.g., as described below.

In some demonstrative embodiments, additional information, e.g., a lens power, a cylinder power and/or a cylindrical axis, may be used, for example, to analyze the lens tilt with higher precision.

In one example, for a given or calculated approximate power of a lens, device 102 (FIG. 1) may be configured to determine a radius of curvature of the lens, e.g., as described below.

In another example, for a given or calculated radius of the lens and the distance of the lens from the camera, application 160 (FIG. 1) may be configured to determine an optical axis of the lens, for example, based on a displacement between the two reflections, e.g., as described below.

In some demonstrative embodiments, application 160 (FIG. 1) may be configured to determine a spherical power, a cylindrical power, and/or a cylindrical axis of the lens, e.g., as described below.

In some demonstrative embodiments, application 160 (FIG. 1) may be configured to determine the cylindrical power, the cylindrical angle and/or the spherical power of the lens, for example, based on the two reflections, e.g., as described below.

In some demonstrative embodiments, diameters of the front reflection and the back reflection may be used, for example, to measure the front and back radii of the front and back surfaces, respectively.

For example, for a given or a calculated distance of the camera from the lens and given that the lens surface acts as a mirror, application 160 (FIG. 1) may be configured to determine the radius of the mirror or lens surface, for example, by estimating a magnification of an imaged reflection of the flash.

In some demonstrative embodiments, application 160 (FIG. 1) may be configured to determine the power of the lens, for example, based on positions of the reflections.

In some demonstrative embodiments, application 160 (FIG. 1) may be configured to determine the power of the lens for a given tilt angle of the eyeglasses, for example, based on the positions of the reflections.

In some demonstrative embodiments, as shown in FIG. 5B, a vertical displacement of the front reflection 502 from the back reflection 504 of left lens 510, may indicate that the tilt of the lens 510 is around the horizontal axis.

In some demonstrative embodiments, application 160 (FIG. 1) may be configured to determine the tilt angle of the lens for a given or calculated lens power, for example, based on the positions of the reflections.

In some demonstrative embodiments, sizes of the two reflections may be directly related to the radii of the front and back lens surfaces.

In some demonstrative embodiments, the reflections may defer by a diameter size of the reflection, which may indicate a difference between the front surface and the back surface radiuses of curvature of the lens.

In some demonstrative embodiments, as shown in FIG. 5A, a difference between the front reflection 502 and the back reflection 504 on left lens 510 may result, for example, from a difference between a radii of the front surface and a radii of the back surface.

In some demonstrative embodiments, application 160 (FIG. 1) may be configured to determine the lens power, for example, based on relative spot sizes of the two reflections.

In some demonstrative embodiments, device 102 may be configured to determine an optical axis of the lens, for example, based on the two reflections, e.g., as described below.

In some demonstrative embodiments, a point in which the front reflection and the back reflection from the flash coincide may mark the optical axis of the lens, e.g., as described below.

In one example, an on axis object may always be imaged on the optical axis of the lens, therefore no matter what different radius of curvatures the front surface and the back surface of the lens have, both images of the reflections may overlap, e.g., since both reflections are imaged on the optical axis.

Figure 6:
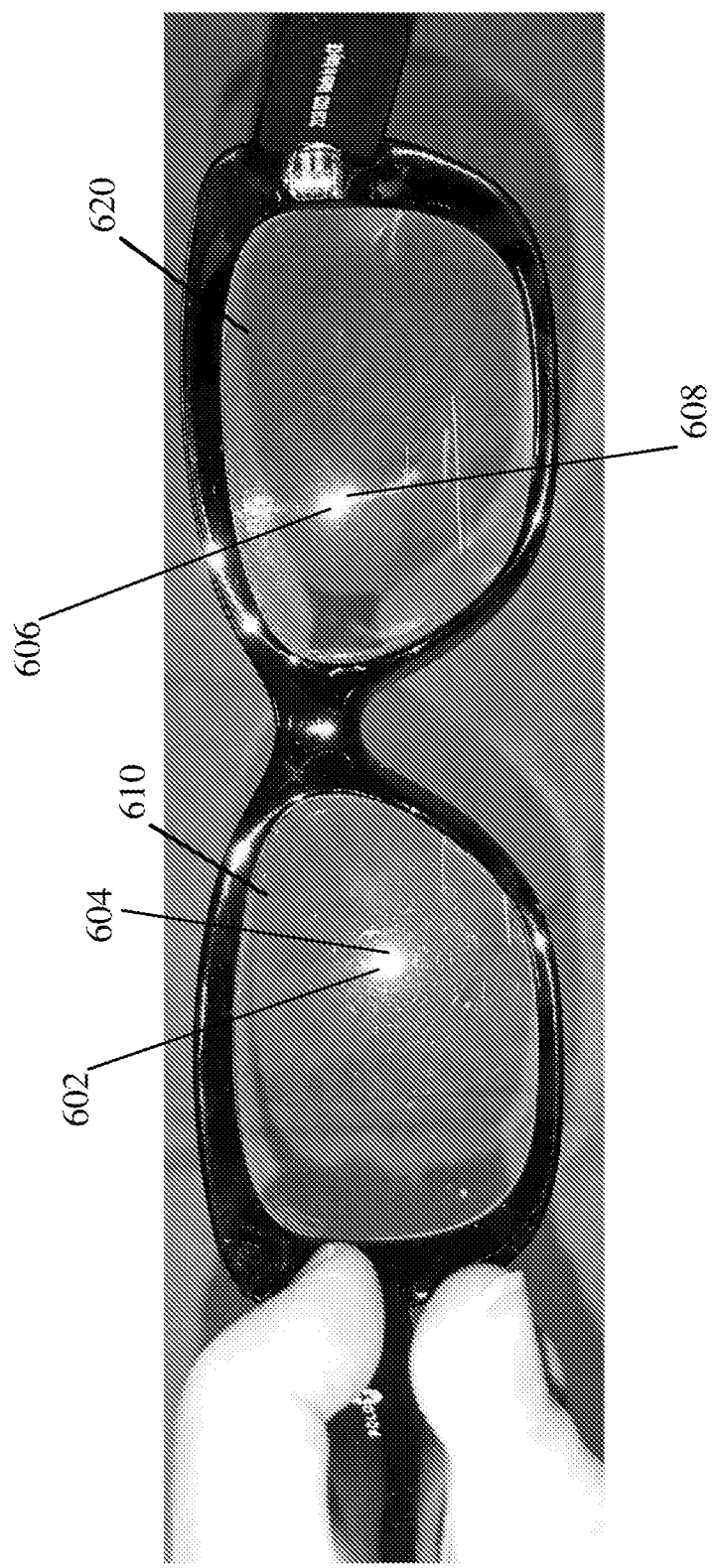
FIG. 6 depicts an image of eyeglasses, in accordance with some demonstrative embodiments FIG. 7 schematically illustrates a reflection scheme, in accordance with some demonstrative embodiments.

Reference is made to FIG. 6, which depicts an image of a front reflection 602 and a back reflection 604 of a flash on a right lens 610 of eyeglasses, and a front reflection 606 and a back reflection 608 of the flash on a left lens 620 of the eyeglasses, in accordance with some demonstrative embodiments.

In some demonstrative embodiments, as shown in FIG. 6, the front reflection 602 and the back reflection 604 on the left lens 620 may coincide.

In some demonstrative embodiments, the coinciding of reflections 602 and 604 may indicate that the lens plane of lens 610 and the camera plane are parallel.

In some demonstrative embodiments, as shown in FIG. 6, the front reflection 606 and the back reflection 608 on the right lens 620 almost coincide, and may indicate a minor angle between the lens plane of lens 620 and the camera plane.

Figure 7:
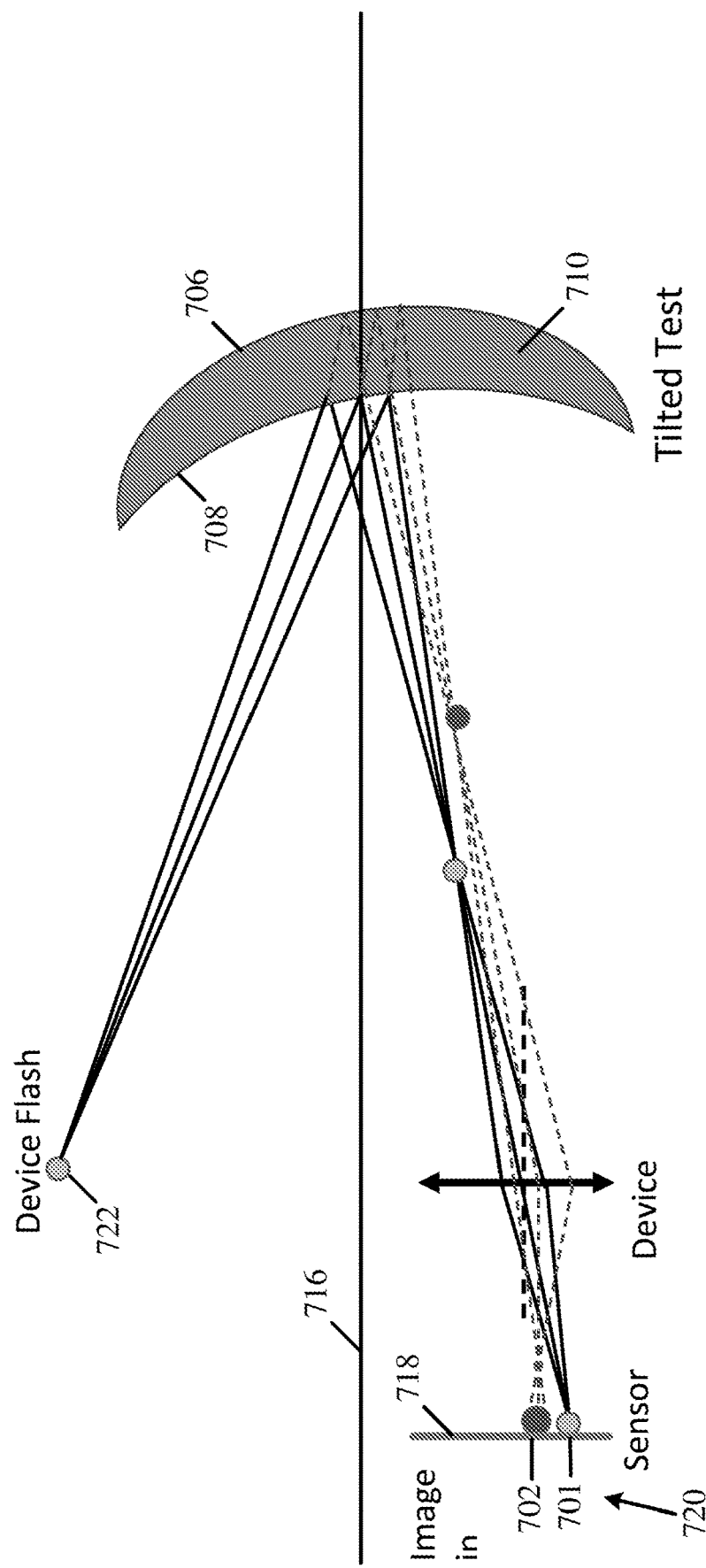

Reference is made to FIG. 7, which schematically illustrates a reflection scheme 700, in accordance with some demonstrative embodiments.

In some demonstrative embodiments, as shown in FIG. 7, two imaged reflections 720 of a flash, e.g., a first reflection 701 from a front surface 708 of a lens 710 and a second reflection 702 from a back surface 706 of lens 710, may be captured by a camera sensor 718 of a camera.

In some demonstrative embodiments, as shown in FIG. 7, imaged reflections 720 may not coincide, for example, if the camera is tilted from the optical axis 716 of the lens.

In some demonstrative embodiments, for example, if the lens 710 is located far enough from the camera, and the flash 722 is close enough to the lens 710, both reflections 701 and 702 may be imaged on the optical axis of the lens and may coincide, e.g., once the lens surface is perpendicular to the device.

Referring back to FIG. 1, in some demonstrative embodiments, application 160 may be configured to determine a pupillary distance of the eyeglasses, for example, based on the reflections.

In some demonstrative embodiments, a user of device 102 may be instructed to perform one or more operations including holding the glasses still, and aiming the flash separately to each lens of the glasses, for example, to enable application 160 to determine the pupillary distance of the eyeglasses.

In some demonstrative embodiments, application 160 may be configured to record a first position within a first lens of eyeglasses where both reflections coincide or are calculated to coincide. For example, the first position may be recorded relative to a fixed point within the eyeglasses frame.

In some demonstrative embodiments, application 160 may be configured to record a second position within a second lens of the eyeglasses where both reflections coincide or are calculated to coincide. For example, the second position may be recorded relative to the fixed point within the eyeglasses frame.

In some demonstrative embodiments, application 160 may be configured to determine a relative distance between the first position and the second position, which may be set as the pupillary distance parameter of the eyeglasses.

Figure 8:
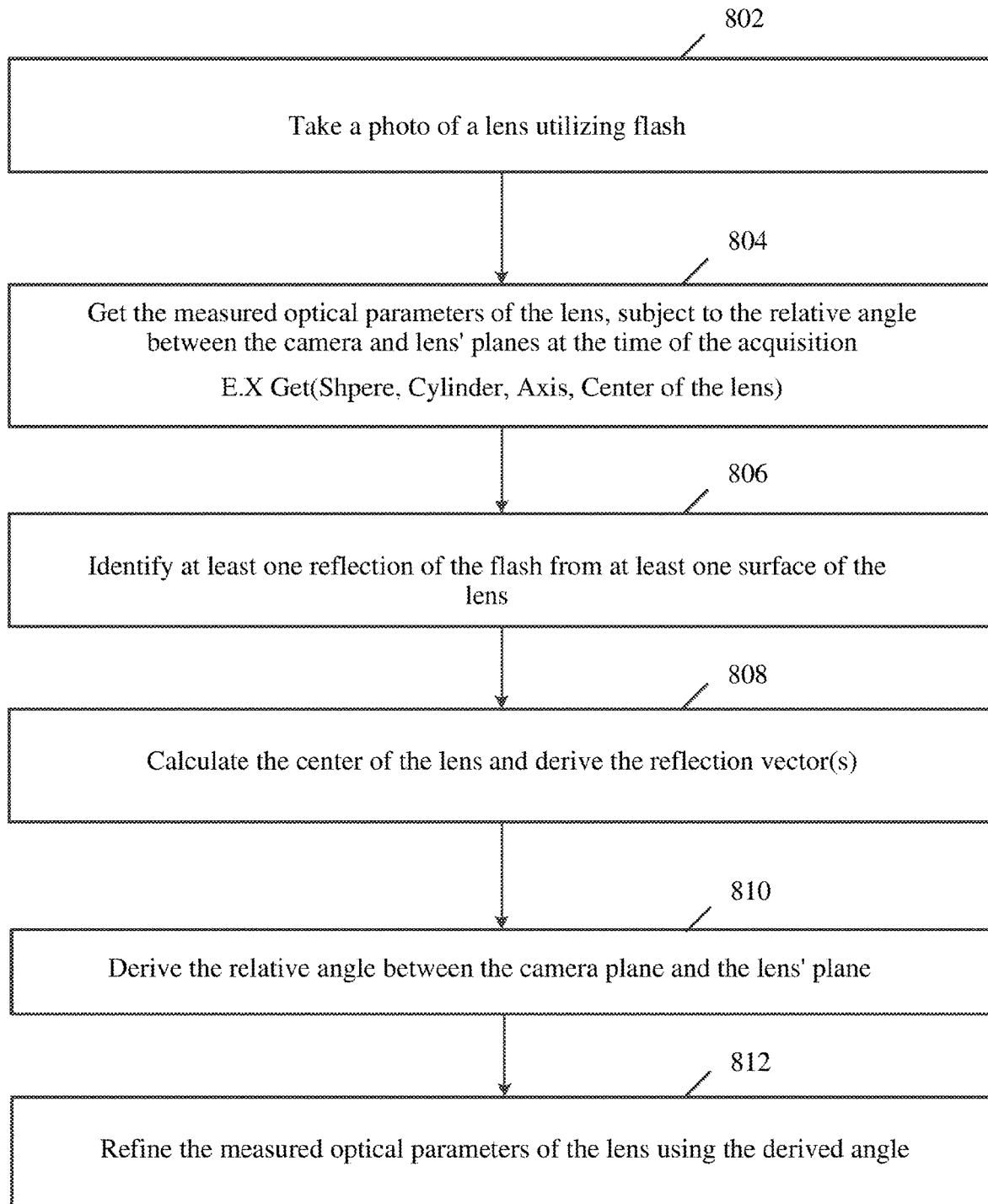
FIG. 8 is a schematic flow-chart illustration of a method of determining one or more optical parameters of a lens, in accordance with some demonstrative embodiments.

Reference is made to FIG. 8, which schematically illustrates a method of determining one or more optical parameters of a lens, in accordance with some demonstrative embodiments. For example, one or operations of the method of FIG. 8 may be performed by a system, e.g., system 100 (FIG. 1); a computing device, e.g., device 102 (FIG. 1); a server, e.g., server 170 (FIG. 1); and/or an application, e.g., application 160 (FIG. 1).

As indicated at block 802 the method may include capturing an image of a lens by a camera using a flash. For example, application 160 (FIG. 1) may instruct the user and/or may trigger capturing the image including the at least one reflection of the flash 122 (FIG. 1) on the lens the eyeglasses, e.g., as described above.

As indicated at block 804 the method may include determining one or more estimated optical parameters of the lens corresponding to a relative angle between a plane of the lens and a plane of the camera when the image is captured. For example, application 160 (FIG. 1) may determine the one or more estimated optical parameters of the lens, for example, based on the comparison between the reference object and the reference object image in the captured image, e.g., as described above.

As indicated at block 806 the method may include identifying at least one reflection of the flash from at least one surface of the lens. For example, application 160 (FIG. 1) may identify first reflection 401 (FIG. 4) from front surface 416 (FIG. 4) and/or second reflection 402 (FIG. 4) from back surface 418 (FIG. 4), e.g., as described above.

As indicated at block 810 the method may include determining the relative angle between the plane of the lens and the plane of the camera. For example, application 160 (FIG. 1) may determine the relative angle θ, for example, based on reflections 401 and/or 402 (FIG. 4), e.g., as described above.

As indicated at block 808 determining the relative angle between the plane of the lens and the plane of the camera may include determining a center of the lens and at least one reflection vector from the center of the lens to the at least one reflection, and determining the relative angle based on the center of the lens, and the reflection vector from the center of the lens to the at least one reflection. For example, application 160 (FIG. 1) may determine the relative angle θ, for example, based on lens center 406 and the reflection vector corresponding to reflections 401 and/or 402 (FIG. 4), e.g., as described above.

In other embodiments, determining the relative angle between the plane of the lens and the plane of the camera may include determining the relative location of a first reflection relative to a location of a second reflection, and determining the relative angle based on a vector between the first and second reflections. For example, application 160 (FIG. 1) may determine the relative angle θ, for example, based on locations of reflections 401 and/or 402 (FIG. 4), e.g., as described above.

As indicated at block 812 the method may include refining the estimated optical parameters of the lens based on the relative angle. For example, application 160 (FIG. 1) may determine the spherical power, the cylindrical power and/or the cylindrical axis of the lens, for example, based on the relative angle θ, e.g., according to Equations 11 and/or 12, e.g., as described above.

In some demonstrative embodiments, application 160 may be configured to determine the one or more optical parameters of the lens, for example, based on the relative angle, e.g., as described above.

In other embodiments, application 160 may be configured to determine the one or more optical parameters of the lens, for example, based on any other methods, e.g., as described below.

In some demonstrative embodiments, application 160 may be configured to determine the one or more optical parameters of the lens, for example, based on a first distance ("the camera distance") between the object and camera 118 when the image is captured via the lens, and a second distance ("the lens distance") between the object and the lens of the eyeglasses ("the eyeglasses lens") when the image is capture via the lens.

In some demonstrative embodiments, application 160 may be configured to determine the one or more optical parameters of the lens, for example, based on the magnification, e.g., as described below.

In some demonstrative embodiments, application 160 may be configured to determine the one or more optical parameters of the lens, for example, based on the first and second distances, e.g., as described below.

In some demonstrative embodiments, the lens distance may be set to be, measured to be, approximated to be, and/or assumed to be, half of the camera distance, e.g., as described below.

In other embodiments, any other relationship between the first and second distances may be set, measured, approximated, and/or assumed, e.g., as described below.

In other embodiments, the first and/or second distances may be set and/or defined based on one or more measurements and/or based on one or more images captured via the lens, e.g., as described below.

Figure 9:
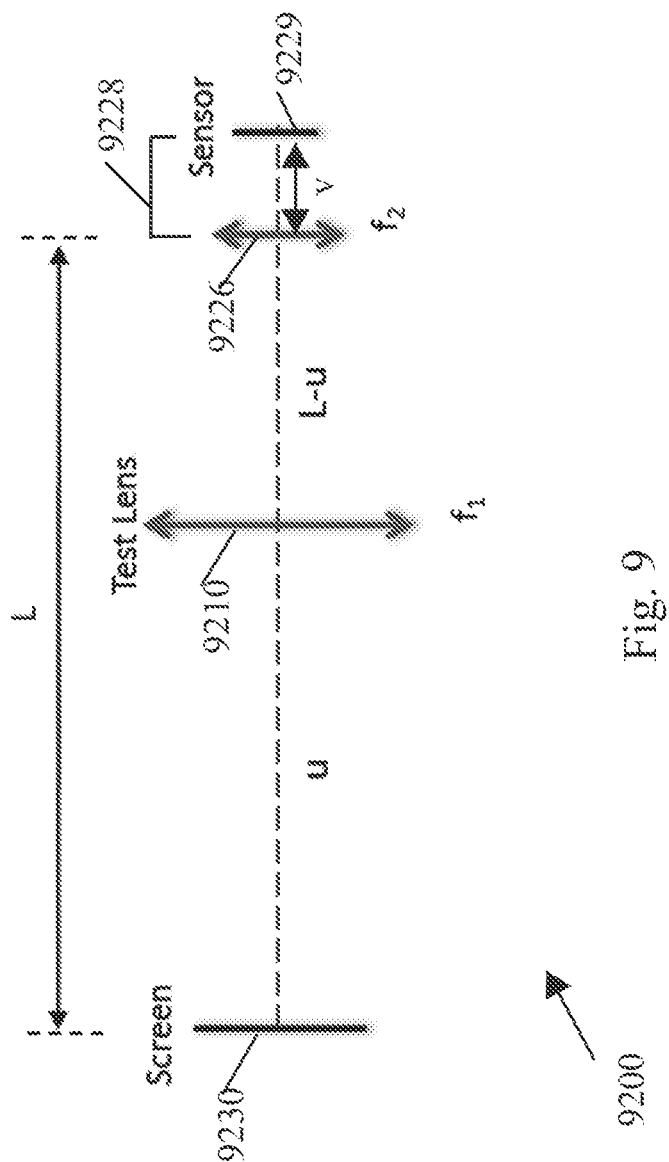
FIG. 9 is a schematic illustration of a measurement scheme, in accordance with some demonstrative embodiments.

Reference is made to FIG. 9, which schematically illustrates a measurement scheme 200, in accordance with some demonstrative embodiments. In one example, one or more elements of FIG. 1 may be arranged and/or operated according to the measurement scheme 200, one or more parameters may be determined be application 160 (FIG. 1) based on measurement scheme 200, and/or one or more measurements may be performed be one or more elements of FIG. 1 according to measurement scheme 9200, e.g., as described below.

As shown in FIG. 9, measurement scheme 9200 may include a display 9230 to display an object, an eyeglasses lens 9210 ("the lens"), a lens 9228 ("the camera lens") of a camera 9218, and/or a sensor 9229 ("the camera sensor") of the camera 9218. For example, display 9230 may perform the functionality of display 130 (FIG. 1), and/or camera 9218 may perform the functionality of camera 118 (FIG. 1).

As shown in FIG. 9, a camera distance, denoted L, may be between display 9230 and the camera 9218, e.g., the camera lens 9228; a lens distance, denoted u, may be between the eyeglasses lens 9210 and display 9230; and/or a third distance, denoted v, may be between the camera lens 9228 and the camera sensor 9229.

As shown in FIG. 9, the lens 9210 may have a focal length, denoted $f_1$, and/or the camera lens 9228 may have a focal length, denoted $f_2$.

In some demonstrative embodiments, the following equations may be applied, for example, if the lens 9210 includes a negative lens.

In some demonstrative embodiments, positive values for $f_1$ may be used, for example, if lens 9210 include a negative lens, e.g., as described below.

In some demonstrative embodiments, negative values for $f_1$, e.g., $-f_1$, may be used, for example, if lens 9210 includes a positive lens.

In some demonstrative embodiments, according to measurement scheme 9200, one or more relationships may be applied, e.g., as follows:

$$\frac{1}{u} + \frac{1}{v} = \frac{1}{f_1} \tag{13}$$

$$v = \frac{f_1 u}{u - f_1}$$

$$M_1 \equiv \frac{v}{u} = \frac{f_1}{u - f_1}$$

In some demonstrative embodiments, sensor 9229 may sense the object on the display 9230 at a new location, denoted u', e.g., as follows:

$$u' = \frac{-f_1 u}{u - f_1} + (L - u) \tag{14}$$

In some demonstrative embodiments, a magnification, denoted $M_2$, of the camera lens 9228, may be determined, e.g., as follows:

$$M_2 = \frac{f_2}{u' - f_2} = \frac{f_2}{\frac{-f_1 u}{u - f_1} + (L - u) - f_2} \tag{15}$$

In some demonstrative embodiments, a total magnification, denoted $M_T$, according to the measurement scheme 9200 may be determined, e.g., as follows:

$$M_T = M_1 * M_2 = \tag{16}$$

$$\frac{f_2 f_1}{-f_1 u + (L - u)(u - f_1) - f_2(u - f_1)} = \frac{f_2 f_1}{Lu - Lf_1 - u^2 - f_2(u - f_1)}$$

wherein $M_1$ denotes a magnification of the lens 210.

In some demonstrative embodiments, the magnification, denoted $M_0$, at a location u=0 may be, e.g., as follows:

$$M_0 = \frac{f_2}{L - f_2} \tag{17}$$

In some demonstrative embodiments, the magnification $M_0$ may be equal to a magnification without the lens 9210.

In some demonstrative embodiments, a relative magnification, denoted $M_R$, may be determined, e.g. as follows:

$$M_R = \frac{M_T}{M_0} = \frac{f_1(f_2 - L)}{L(u - f_1) - u^2 + f_2 f_1 - f_2 u} \tag{18}$$

In some demonstrative embodiments, a largest magnification of measurement scheme 9200 may occur at a position, at which the relative magnification $M_R$ satisfies one or more conditions, e.g., as follows:

$$\frac{dM_R}{du} = 0 \tag{19}$$

$$\frac{dM_R}{du} = -\frac{f_1(f_2 - L)}{[L(u - f_1) - u^2 + f_2 f_1 - f_2 u]^2} * (L - 2u - f_2) = 0$$

In other embodiments, the largest magnification may occur at a position, denoted $u_{ideal}$, which satisfies, e.g., at least the following criterion:

$$u_{ideal} = \frac{L - f_2}{2} \tag{20}$$

In some demonstrative embodiments, since $L \gg f_2$ the best position for the largest magnification may be, e.g., approximately, at a middle between display 9230 and the camera lens 9228.

In some demonstrative embodiments, the relative magnification $M_R$, for example, at the position $u_{1deal}$, e.g., at the middle between display 9230 and the camera lens 9228, may be determined, e.g., as follows:

$$M_R(u = u_{ideal}) \approx \frac{f_1(L - f_2)}{L(0.5L - f_1) - 0.25L^2 + f_2 f_1 - 0.5 f_2 L} \quad (21)$$

In some demonstrative embodiments, a spherical power of lens 9210 may be extracted for a given camera distance L, for example, by measuring the relative magnification $M_R$, e.g., preferably at the position $u_{1deal}$ peak, or at any other point.

In some demonstrative embodiments, if the lens 9210 has a cylinder, the relative magnification formula, e.g., according to Equation 21, may be applied to each of the cylinder axes separately.

In some demonstrative embodiments, the distance U between the display 9230 and the lens 9210 may be determined, for example, using the magnification formula, e.g., according to Equation 21.

In some demonstrative embodiments, since the maximum magnification is given at the middle between display 9230 and lens 9228, capturing several images, when the lens 9210 is located at different distances between display 9230 and the camera lens 9228, may enable evaluating the maximum magnification, for example, by fitting, extrapolating or sampling, and/or from a known/calculated/measured camera distance L of the camera from the display 9230.

In some demonstrative embodiments, the focal length $f_1$ of lens 9210 may be determined, for example, based on the total magnification $M_T$, and/or the relative magnification $M_R$, e.g., as follows:

$$f_1 = \frac{Lu - u^2 - f_2 u}{f_2 / M_T + L - f_2} \quad (22)$$

or $$f_1 = \frac{Lu - u^2 - f_2 u}{f_2 / M_R - L / M_R + L - f_2}$$

In some demonstrative embodiments, a focus of the camera 9218 may be fixed, for example, on the distance of the camera to display 9230.

In some demonstrative embodiments, the camera 9218 may focus on display 9230 and lock the focus, e.g., before inserting the lens 9210 in front of camera 9218.

In other embodiments, the focusing on display 9230 may be performed, for example, after placing the lens 9210, e.g., between display 9230 and the camera 9218, e.g., by focusing on the parts on display 9230 that do not include the frame of the eyeglasses, e.g., including the lens 9210, in the field of view (FOV) of the camera 9218. For example, image processing techniques may be implemented to determine where in the FOV should the camera 9218 perform the autofocus (AF).

In another embodiment, the area in the FOV of the camera 9218 to perform the AF may be selected manually, for example, by instructing the user to select the area in the FOV of the camera 9218, in which the camera may focus.

In some demonstrative embodiments, the magnification and the extraction of the focal power of lens 9210 may be determined, for example, by focusing only on display 9230.

In some demonstrative embodiments, camera 9218 may be focused using the object on display 9230, for example, without the lens 9210, e.g., as follows:

$$v_s = \frac{L f_2}{L - f_2} \quad (23)$$

In some demonstrative embodiments, the lens 9210 may form a virtual object located at the distance u' from camera lens, e.g., as follows:

$$u' = L - u + \frac{f_1 u}{f_1 + u} \quad (24)$$

In some demonstrative embodiments, the total magnification $M_T$ in the system may be determined, e.g., as follows:

$$M_T = M_1 M_2 = \frac{f_1}{f_1 + u} \times \frac{\frac{L f_2}{L - f_2}}{L - u + \frac{f_1 u}{f_1 + u}} \quad (25)$$

In some demonstrative embodiments, the focal length $f_1$ of the lens 9210 may be determined, e.g., as follows:

$$f_1 = \frac{(L - u) M_T u}{\frac{L f_2}{L - f_2} - L M_T} \quad (26)$$

In some demonstrative embodiments, the power, denoted $P_1$, of the lens 9210 may be determined, e.g., as follows:

$$P_1 = \frac{1}{f_1} \quad (27)$$

Figure 10:
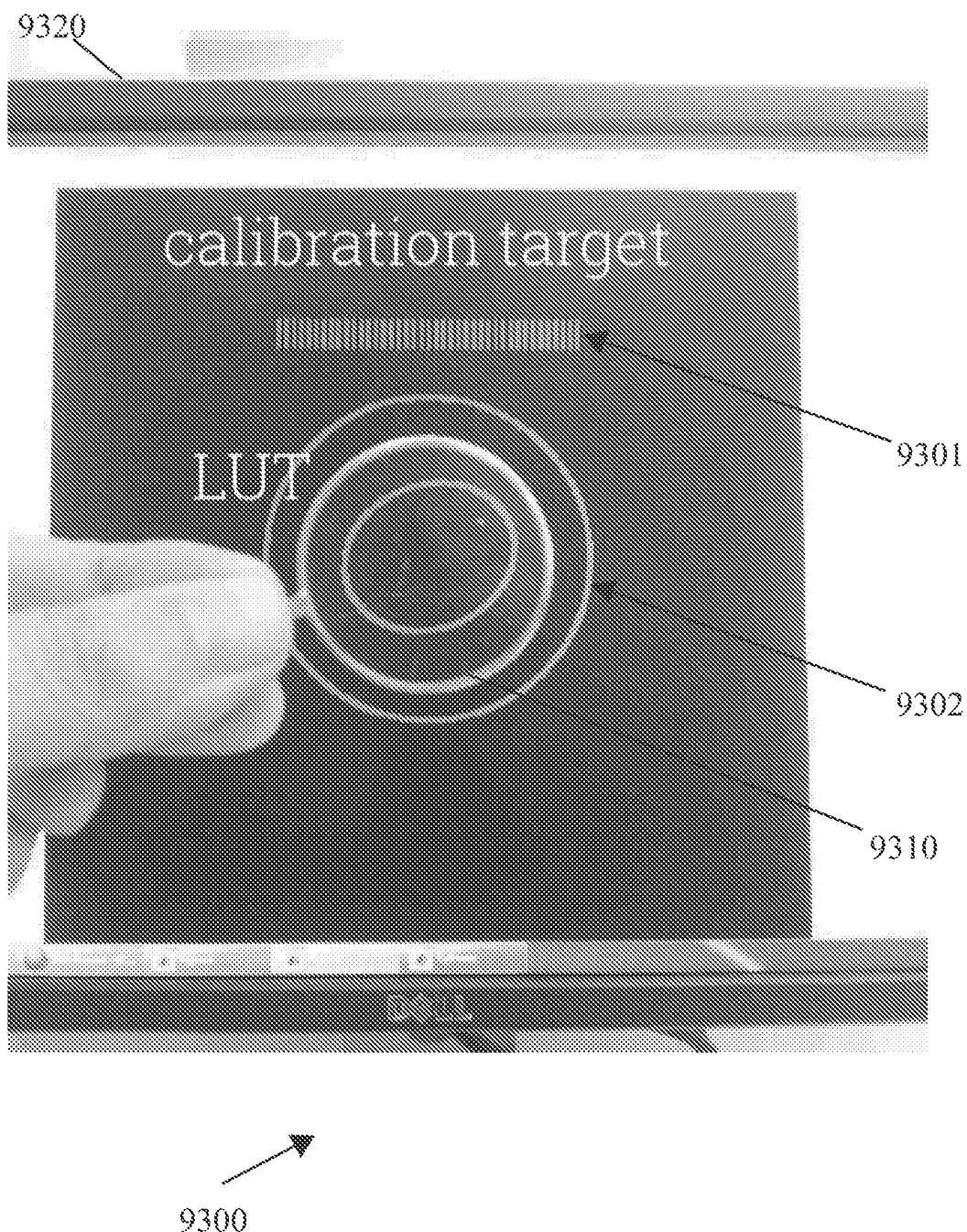
FIG. 10 is a schematic illustration of an image of an object displayed on a display, in accordance with some demonstrative embodiments.

Reference is made to FIG. 10, which schematically illustrates an image 9300 of an object 9302 displayed on a display 9330. For example, display 9330 may perform the functionality of display 130 (FIG. 1).

In some demonstrative embodiments, as shown in FIG. 10, object 9302 may include a circle.

In some demonstrative embodiments, image 9300 of object 9302 may be captured by a camera via a lens 9310. For example, camera 118 (FIG. 1) and/or camera 9218 (FIG. 9) may capture object 9302 via lens 9310, e.g., lens 9210 (FIG. 9).

As shown in FIG. 10, when image 9300 of object 9302 is captured through lens 9310, lens 9310 may change the magnification of object 9302, e.g., in a different way for various angles.

As shown in FIG. 10, when an image of object 9302 is captured through lens 9310, image 9300 may be seen as an ellipsoid.

In some demonstrative embodiments, the camera may be focused to a calibration object 9301, which may be placed outside of the field of view of lens 9310.

In some demonstrative embodiments, as shown in FIG. 10, lens 9310 may not affect an image of the calibration object 9301, e.g., since calibration object 9301 is placed outside of the FOV of lens 9310.

Reference is made to FIGS. 11A, 11B, and 11C and 11D which schematically illustrate four respective relative magnification graphs, in accordance with some demonstrative embodiments.

In one example, the camera distance L, e.g., between camera 9218 (FIG. 9) and display 230 (FIG. 9), may be equal to 50 cm, and the focal length $f_2$, e.g., of lens 228 (FIG. 9), may be equal to 3.7 mm. In other embodiments, any other distances may be used.

In some demonstrative embodiments, the four graphs of FIGS. 11A, 11B, and 11C and 11D depict the relative magnification as a function of a distance of a lens, e.g., lens 9210 (FIG. 9), from a camera sensor, e.g., sensor 9229 (FIG. 9).

In some demonstrative embodiments, a graph of FIGS. 11A, 11B, and 11C and 11D depicts a plurality of magnification curves corresponding to a plurality of different lenses.

In some demonstrative embodiments, the plurality of different lenses may correspond to a plurality of diopter intervals within a certain range of diopters.

For example, a magnification curve may represent a magnification of a lens having a specific diopter from the certain range of diopters as a function of the distance of the lens from the camera.

Figure 11A:
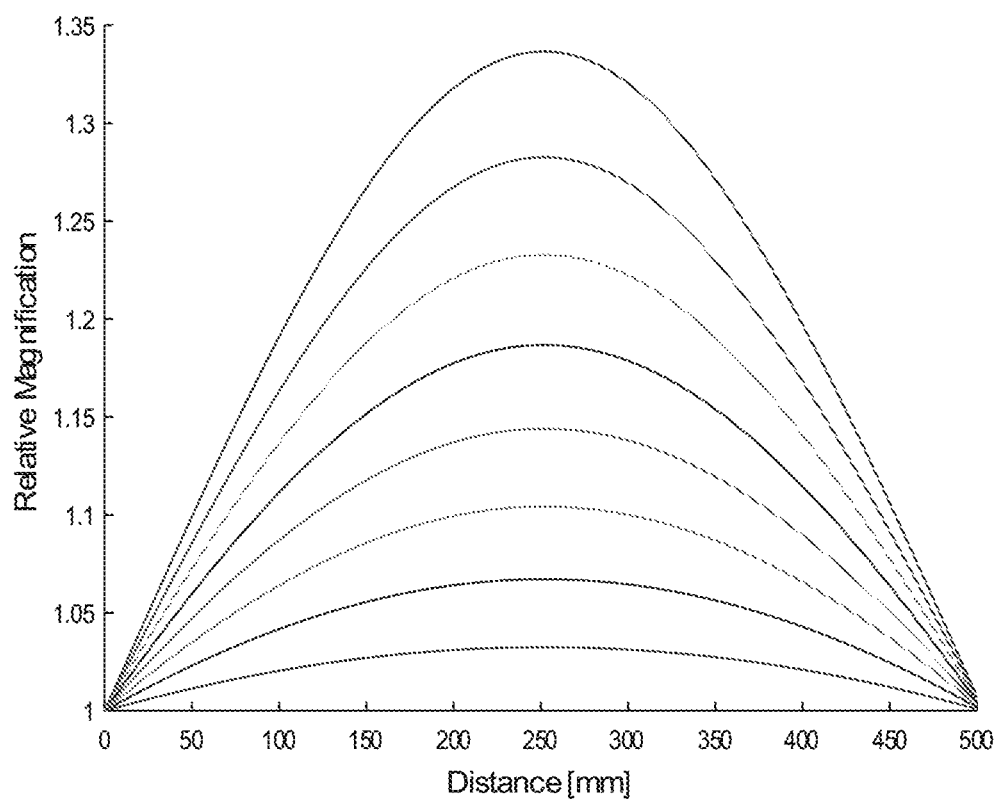
FIGS. 11A, 11B, and 11C and 11D are schematic illustrations of four respective relative magnification graphs, in accordance with some demonstrative embodiments.

In some demonstrative embodiments, the plurality of magnification curves of FIG. 11A may correspond to a plurality of lenses having a lens power of between 0.25D and 2D, at 0.25 diopter intervals.

Figure 11B:
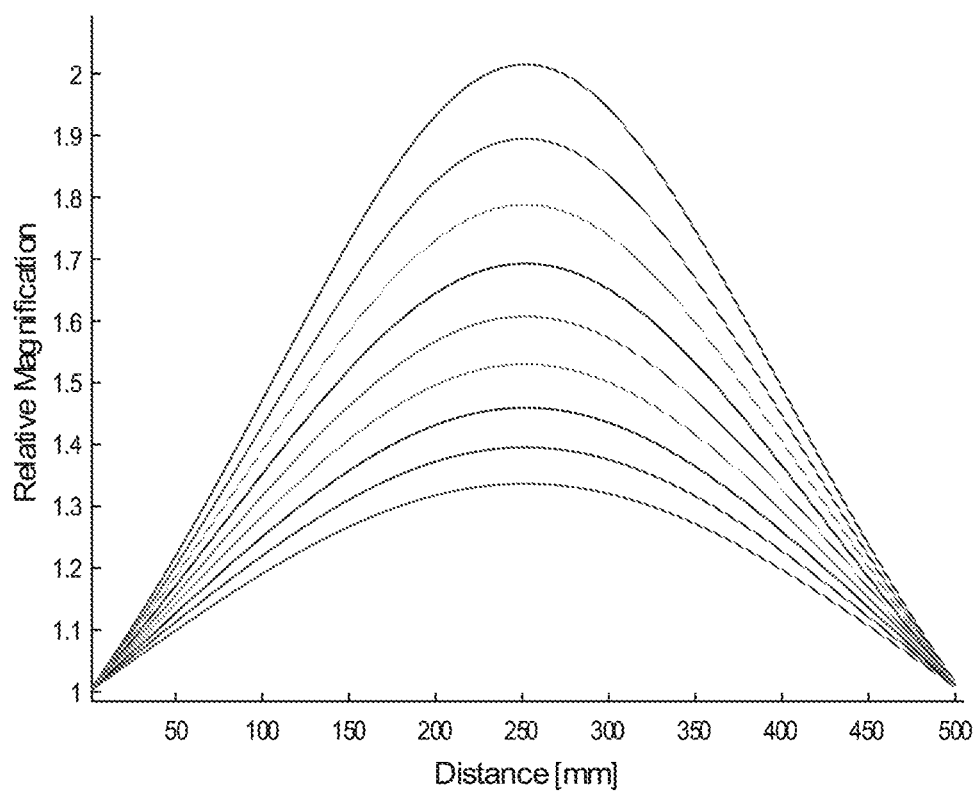

In some demonstrative embodiments, the plurality of magnification curves of FIG. 11B may correspond to a plurality of lenses having a lens power of between 2D and 4D, at 0.25 diopter intervals.

Figure 11C:
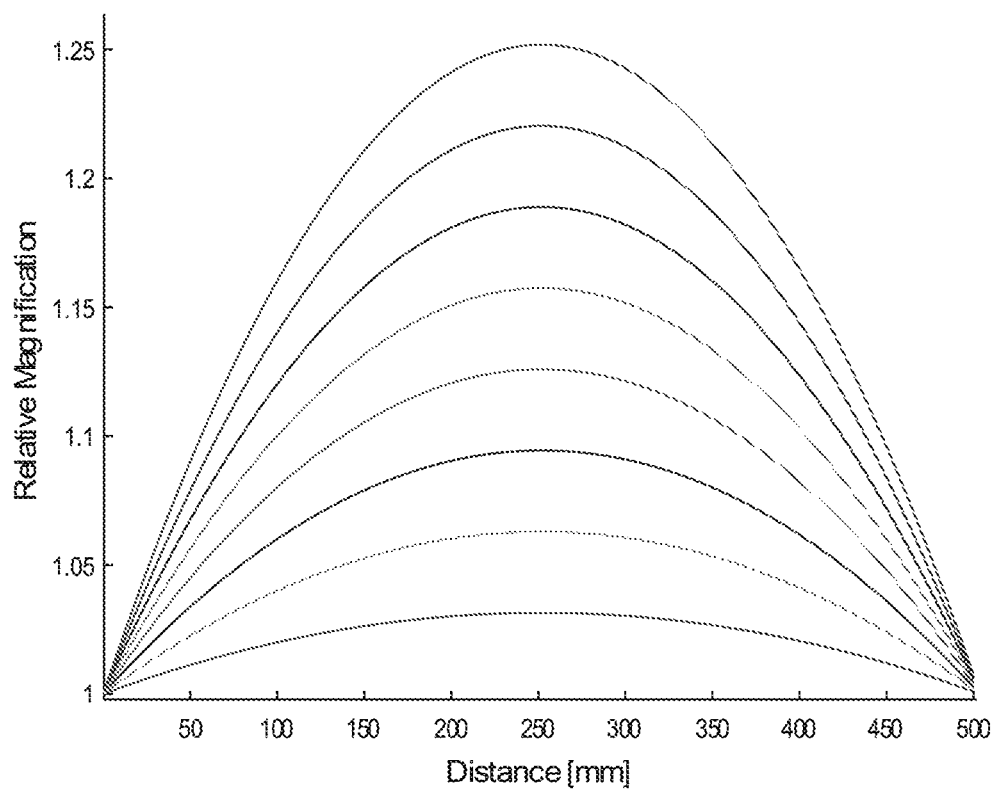

In some demonstrative embodiments, the plurality of magnification curves of FIG. 11C may correspond to a plurality of lenses having a lens power of between −0.25D and −2D, at 0.25 diopter intervals.

Figure 11D:
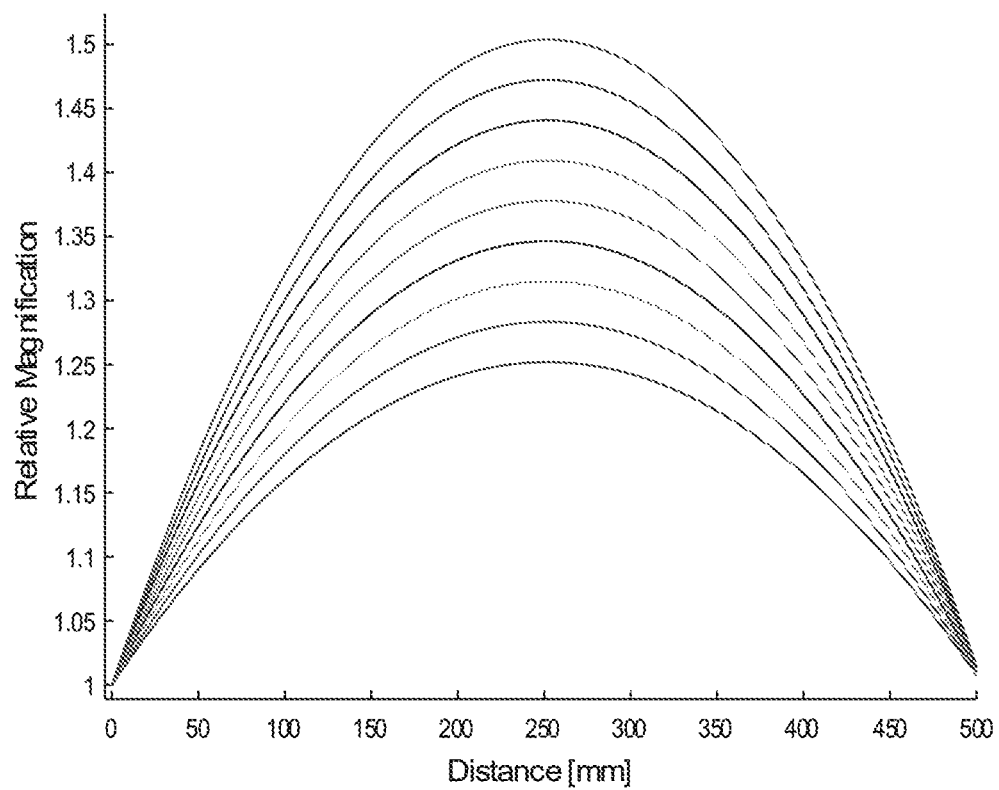

In some demonstrative embodiments, the plurality of magnification curves of FIG. 11D may correspond to a plurality of lenses having a lens power of between −2D and −4D, at 0.25 diopter intervals.

In other embodiments, any other curves may be used with respect to any other diopter ranges and/or any other diopter intervals.

In one example, a lens may have a lens power of −4 diopters. According to this example, it may be expected that the lens may have a maximal relative magnification of 1.5.

In another example, a lens may have a lens power of −4D with a cylinder power of +0.25D. According to this example, it may be expected that the lens may have a maximal relative magnification of 1.5 at a first axis, and a relative magnification of 1.47 at a second axis.

As shown in FIGS. 11A, 11B, and 11C and 11D, a change of few percent in magnification may be expected for a lens of 0.25 diopter.

In one example, a centimeter size object on the display 9230 (FIG. 10) may occupy a few hundreds of pixels on the camera sensor. Accordingly, a change of a few percent in a size of the object may result in a change of a few pixels, which may be traceable.

Referring back to FIG. 1, in some demonstrative embodiments, one or more procedures, operations, and/or methods may be performed to measure the one or more optical parameters of the lens, e.g., as described below.

In some demonstrative embodiments, the one or more operations may include placing the lens of the eyeglasses between camera 118 and display 180.

In some demonstrative embodiments, parameters as a lens power, a lens cylindrical power, a lens cylinder angle, and/or any other parameters of the eyeglasses lens may be determined, for example, by tracking the change of the image captured by camera 118 via the lens.

In some demonstrative embodiments, determining the one or more optical parameters of the lens may be based for example, on the camera distance, e.g., between the object, which is displayed on display 130, and camera 118; the lens distance, e.g., between the object and the lens; and/or a detected change in the image, e.g., as described below.

In some demonstrative embodiments, application 160 may utilize the one or more operations to determine the one or more optical parameters of the lens, for example, based on a magnification between an imaged dimension of the object and a respective reference dimension of the object, which may be displayed on display 130, e.g., as described below.

In some demonstrative embodiments, application 160 may be configured to determine a spherical power of the lens based on the magnification, e.g., as described below.

In some demonstrative embodiments, application 160 may be configured to determine a cylindrical axis of the lens, for example, based on a maximal magnification axis of a plurality of axes in the image, at which a magnification between the imaged dimension and the reference dimension is maximal, e.g., as described below.

In some demonstrative embodiments, application 160 may be configured to determine the cylindrical power of the lens, for example, based on the maximal magnification axis, and a minimal magnification axis of the plurality of axes in the image, at which a magnification between another imaged dimension and another respective reference dimension of the object is minimal, e.g., as described below.

In some demonstrative embodiments, application 160 may be configured to determine the cylindrical power of the lens, for example, based on a first magnification at the minimal magnification axis, and a second magnification at the maximal magnification axis, e.g., as described below.

In some demonstrative embodiments, application 160 may be configured to determine the one or more optical parameters of the lens, for example, based on an extremum magnification image, e.g., a maximal or minimal magnification image, which may be selected from a plurality of magnification images, e.g., as described below.

In some demonstrative embodiments, the extremum magnification image of the plurality of images, may include an image in which a magnification between the imaged dimension and the reference dimension is maximal or minimal.

In some demonstrative embodiments, application 160 may be configured to process a plurality of images of the object captured via the lens at a respective plurality of camera distances, e.g., between the camera and the object, while the lens distance is constant. For example, application 160 may be configured to instruct the user of the eyeglasses to move camera 118 backward and/or forward from display 130, while the eyeglasses remain static with respect to display 130.

In some demonstrative embodiments, application 160 may be configured to determine an extremum magnification image of the plurality of images, which may have an extremum magnification between the imaged dimension and the reference dimension.

In some demonstrative embodiments, application 160 may be configured to determine the one or more optical parameters of the lens, for example, based on the extremum magnification image, e.g., as described below.

In some demonstrative embodiments, application 160 may be configured to process a plurality of images of the object captured via the lens at a respective plurality of lens distances, e.g., between the lens and the object, while the camera distance is constant. For example, application 160 may be configured to instruct the user eyeglasses to move the eyeglasses backward and/or forward between camera 118 and display 130, while the camera 118 remains static with respect to display 130.

In some demonstrative embodiments, application 160 may be configured to determine an extremum magnification image of the plurality of images, which provides n extremum of the magnification between the imaged dimension and the reference dimension.

In some demonstrative embodiments, application 160 may be configured to determine the one or more optical parameters of the lens, for example, based on the extremum magnification image, e.g., as described below.

In some demonstrative embodiments, application 160 may be configured to determine the one or more optical parameters of the lens, for example, based on the magnification, and another magnification of at least one dimension in an image of a calibration object having known dimensions, e.g., calibration object 9301 (FIG. 10).

In some demonstrative embodiments, the image of the calibration object may be captured not via the lens, e.g., as described above with reference to FIG. 10.

In some demonstrative embodiments, application 160 may be configured to determine the first distance, e.g., between the object and camera 118, and/or the second distance, e.g., between the object and the lens, based on one or more distance measurements, estimations, and/or calculations, e.g., as described below.

In some demonstrative embodiments, the first distance and/or the second distance may be predefined, e.g., as described below.

In some demonstrative embodiments, the second distance may be set to include a distance between the object and the lens when temple arms of the eyeglasses are extended to a plane of the object.

In some demonstrative embodiments, application 160 may be configured to determine the first distance and/or the second distance, for example, based on acceleration information corresponding to an acceleration of camera 118 and/or device 102, e.g., when one or more images are captured by camera 118.

In some demonstrative embodiments, device 102 may include an accelerometer 126 configured to provide to application 160 the acceleration information of camera 118 and/or device 102.

In some demonstrative embodiments, application 160 may be configured to determine the first distance and/or the second distance, for example, based on one or more three-dimensional (3D) coordinates of the object.

In some demonstrative embodiments, device 102 may include a 3D sensor configured to determine one or more three-dimensional (3D) coordinates of an object.

In some demonstrative embodiments, application 160 may be configured to determine the first distance, for example, based on the object and at least one dimension in the image of a calibration object having known dimensions, e.g., calibration object 301 (FIG. 10).

In some demonstrative embodiments, application 160 may be configured to determine the one or more optical parameters of the lens, for example, according to one or more operations, e.g., as described below.

Figure 12:
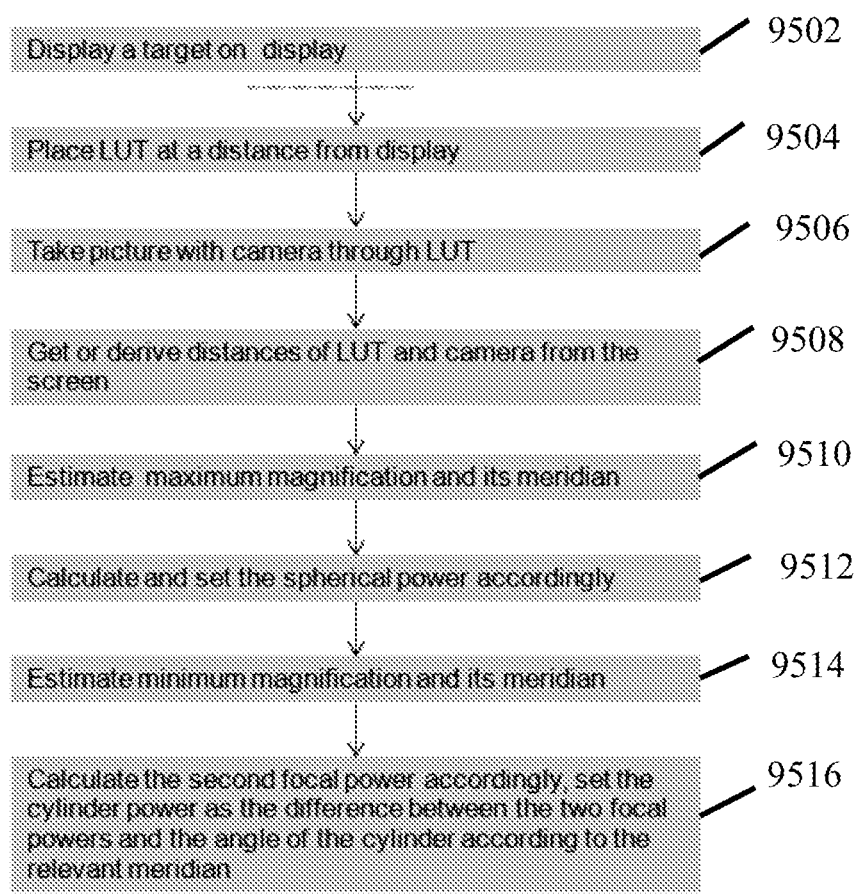
FIG. 12 is a schematic illustration of a method of determining one or more optical parameters of a lens, in accordance with some demonstrative embodiments.

Reference is made to FIG. 12, which schematically illustrates a method of determining one or more optical parameters of a lens, in accordance with some demonstrative embodiments. For example, one or operations of the method of FIG. 12 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

As indicated at block 9502, the method may include displaying an object on a display. For example, application 160 (FIG. 1) may cause display 130 (FIG. 1) to display the object, e.g., as described above.

As indicated at block 9504, the method may include placing an eyeglasses lens (also referred to as "Lens Under Test (LUT)") at a certain distance from the display. For example, application 160 (FIG. 1) may instruct the user to place the lens at the lens distance from the display 130 (FIG. 1), e.g., as described above.

As indicated at block 9506, the method may include capturing with a camera through the eyeglasses lens an image of the object displayed on the display. For example, application 160 (FIG. 1) may cause camera 118 (FIG. 1) to capture the image of the object, for example, via the lens, e.g., as described above.

As indicated at block 9508, the method may include determining a first distance of the camera from the display, e.g., the camera distance, and a second distance of the eyeglasses lens from the display, e.g., the lens distance. For example, application 160 (FIG. 1) may determine the lens distance and the camera distance, e.g., as described above.

In some demonstrative embodiments, the camera distance and/or the lens distance may be estimated, given and/or advised to the user.

As indicated at block 9510, the method may include estimating a maximal magnification of the object for a certain meridian, e.g., as described below with respect to an exemplary object. For example, application 160 (FIG. 1) may estimate a magnification of the object for the certain meridian, e.g., as described above.

As indicated at block 9512, the method may include calculating a focal power of the lens for the certain meridian. For example, application 160 (FIG. 1) may determine a focal power of the eyeglasses lens for the corresponding axis, e.g., as described above.

As indicated at block 9514, if the magnification varies for various meridians, the method may include, locating the minimum magnification and a corresponding meridian and calculating its focal power. For example, application 160 (FIG. 1) may determine that the magnification varies for a few meridians and, accordingly application 160 (FIG. 1) may the minimal magnification axis and the magnification of the minimal magnification axis, e.g., as described below.

As indicated at block 9516, the method may include determining the cylindrical power as the difference between the two focal powers and the angle of the cylinder. For example, application 160 (FIG. 1) may determine the cylindrical power of the lens, for example, based on the first magnification at the minimal magnification axis, and the second magnification at the maximal magnification axis, e.g., as described below.

In some demonstrative embodiments, application 160 (FIG. 1) may be configured implement one or more techniques to perform the operation of block 508, e.g., to determine the camera distance and/or the lens distance.

In some demonstrative embodiments, application 160 (FIG. 1) may be configured to perform one or more operations to determine the camera distance and/or the lens distance, e.g., as described below.

In some demonstrative embodiments, determining the camera distance and/or the lens distance may include displaying a calibration object having a known size on the display, capturing an image of the display with the camera, and evaluating the distance based on the captured image of the calibration object.

In some demonstrative embodiments, determining the camera distance and/or the lens distance may include measuring the distance from the camera to the display with a reference known size object, e.g., such as a Letter, an A4 paper, a meter, and/or the like.

In some demonstrative embodiments, determining the camera distance and/or the lens distance may include measuring the displacement of the camera from the display, for example, by integrating accelerometer data, e.g., from the accelerometer 126 (FIG. 1).

In some demonstrative embodiments, determining the camera distance and/or the lens distance may include using a 3D sensor or a depth camera, for example, to determine the camera distance and/or the lens distance.

Referring back to FIG. 1, in some demonstrative embodiments, application 160 (FIG. 1) may be configured to determine the optical parameters of the lens based on one or measurement schemes, e.g., as described below.

In some demonstrative embodiments, a first measurement scheme may include placing the lens at the middle between the camera 118 and the display 130, for example, such that the lens distance is approximately half of the camera distance, e.g., as described below.

In some demonstrative embodiments, a second measurement scheme may include placing the eyeglasses with temple arms extended against the display 130, for example, to locate the eyeglasses at a predefined rough distance, for example, such that the lens distance is based on the length of the arm temples, for example, about 14.5 cm, e.g., as described below.

In some demonstrative embodiments, a third measurement scheme may include keeping the camera 118 at a relatively fixed distance from the display 130 and capturing images through the lens, while moving the lens from the camera 118 towards the display 130 and/or backwards from display 130 to the camera 118.

In some demonstrative embodiments, the lens distance may be determined to be approximately half of the camera distance, for example, at a location, at which an image captured via the lens has a maximum relative magnification, e.g., as described below.

In some demonstrative embodiments, a fourth measurement scheme may include placing the eyeglasses lens at a certain distance from the display, and capturing a few images by the camera while changing the camera position, for example, to determine the location, at which an image captured via the lens has maximum relative magnification, e.g., as described below.

In some demonstrative embodiments, a fifth measurement scheme may include placing the frame of the eyeglasses at a certain distance from the display, capturing an image through the lens where the camera is located at a distance from the lens, and determining the lens distance from a size of the frame of the eyeglasses in an image captured by the camera, e.g., as described below.

In some demonstrative embodiments, a sixth measurement scheme may include placing the eyeglasses at a known distance from the display, for example, by extending the temple arms, or by using any other method to determine a known distance, and placing the camera at another known distance to capture an image through the lens.

In some demonstrative embodiments, according to the sixth measurement scheme the lens distance may be known, and the camera distance may be calculated, for example, based on a known size image displayed on the display 130 and the camera parameters, e.g., as described below.

In some demonstrative embodiments, application 160 may be configured to perform one or more operations to estimate the camera distance, the lens distance and/or the one or more optical parameters of the lens, for example, according to the first measurement scheme, e.g., as described below.

Figure 13:
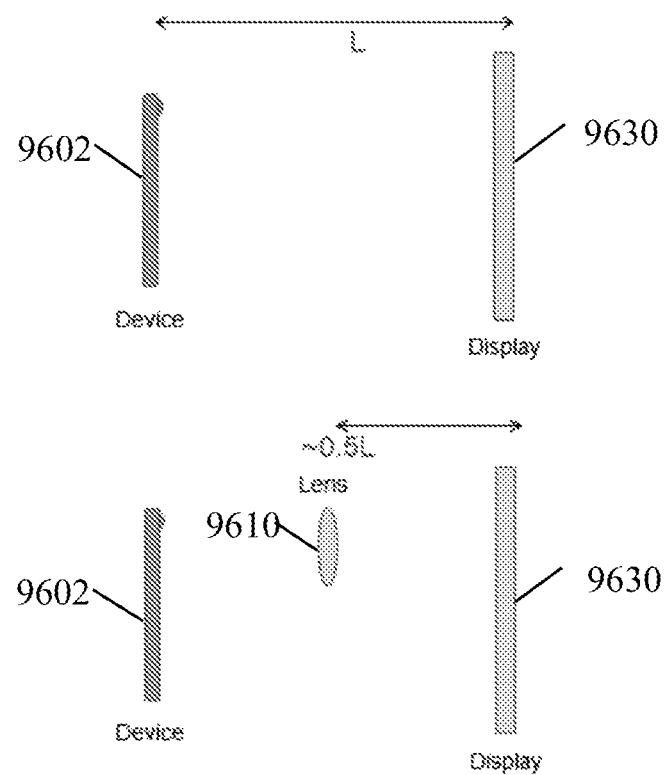
FIG. 13 is a schematic illustration of a measurement scheme, in accordance with some demonstrative embodiments.

Reference is made to FIG. 13, which schematically illustrates a measurement scheme 9600, in accordance with some demonstrative embodiments. For example, one or operations using the measurement scheme 9600 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, measurement scheme 9600 may be configured to enable to determine one or more optical parameters of a lens 9610, for example, according to the first measurement scheme.

In some demonstrative embodiments, as shown in FIG. 13, an image capturing device 9602, may be placed at a known distance, denoted L, e.g., the camera distance, from a display 9630. For example, device 9602 may perform the functionality of camera 118 (FIG. 1); and/or display 9630 may perform the functionality of display 130 (FIG. 1).

In some demonstrative embodiments, the camera distance L may be verified by the user and/or may be calculated based on an image of a calibration object, and one or more parameters of the camera, e.g., a focal length, a field of view, and/or a sensor pitch.

In some demonstrative embodiments, as shown in FIG. 13, the lens may be placed approximately midway between the device 9602 and the display 9630, e.g., at a distance, denoted 0.5L.

In some demonstrative embodiments, since a sensitivity to the positioning of the lens at the center is low, accurate estimation of the one or more optical parameters of the lens may be achieved. Positioning the lens, e.g., even within few centimeters from the middle between the camera and the display, may still enable to determine the one or more optical parameters of the lens as if the lens was positioned exactly in the middle between the camera and the display.

Figure 14:
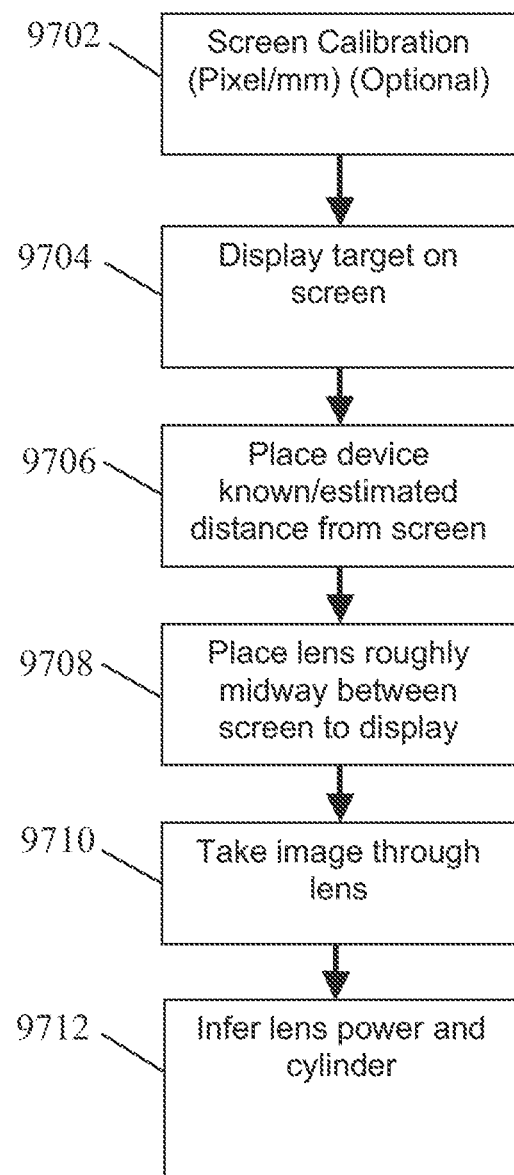
FIG. 14 is a schematic flow-chart illustration of a method of determining one or more optical parameters of a lens, in accordance with some demonstrative embodiments.

Reference is made to FIG. 14, which schematically illustrates a method of determining one or more optical parameters of a lens, in accordance with some demonstrative embodiments. For example, one or operations of the method of FIG. 14 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, one or more operations of the method of FIG. 14 may be performed, for example, using the first measurement scheme, e.g., measurement scheme 9600 (FIG. 13).

As indicated at block 9704, the method may include displaying an object on a display. For example, application 160 (FIG. 1) may cause display 130 (FIG. 1) to display the object, e.g., as described above.

As indicated at block 9702, the method may optionally include calibrating the display, e.g., as described below.

As indicated at block 9706, the method may include placing a camera device at a known or estimated distance from the display. For example, application 160 (FIG. 1) may instruct the user to place camera 118 (FIG. 1) at a certain distance from the display 130 (FIG. 1), e.g., as described above with reference to FIG. 13.

As indicated at block 9708, the method may include placing a lens roughly midway between the display and camera. For example, application 160 (FIG. 1) may instruct the user to place the lens at the middle between camera 118 (FIG. 1) and display 130 (FIG. 1), e.g., as described above with reference to FIG. 13.

As indicated at block 9710, the method may include capturing an image of the displayed image through the lens. For example, application 160 (FIG. 1) may cause camera 118 (FIG. 1) to capture the image of the object, for example, via the lens, e.g., as described above.

As indicated at block 9712, the method may include analyzing the captured image, and determining the power and cylinder of the lens. For example, application 160 (FIG. 1) may determine the one or more optical parameters of the lens, for example, based on the captured image, e.g., as described above.

Referring back to FIG. 1, in some demonstrative embodiments, application 160 may be configured to perform one or more operations to estimate the camera distance, the lens distance and/or the one or more optical parameters of the lens, for example, according to the second measurement scheme, e.g., as described below.

Figure 15:
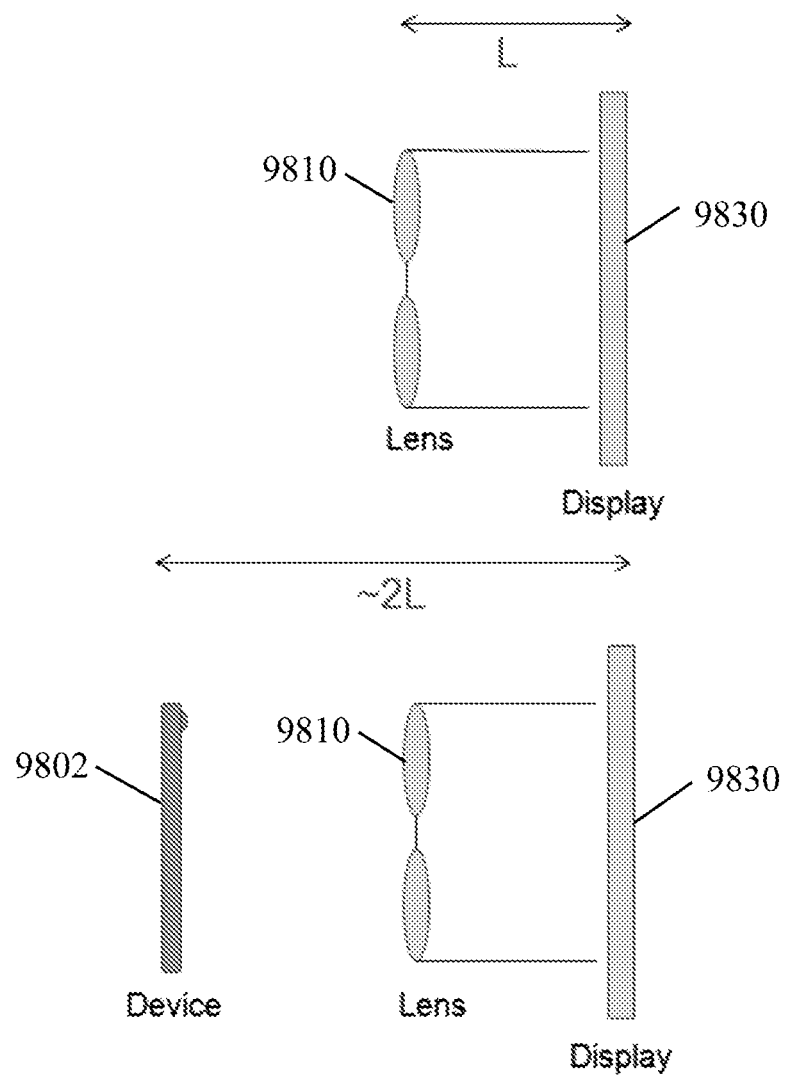
FIG. 15 is a schematic illustration of a measurement scheme, in accordance with some demonstrative embodiments.

Reference is made to FIG. 15, which schematically illustrates a measurement scheme 9800, in accordance with some demonstrative embodiments. For example, one or operations of using the measurement scheme 9800 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, measurement scheme 9800 may be configured to enable to determine one or more optical parameters of a lens 9810, for example, according to the second measurement scheme.

In some demonstrative embodiments, as shown in FIG. 15, a lens 9810 may be placed at a known distance, denoted L, from a display 9830. For example, display 830 may perform the functionality of display 130 (FIG. 1).

In some demonstrative embodiments, as shown in FIG. 14, lens 9810 may be placed at the distance L by completely extending the temple arms of the eyeglasses and allowing them to touch the display 9830.

In some demonstrative embodiments, since the temple arm is of fixed length, e.g., of typically 13.5 cm to 15 cm, the distance between the lens and the display may be well defined.

In some demonstrative embodiments, as shown in FIG. 15, an image capturing device 9802, may be placed at a distance, denoted 2L, from display 9830, e.g., a distance approximately equal to twice the length of the temple arm. For example, device 9802 may perform the functionality of camera 118 (FIG. 1).

In some demonstrative embodiments, the one or more optical parameters of the lens may be determined, for example, by capturing an image of the object from the distance 2L.

Figure 16:
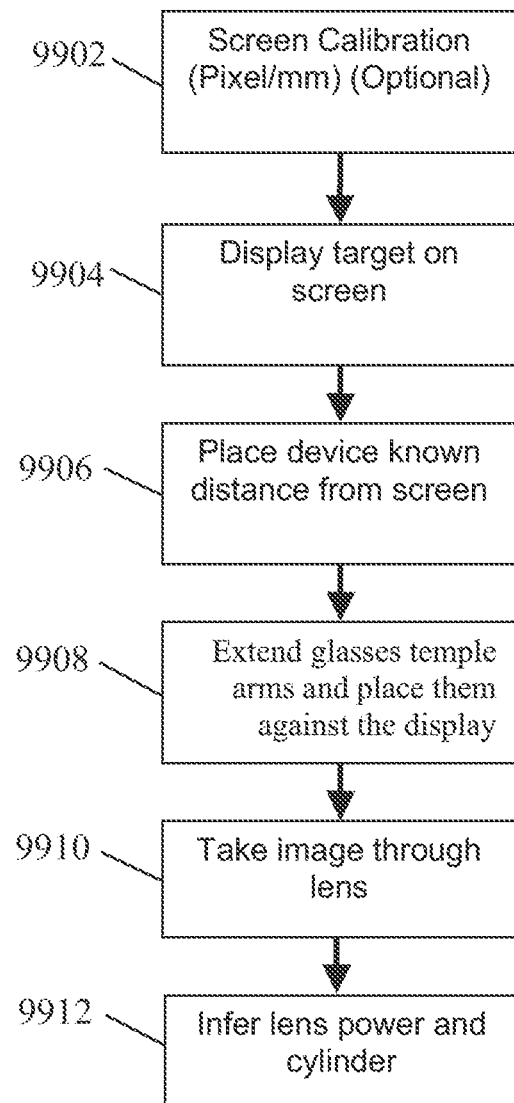
FIG. 16 is a schematic flow-chart illustration of a method of determining one or more optical parameters of a lens, in accordance with some demonstrative embodiments.

Reference is made to FIG. 16, which schematically illustrates a method of determining one or more optical parameters of a lens, in accordance with some demonstrative embodiments. For example, one or operations of the method of FIG. 16 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, one or more operations of the method of FIG. 16 may be performed, for example, in accordance with the second measurement scheme, e.g., measurement scheme 9800 (FIG. 15).

As indicated at block 9902, the method may optionally include calibrating a screen to find a pixel/mm ratio. For example, application 160 (FIG. 1) may be configured to calibrate display 130 (FIG. 1), e.g., as described below.

As indicated at block 9904, the method may include extending the eyeglasses temple arms and placing them against the display. For example, application 160 (FIG. 1) may instruct the user to extend the eyeglasses temple arms and to place them against the display 130 (FIG. 1), e.g., as described above.

As indicated at block 9906, the method may include placing a camera device at a known or estimated distance from the display, e.g., approximately twice the length of the temple arm. For example, application 160 (FIG. 1) may instruct the user to place camera 118 (FIG. 1) at a known or estimated distance from display 130 (FIG. 1), e.g., as described above.

As indicated at block 9908, the method may include capturing an image through lens. For example, application 160 (FIG. 1) may cause camera 118 (FIG. 1) to capture the image of the object, for example, via the lens, e.g., as described above.

As indicated at block 9910, the method may include determining lens power and cylinder power and cylinder axis. For example, application 160 (FIG. 1) may determine the one or more optical parameters of the lens, for example, based on the captured image, e.g., as described above.

Referring back to FIG. 1, in some demonstrative embodiments, application 160 may be configured to perform one or more operations to estimate the camera distance, the lens distance and/or the one or more optical parameters of the lens, for example, according to the third measurement scheme, e.g., as described below.

Figure 17:
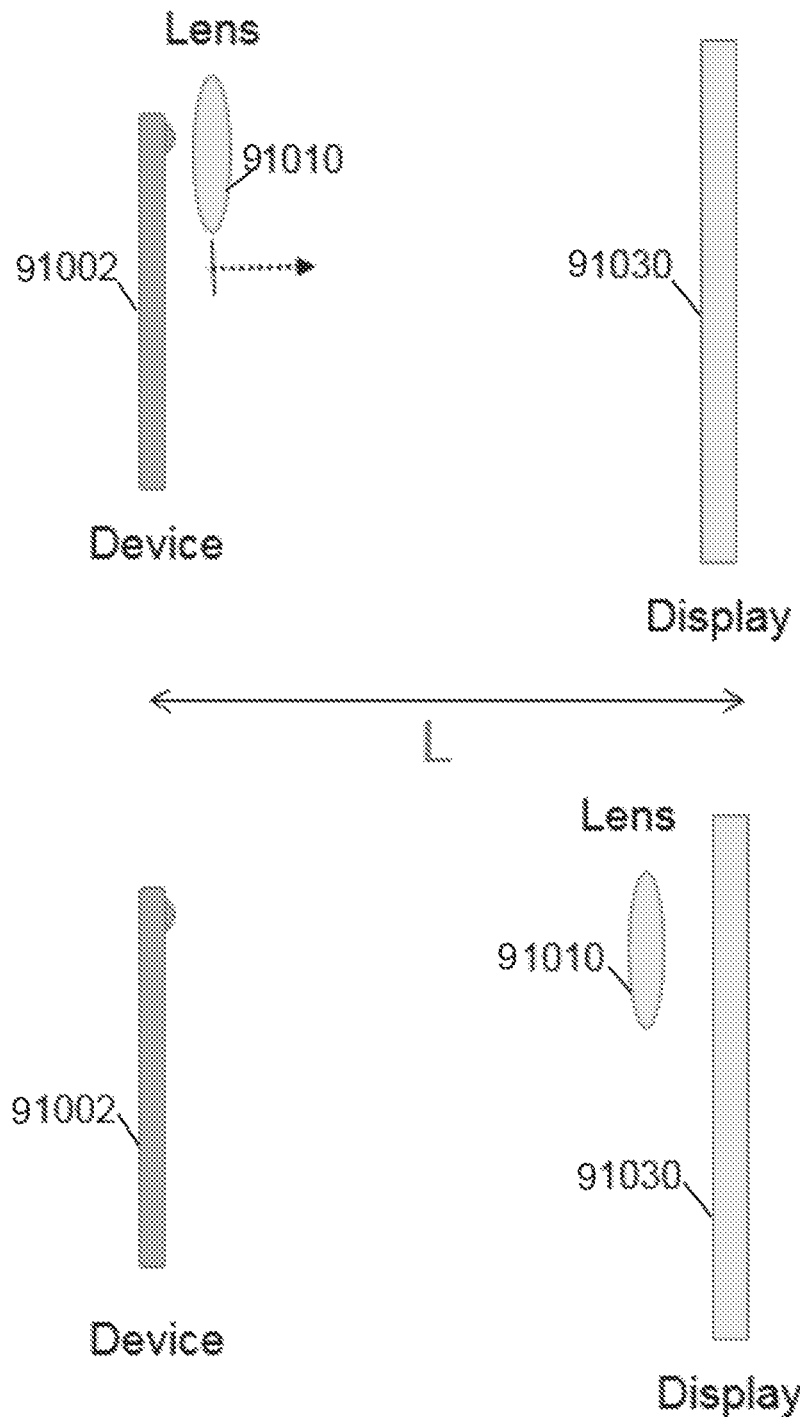
FIG. 17 is a schematic illustration of a measurement scheme, in accordance with some demonstrative embodiments.

Reference is made to FIG. 17, which schematically illustrates a measurement scheme 91100, in accordance with some demonstrative embodiments. For example, one or operations using of the measurement scheme 91000 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, measurement scheme 91000 may be configured to enable to determine one or more optical parameters of a lens 91010, for example, according to the third measurement scheme.

In some demonstrative embodiments, as shown in FIG. 17, an image capturing device 91002, may be placed at a certain distance, denoted L, e.g., the camera distance, from a display 91030. For example, device 91002 may perform the functionality of camera 118 (FIG. 1); and/or display 91030 may perform the functionality of display 130 (FIG. 1).

In some demonstrative embodiments, as shown in FIG. 17, the lens 91010 may be moved between the device 91002 and the display 91030, for example, in order to find the maximal relative magnification.

In some demonstrative embodiments, according to measurement scheme 91000 the position of the lens may not need to be monitored.

Figure 18:
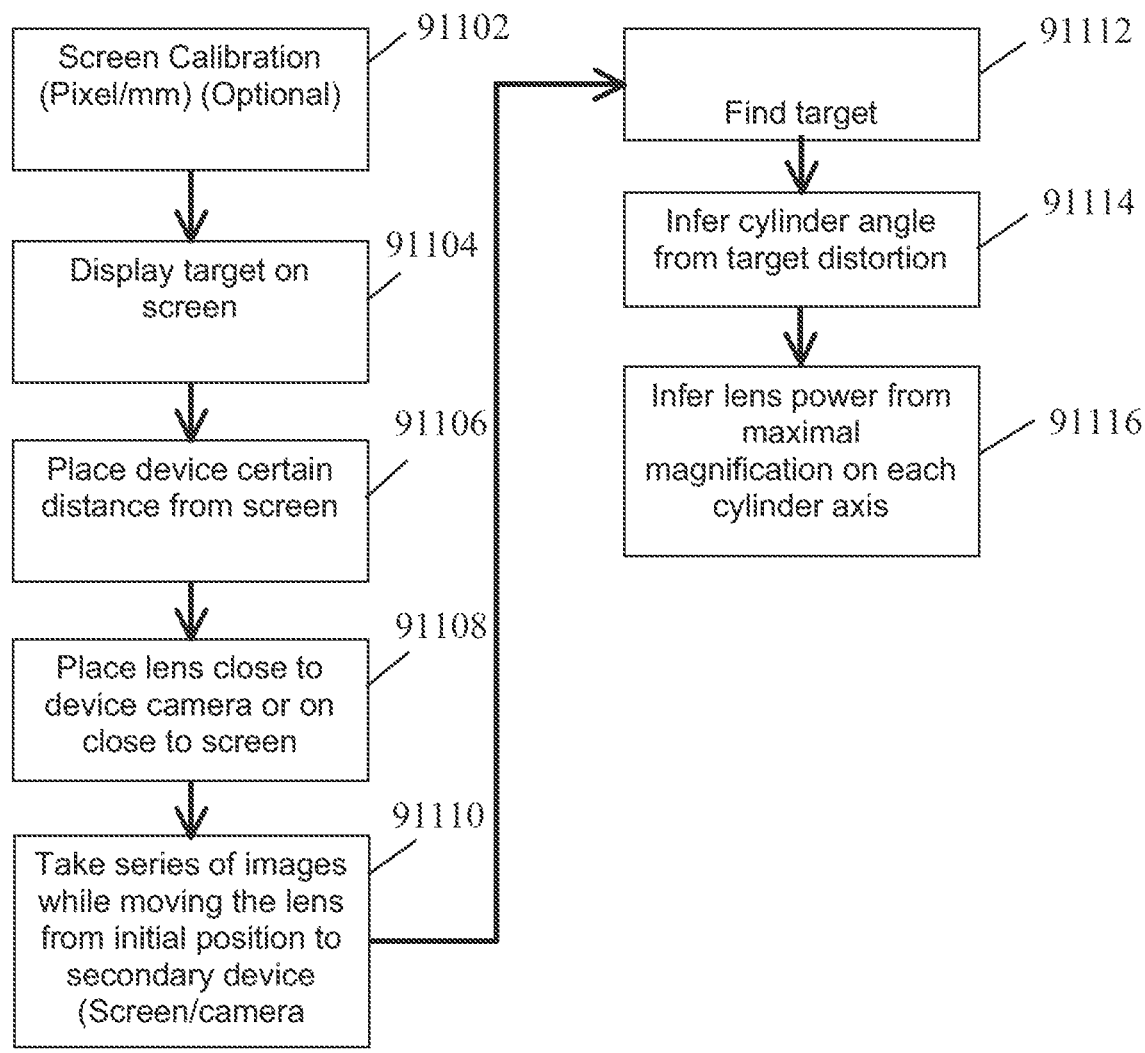
FIG. 18 is a schematic flow-chart illustration of a method of determining one or more optical parameters of a lens, in accordance with some demonstrative embodiments.

Reference is made to FIG. 18, which schematically illustrates a method of determining one or more optical parameters of a lens, in accordance with some demonstrative embodiments. For example, one or operations of the method of FIG. 18 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, one or more operations of the method of FIG. 18 may be performed, for example, in accordance with the third measurement scheme, e.g., measurement scheme 91000 (FIG. 18).

As indicated at block 91102, the method may optionally include calibrating a screen to find a pixel/mm ratio. For example, application 160 (FIG. 1) may be configured to calibrate display 130 (FIG. 1), e.g., as described below.

As indicated at block 91104, the method may include displaying an object on the display. For example, application 160 (FIG. 1) may cause display 130 (FIG. 1) to display the object, e.g., as described above.

As indicated at block 91106, the method may include holding a camera device at a certain distance from the display. For example, application 160 (FIG. 1) may instruct the user to place camera 118 (FIG. 1) at a certain distance from the display 130 (FIG. 1), e.g., as described above.

In some demonstrative embodiments, the method may include calculating the camera distance. For example, application 160 (FIG. 1) may determine the camera distance, e.g., as described above.

As indicated at block 91108, the method may include placing a lens close to the camera 118. For example, application 160 (FIG. 1) may instruct the user to place the lens close to camera 118 (FIG. 1), e.g., as described above.

As indicated at block 91110, the method may include capturing a series of images while moving the lens towards the display. For example, application 160 (FIG. 1) may cause camera 118 (FIG. 1) to capture a series of images while moving the lens towards the display 130 (FIG. 1), e.g., as described above.

In other embodiments, the lens may be moved away from the display and towards the camera. For example, the lens may be placed close to the display, and a series of images may be captured while moving the lens towards the camera.

In some demonstrative embodiments, a first option or a second option may be used to determine when to stop the moving of the lens towards the display.

In some demonstrative embodiments, the first option may include stopping when the lens is very close to the display.

In some demonstrative embodiments, the second option may include calculating a relative magnification for an arbitrary axis, and stopping the movement after the magnification reaches its peak.

As indicated at block 91112, the method may include determining the image with the maximal magnification, and checking for cylindrical distortion. For example, application 160 (FIG. 1) may determine the cylindrical axis, for example, based on the maximal magnification of the object for the certain meridian, e.g., as described below.

In one example, when a circular object is used, an ellipse shape may be seen.

As indicated at block 91116, the method may include calculating the lens power and the cylindrical power, based on the relative magnification in each axes and the distance. For example, application 160 (FIG. 1) may determine the focal power and the cylindrical power of the eyeglasses lens, for example, based on the magnifications in each axes, e.g., as described above.

In some demonstrative embodiments, the method may optionally include checking for consistency of the cylindrical distortion at the rest of the captured images.

In one example, the consistency of the cylindrical distortion may indicate an unintended rotation during movement.

Referring back to FIG. 1, in some demonstrative embodiments, application 160 may be configured to perform one or more operations to estimate the camera distance, the lens distance and/or the one or more optical parameters of the lens, for example, according to the fourth measurement scheme, e.g., as described below.

Figure 19:
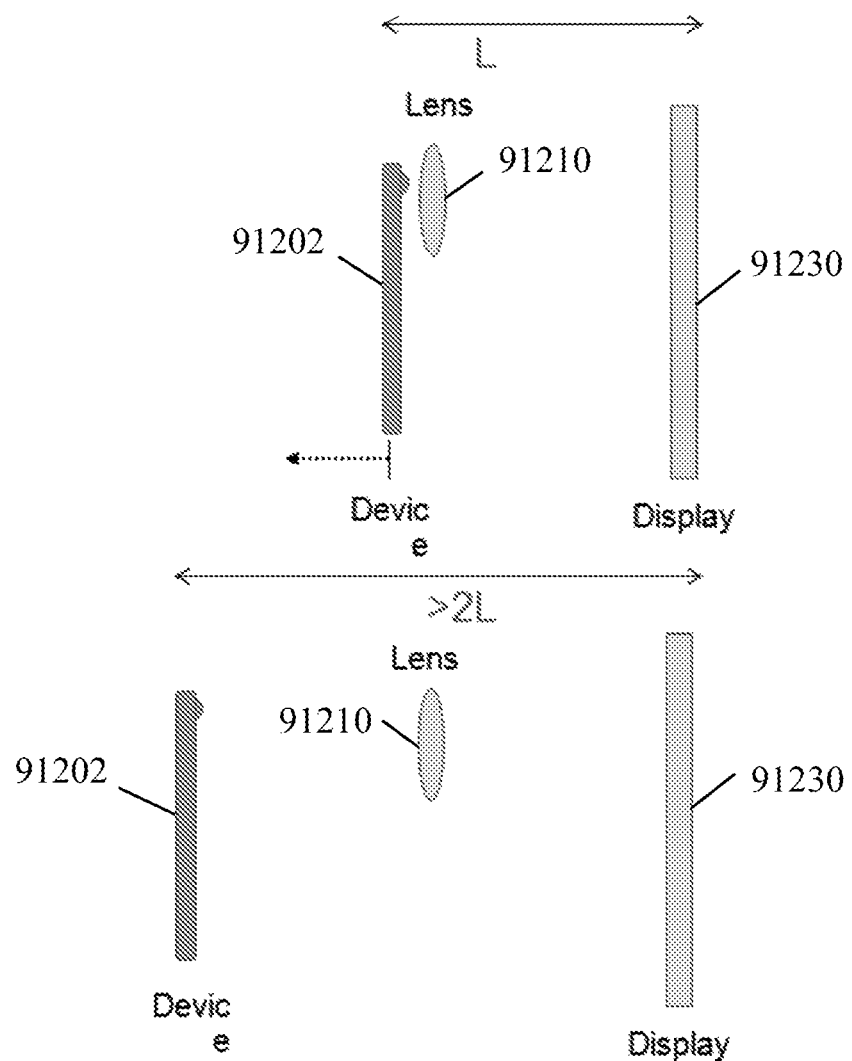
FIG. 19 is a schematic illustration of a measurement scheme, in accordance with some demonstrative embodiments.

Reference is made to FIG. 19, which schematically illustrates a measurement scheme 91200, in accordance with some demonstrative embodiments. For example, one or operations using of the measurement scheme 91200 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, measurement scheme 91200 may be configured to determine one or more optical parameters of a lens 91210, for example, according to the fourth measurement scheme.

In some demonstrative embodiments, as shown in FIG. 19, the lens may be placed at a certain distance, denoted L, e.g., the lens distance, from a display 91230. For example, or display 91230 may perform the functionality of display 130 (FIG. 1).

In some demonstrative embodiments, as shown in FIG. 9, an image capturing device 91202 may be placed close to lens 91210. For example, device 91002 may perform the functionality of camera 118 (FIG. 1).

In some demonstrative embodiments, as shown in FIG. 19, the device 91202 may be moved away from lens 91210 up to a distance, denoted 2L, e.g., the camera distance, for example, in order to find the maximal relative magnification.

In other embodiments, the device 91202 may be placed at approximately the distance 2L from the display and moved towards lens 91210, e.g., while capturing a series of images of the displayed object via the lens 91210.

In some demonstrative embodiments, if several images are captured, a selected image, e.g., the image with maximal relative magnification, may be used to determine one or more of, e.g., all, the optical parameters of lens 91210, for example, by determining the camera distance, for example, from a known size object captured at the selected image, and determining the lens distance as half of the camera-display distance.

Figure 20:
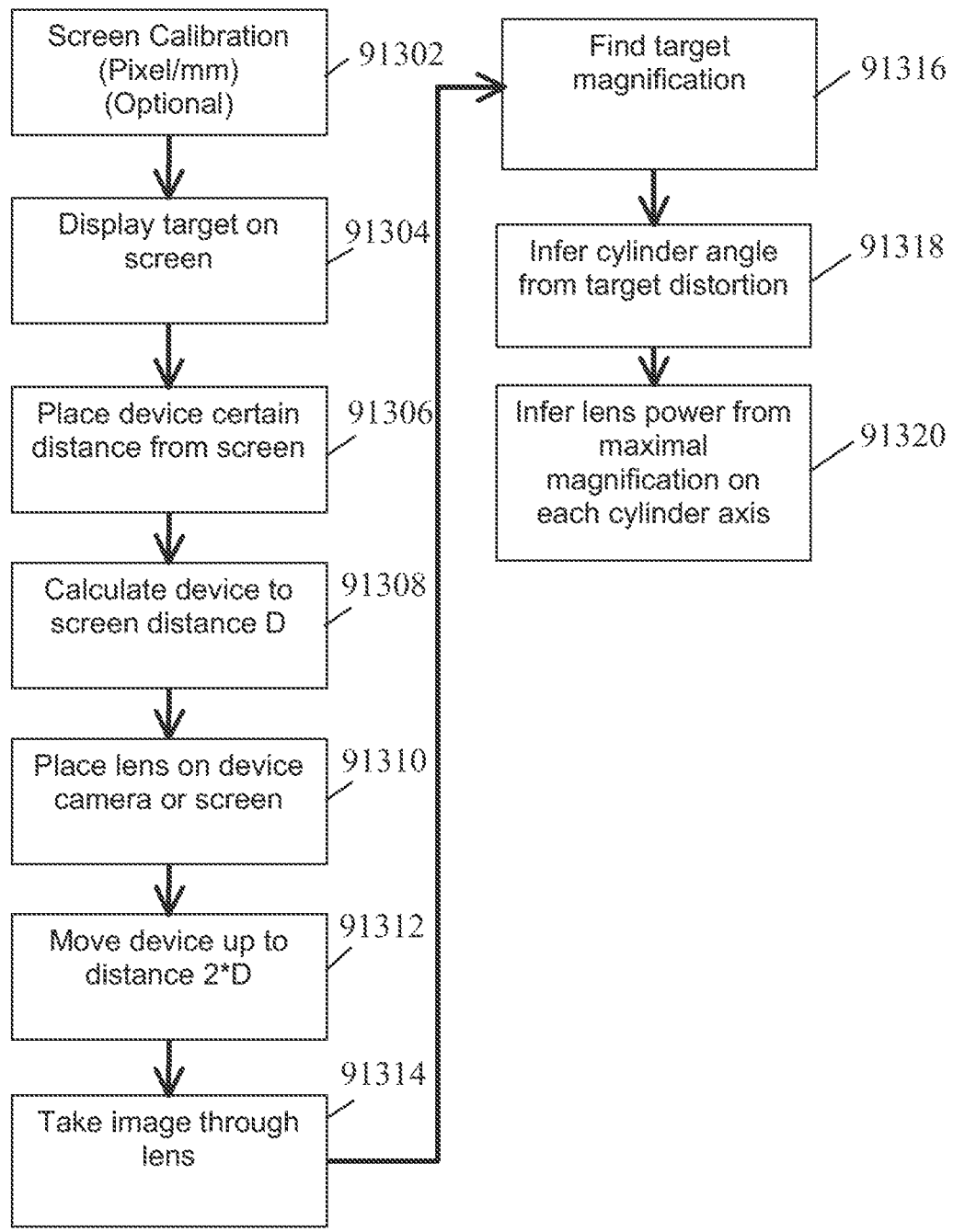
FIG. 20 is a schematic flow-chart illustration of a method of determining one or more optical parameters of a lens, in accordance with some demonstrative embodiments.

Reference is made to FIG. 20, which schematically illustrates a method of determining one or more optical parameters of a lens, in accordance with some demonstrative embodiments. For example, one or operations of the method of FIG. 20 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, one or more operations of the method of FIG. 20 may be performed, for example, in accordance with the fourth measurement scheme, e.g., measurement scheme 91200 (FIG. 19).

As indicated at block 91302, the method may optionally include calibrating a screen to find a pixel/mm relationship. For example, application 160 (FIG. 1) may be configured to calibrate display 130 (FIG. 1), e.g., as described below.

As indicated at block 91304, method may include displaying an object on the display. For example, application 160 (FIG. 1) may cause display 130 (FIG. 1) to display the object, e.g., as described above.

As indicated at block 91306, the method may include holding camera 118 at a certain distance from the display. For example, application 160 (FIG. 1) may instruct the user to place camera 118 (FIG. 1) at a certain distance, denoted D, from the display 130 (FIG. 1), e.g., as described above.

As indicated at block 91308, the method may include calculating the camera distance. For example, application 160 (FIG. 1) may determine the camera distance, e.g., as described above.

As indicated at block 91310, the method may include placing the lens at the same distance as the device. For example, application 160 (FIG. 1) may instruct the user to place the lens close to camera 118 (FIG. 1), e.g., as described above.

As indicated at block 91312, the method may include moving camera 118 backwards up to a distance 2D. For example, application 160 (FIG. 1) may instruct the user to move camera 118 (FIG. 1) to the distance 2D, e.g., as described above.

As indicated at block 91314, the method may include capturing an image of the object through the lens. For example, application 160 (FIG. 1) may cause camera 118 (FIG. 1) to capture an image via the lens, e.g., as described above.

As indicated at block 91316, the method may include determining the image with the maximal magnification, and checking for cylindrical distortion at the object. For example, application 160 (FIG. 1) may determine the maximal magnification of the object for the certain meridian, e.g., as described above.

In one example, for a circular object an ellipse shape may be seen, e.g., as described below.

As indicated at block 91318, the method may include determining a cylinder angle from the image distortion. For example, application 160 (FIG. 1) may determine the cylindrical axis, for example, based on the maximal magnification of the object for the certain meridian, e.g., as described above.

As indicated at block 91320, the method may include, e.g., for each of the axes, determining the relative magnification, and calculating lens power. For example, application 160 (FIG. 1) may determine the focal power and the cylindrical power of the eyeglasses lens, for example, based on the magnifications in each axes, e.g., as described above.

Referring back to FIG. 1, in some demonstrative embodiments, application 160 may be configured to perform one or more operations to estimate the camera distance, the lens distance and/or the one or more optical parameters of the lens, for example, according to the fifth measurement scheme, e.g., as described below.

Figure 21:
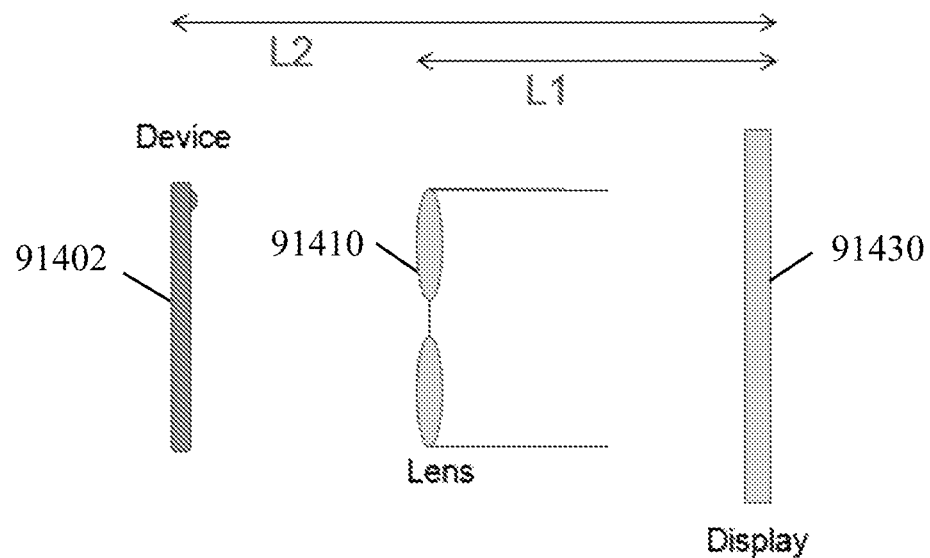
FIG. 21 is a schematic illustration of a measurement scheme, in accordance with some demonstrative embodiments.

Reference is made to FIG. 21, which schematically illustrates a measurement scheme 91400, in accordance with some demonstrative embodiments. For example, one or more operations using of the measurement scheme 91400 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, measurement scheme 91400 may be configured to determine one or more optical parameters of a lens 91410, for example, according to the fifth measurement scheme.

In some demonstrative embodiments, as shown in FIG. 21, an image capturing device 91402, may be placed at a certain distance, denoted L2, e.g., the camera distance, from a display 91430. For example, device 91402 may perform the functionality of camera 118 (FIG. 1); and/or display 91430 may perform the functionality of display 130 (FIG. 1).

In some demonstrative embodiments, as shown in FIG. 21, the lens 91420 may be placed at a distance, denoted L1, e.g., the lens distance, between lens 91420 and display 91430.

In some demonstrative embodiments, as shown in FIG. 21, the device 91402 may capture through the lens 91410 an image of an object displayed on display 91430.

In some demonstrative embodiments, the camera distance L2, and/or the lens distance L1 may be arbitrary.

In some demonstrative embodiments, an absolute feature of a frame including the lens 91410 or the frame distance from the display may be considered as known or calibrated.

In some demonstrative embodiments, for a known or calibrated frame size, or any other feature within the frame ("the calibration object"), the lens distance and the camera distance may be estimated, e.g., as described below.

In some demonstrative embodiments, the calibration object may have a height, denoted h, which may be known and/or given.

In some demonstrative embodiments, the known object height h may be considered as a known or calibrated feature of the frame, for example, the height of the lens, the width of the frame, the bridge length, and/or any other part of the eyeglasses.

In some demonstrative embodiments, a feature size of an element of the frame may also be given, for example, from a query to a database of a specified frame model, and/or may be specified by a user of device 102 (FIG. 1).

In some demonstrative embodiments, an image of the calibration object ("the calibration image"), e.g., when captured via the lens, may have an imaged height, denoted h'.

In some demonstrative embodiments, a distance, denoted u, between the lens and the calibration object may be determined, for example, based on the EFL of the lens, which may be known and/or given, the height h, and/or the imaged height h', e.g., as described below.

In some demonstrative embodiments, the following Equation may be given, for example, based on triangles similarity, e.g., as follows:

$$\frac{h'}{h} = \frac{v}{u} \cong \frac{efl}{u} \tag{28}$$

wherein v is approximately the EFL of the lens.

In some demonstrative embodiments, the imaged height h' of the calibration image may be based on a number of pixels, denoted h'_pixels_estimated, occupied by the calibration image, and a sensor pitch, denoted pitch, of the lens, e.g., as follows:

$$h' = pitch * h'\_pixels\_estimated \tag{29}$$

In some demonstrative embodiments, the distance u may be determined, for example, based on Equation 28 and Equation 29, e.g., as follows:

$$u \cong \frac{efl * h}{h'} = \frac{efl}{pitch} * \frac{h}{h'\_pixels\_estimated} \tag{30}$$

Referring back to FIG. 1, in some demonstrative embodiments, application 160 may be configured to perform one or more operations to estimate the camera distance, the lens distance and/or the one or more optical parameters of the lens, for example, according to the sixth measurement scheme, e.g., as described below.

Figure 22:
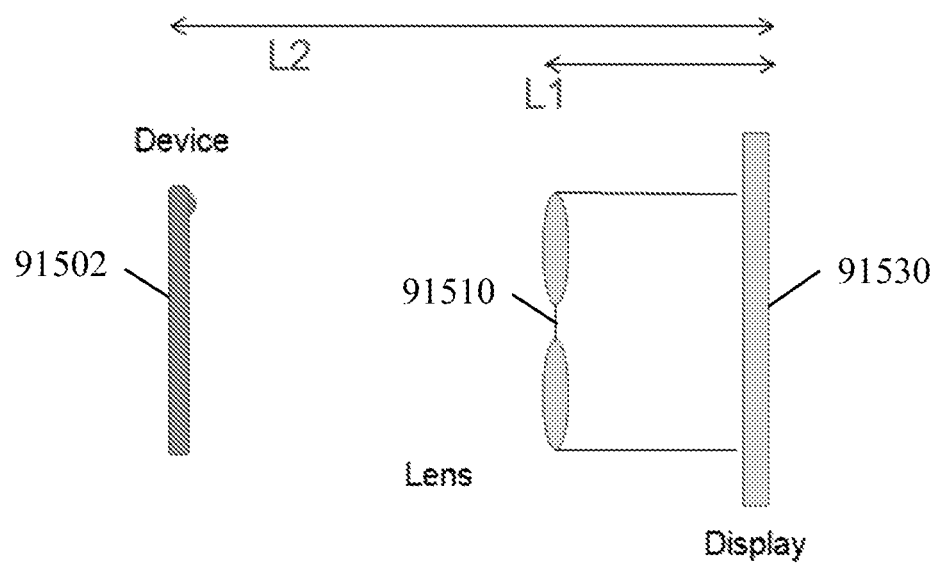
FIG. 22 is a schematic illustration of a measurement scheme, in accordance with some demonstrative embodiments.

Reference is made to FIG. 22, which schematically illustrates a measurement scheme 91500, in accordance with some demonstrative embodiments. For example, one or more operations using of the measurement scheme 91500 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, measurement scheme 91500 may be configured to determine one or more optical parameters of a lens 91510, for example, according to the sixth measurement scheme.

In some demonstrative embodiments, as shown in measurement scheme 91500, the lens 91510 may be placed at a distance, denoted L1, e.g., the lens distance, between lens 91510 and a display 91530. For example, display 91530 may perform the functionality of display 130 (FIG. 1).

In some demonstrative embodiments, the distance L1, of the frame from the display 91530 may be known.

In some demonstrative embodiments, the lens distance L1 may be known, for example, due to placing the frame at a predefined distance, placing the temple arms extended against the display, measuring the distance of the frame from the display and/or using any other method to determine the distance of the frame from the display or from the camera.

In some demonstrative embodiments, device 91502, may be located at any given distance, denoted L2, e.g., a predefined distance or an arbitrary distance, from the display 91530, e.g., the camera distance, for example, as long as device 91502 is able to capture an image of the object displayed on the display 91530, e.g., through the lens 91510.

In some demonstrative embodiments, the camera distance L2, between the display and the device, may be calculated from an object having a known size that that may be displayed on display 91530, for example, and one or more parameters of the camera 91502, e.g., a focal length, a field of view, and/or a sensor pitch, e.g., as described below.

Referring back to FIG. 1, in some demonstrative embodiments, device 102 may perform one or more operations, for example, to calibrate one or more elements of the frame, e.g., as described below.

In some demonstrative embodiments, the frame may be calibrated, for example, by placing the frame against the display 130 and capturing an image including the frame and the display 130, which may present a calibration object having known sizes.

In some demonstrative embodiments, an auto-detection or a manual detection of a feature of the frame may be scaled, for example, using the calibration object displayed upon the display 130.

In some demonstrative embodiments, the frame may be calibrated, for example, by placing the frame at a known distance from the display 130, e.g., as described below.

In some demonstrative embodiments, by extending the temple arms of the eyeglasses and placing them against the display 130, the distance of the frame surrounding the lenses from the display 130 may be regarded as about 145 mm.

In some demonstrative embodiments, a feature of the frame may be calibrated, for example, according to the magnification of the displayed image of the calibration object, e.g., for the distance of 145 mm, and one or more camera lens properties.

In some demonstrative embodiments, the frame can be calibrated, for example, using the fact that the maximum magnification occurs, for example, when the eyeglasses are just in the middle between the display 130 and camera 118.

In some demonstrative embodiments, using this fact it may be determined that the distance of an actual location of the frame is half a measured distance between the device 102 and the display 130.

In some demonstrative embodiments, using a known distance converted into an absolute magnification, where the focal length and sensor pixel pitch are given may be determined, e.g., as follows:

$$h = \frac{h'_{pixels} * \text{pitch} * (L - f)}{2f} \tag{31}$$

wherein $h'_{pixels}$ is the amount of pixels that the frame feature is accommodating on the sensor, pitch is the distance from one pixel to an adjacent pixel, L is the distance between the display and the device and/or f is the focal length of the camera.

In some demonstrative embodiments, device 102 may perform one or more operations, for example, to calibrate a display size, for example, of display 130, e.g., as described below.

In some demonstrative embodiments, calibration of the display 130 may be performed, for example, by capturing an image of an object with a known size, placed against the display.

In some demonstrative embodiments, the object with known size may be a standard magnetic card, a CD media, a ruler, a battery (AA, AAA . . . ) and/or the like.

In some demonstrative embodiments, the object with known size may be the eyeglasses temple arm length. The arm length is typically 13.5 cm to 15 cm. This accuracy may be enough for further estimations.

In some demonstrative embodiments, the temple arm length may be scribed on an arm of the eyeglasses and the length may be used for the display calibration.

In some demonstrative embodiments, calibrating the display may include comparing an object with known dimensions to a displayed feature having a known amount of pixels.

In some demonstrative embodiments, a scaling factor, denoted scaling, may be determined, e.g., as follows:

$$\text{scaling} = \frac{S_{captured \cdot pixels}}{ref_{captured \cdot pixels}} * \frac{L_{absolute \cdot dim}}{S_{displayed \cdot pixels}} [\text{mm/pixel}] \tag{32}$$

In some demonstrative embodiments, a scaling of the display may be applied to display a feature having absolute size on the display.

In some demonstrative embodiments, calibration of the display may be performed, for example, by capturing an image of the display 130 at a known distance, while considering the effective focal length of the camera lens, and/or the field of view of the lens of the camera or the sensor pitch.

In some demonstrative embodiments, the magnification, denoted M, of an image having a size h of an object of size H, positioned at a camera distance L from the camera having a focal length f, may be determined, e.g., as follows:

$$M \equiv \frac{h}{H} = \frac{f}{L} \tag{33}$$

In some demonstrative embodiments, am actual size h of the image on the device may be calculated, for example, based on a sensor pitch p[m/pixel], e.g., as follows:

$$h = h_{pix} \cdot p \quad (34)$$

wherein $h_{pix}$ is the number of pixels the image span on the device.

In some demonstrative embodiments, the absolute size H of the image on the display may be determined, e.g., as follows:

$$H = \frac{p \cdot h_{pix} L}{f} \quad (35)$$

In some demonstrative embodiments, once the displayed object with dimension of H has been determined, a scaling to the display can be applied to display a known absolute size of features on the display.

In another embodiment, the scaling factor may be considered when evaluating images from the display, without scaling the image being displayed on the display.

For example, a screen having a width of 375 mm may accommodate 1024 pixels for this dimension. A calibration object of 100 pixels may be displayed on the display and may be captured with a camera. A known size object ("a reference object") having a dimension of 300 mm may be placed on the display.

In some demonstrative embodiments, an image analysis of an image including the image of the calibration object and the image of the reference object, may show that the reference object accommodates 120 pixels and the calibration object accommodates 60 pixels. Accordingly, the scaling factor may be 1.5 mm/pixel.

In some demonstrative embodiments, the image presented on the display may be scaled, for example, to match the predetermined known size object.

In one example, in order to display an image having a dimension of 60 mm, an image having 40 pixels should be displayed.

In another example, the same amount of pixels on every screen may be displayed, and the scaling factor may be considered, for example, when capturing an image. According to this example, the scaling factor may be considered to evaluate the absolute dimension of an object, e.g., that has been displayed on the display.

Figure 23:
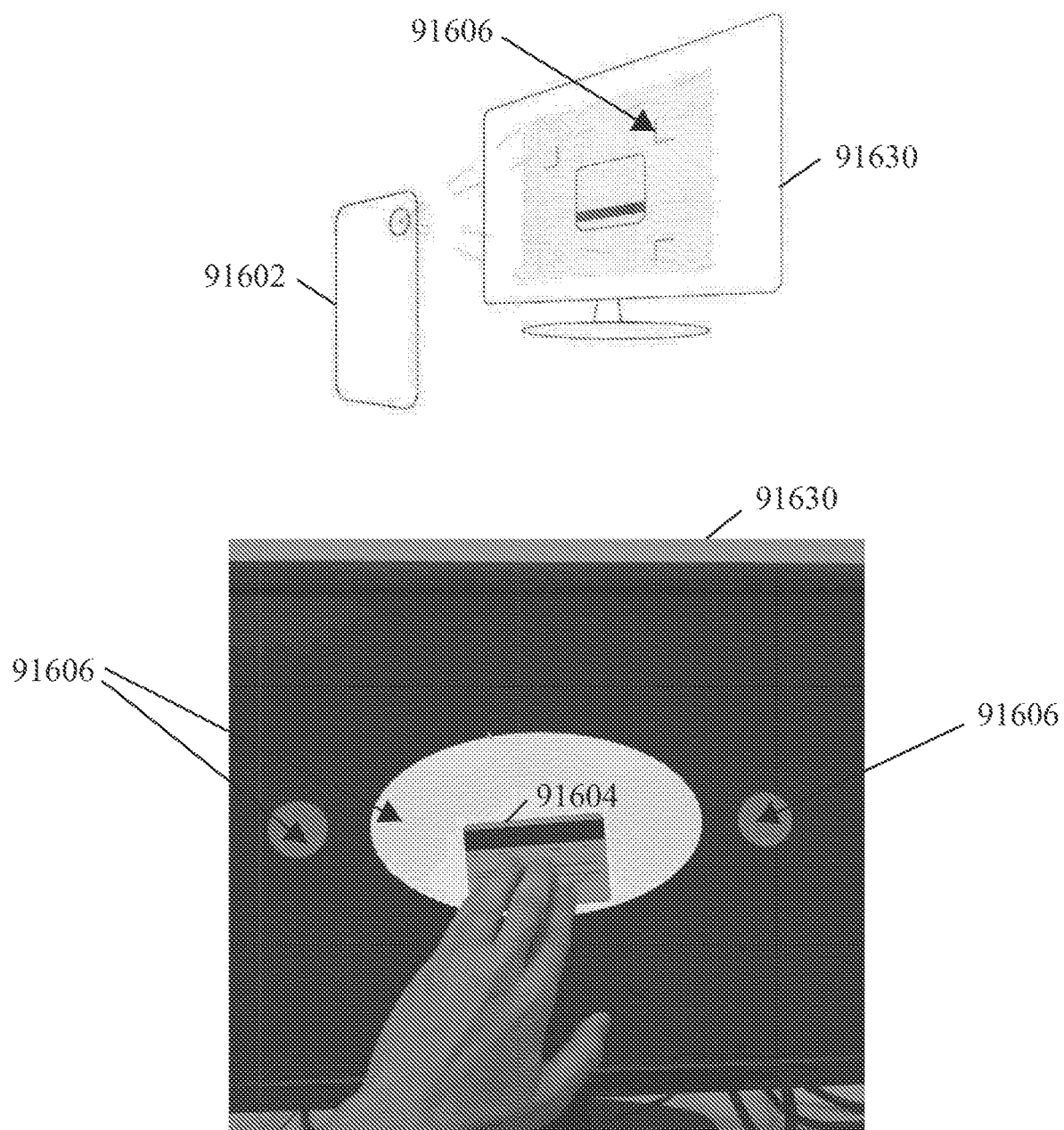
FIG. 23 is a schematic illustration of a calibration scheme, in accordance with some demonstrative embodiments.

Reference is made to FIG. 23, which schematically illustrates a calibration scheme 91600, in accordance with some demonstrative embodiments. For example, calibration scheme 91600 may be implemented to calibrate display 130 (FIG. 1).

In some demonstrative embodiments, as shown in FIG. 23, a reference object 91604, e.g. a credit card, may be placed against a display 91630.

In other embodiments, the reference object 91604 may include extended eyeglasses temple arms placed against the display.

In some demonstrative embodiments, an image capturing device 91602, e.g., camera 118 (FIG. 1), may capture an image of the reference object 91604.

In some demonstrative embodiments, as shown in FIG. 23, the display 91630 may be triggered, e.g., by application 160 (FIG. 1), display one or more calibration objects 91606, e.g., an ellipsoid or borderline shapes.

In some demonstrative embodiments, a pixel to millimeter ratio of display 91630 may be determined, for example, by comparing the reference object 91604 to the calibration objects 91606, e.g., as described above.

In some demonstrative embodiments, the calibration objects 91606 may be constituted from different channels of colors, e.g., Red-Green-Blue, so that the auto identification of the feature and the object can be utilized.

Referring back to FIG. 1, in some demonstrative embodiments, application 160 may be configured to analyze one or more parameters, visual effects, optical effects and/or attributes with respect to the image of a calibration object, e.g., displayed on display 130.

In some demonstrative embodiments, the calibration object may include a shape and/or color.

In some demonstrative embodiments, device 102 may perform an analysis for a magnification of the shape for a certain angle corresponding to a focal power at the same angle.

In some demonstrative embodiments, a spherical lens may create, for example, a uniform magnification at all angles.

In some demonstrative embodiments, a cylindrical lens may cause, for example, maximum magnification at an angle corresponding to the angle of the cylindrical lens, and no relative magnification at the angle perpendicular to the cylindrical angle.

In some demonstrative embodiments, a combination of a spherical lens and a cylindrical lens may create, for example, two perpendicular angles in which different relative magnification are apparent.

In some demonstrative embodiments, angles corresponding to the angle of the cylinder, and the magnification on each angle may be the basis for focal length calculation.

In some demonstrative embodiments, a result of two focal powers may be shown, for example, due to the cylindrical lens.

In some demonstrative embodiments, the difference between the two focal powers may be considered as the cylindrical power.

Figure 24:
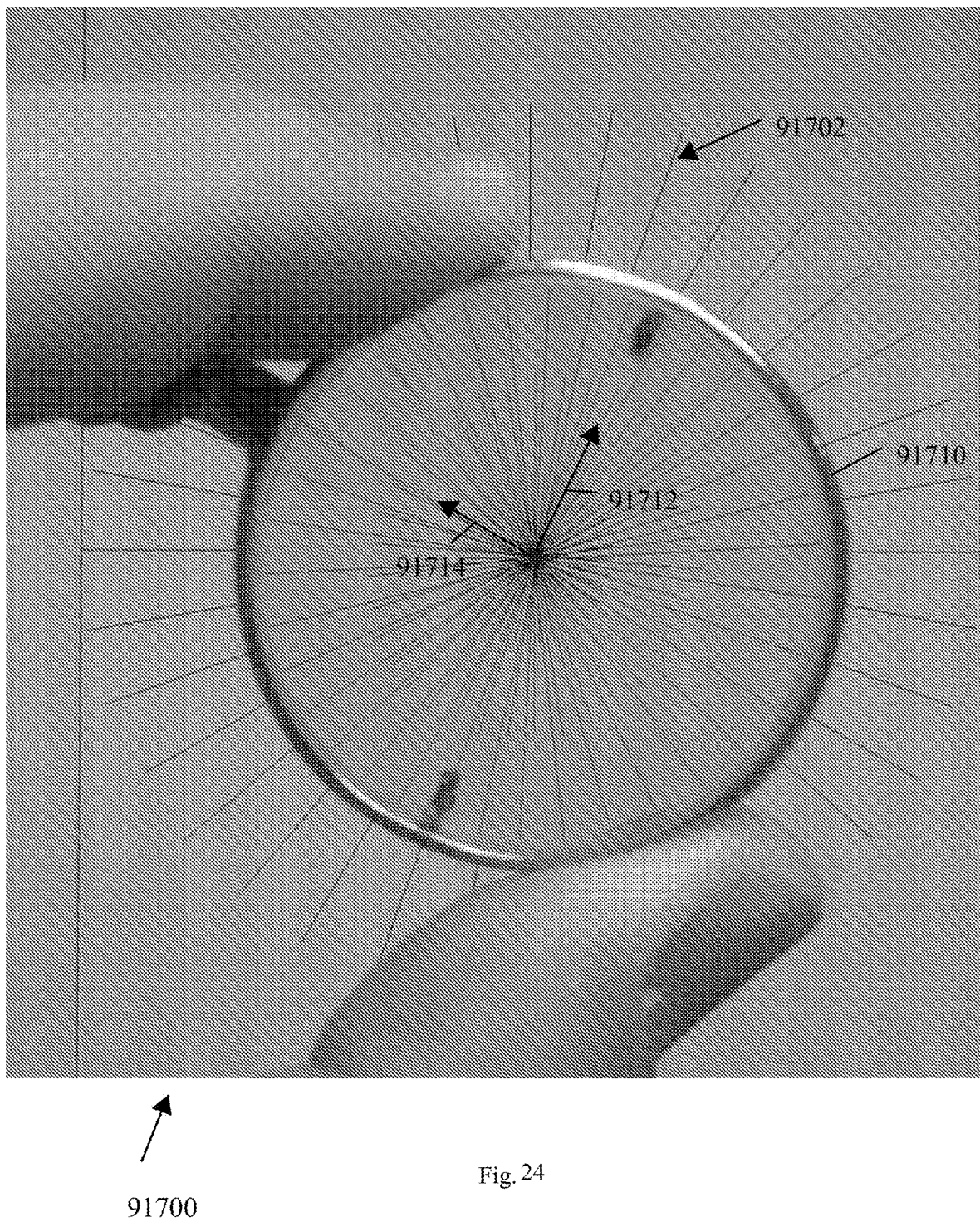
FIG. 24 is a schematic illustration of an image of an object, in accordance with some demonstrative embodiments.

Reference is made to FIG. 24, which schematically illustrates an image 91700 of an object 91702 captured via a lens 91710, in accordance with some demonstrative embodiments.

For example, application 160 (FIG. 1) may be configured to determine one or more parameters of lens 91710 based on the image of object 91102.

In some demonstrative embodiments, as shown in FIG. 24, image 91700 may illustrate the effect of magnification of two focal powers of lens 91710.

In some demonstrative embodiments, as shown in FIG. 24, object 91702 may be composed of radial lines in several radii.

In some demonstrative embodiments, as shown in FIG. 24, the two focal powers of a lens 91710 may create two magnifications.

In some demonstrative embodiments, as shown in FIG. 24, since both powers are negative, the two focal powers of a lens 91710 may create two minifications.

In some demonstrative embodiments, as shown in FIG. 24, measuring the length of each radial line in every angle, may demonstrate that the length varies, which is the effect of the magnification of two focal powers that are perpendicular to one another.

In some demonstrative embodiments, as shown in FIG. 24, this effect may create lines in the image that show a maximal magnification at an angle 91712, and a minimal magnification at a perpendicular angle 91714.

In some demonstrative embodiments, these two magnifications may be used, e.g., by application 160 (FIG. 1), to determine the two focal powers, and the angle at which the largest magnification occurs may be used, for example, by application 160 (FIG. 1), to determine the angle of the cylinder.

In some demonstrative embodiments, as shown in FIG. 24, a circular symmetric object can be utilized as object 91702. In this case the image may go through a magnification change, which for cylindrical lens, will result in an elliptical shape.

In some demonstrative embodiments, lens power, lens cylinder power and/or cylinder angle can be extracted, e.g., by application 160 (FIG. 1), for example, by studying total magnification, and the ratio between the long and short ellipse axes and the ellipse angle.

Figure 25:
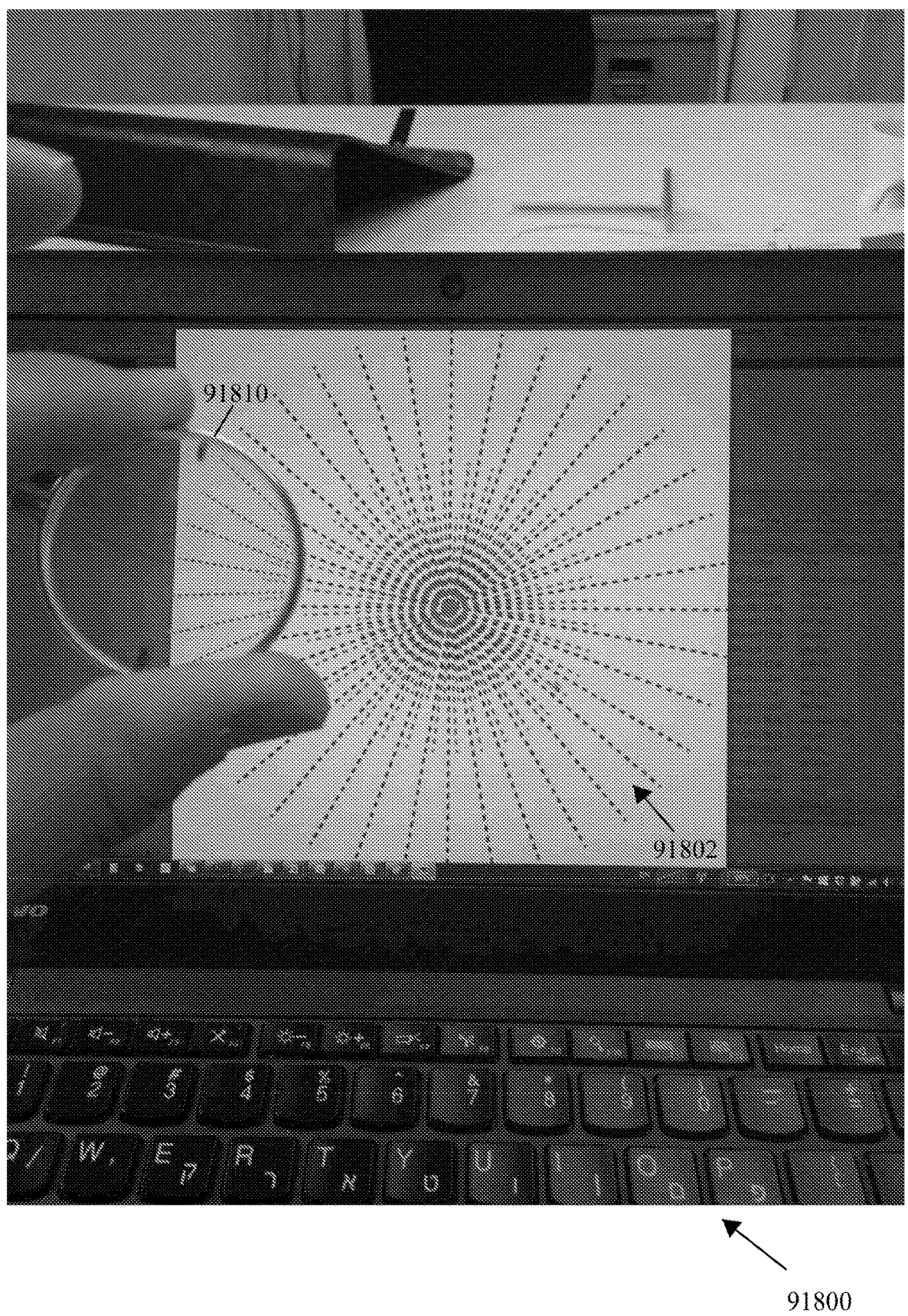
FIG. 25 is a schematic illustration of an image of an object, in accordance with some demonstrative embodiments.

Reference is made to FIG. 25, which schematically illustrates an image 91800 of an object 91802, in accordance with some demonstrative embodiments.

In some demonstrative embodiments, as shown in FIG. 25, object 91802 may be partially captured via a lens 91810, e.g., while other portions of object 91802 may be captured not thorough lens 91810.

For example, application 160 (FIG. 1) may be configured to determine one or more parameters of lens 91810 based on the image of object 91802.

In some demonstrative embodiments, as shown in FIG. 25, object 91802 may include an object, which may be composed of radial lines in several radii, each line may be composed of a dashed line and different radii may be designated by different colors or different line types.

In some demonstrative embodiments, the use of object 91802, e.g., including the dashed line, may assist to determine the magnification, for example, since the spatial frequency of each line changes under different magnification.

Figure 26:
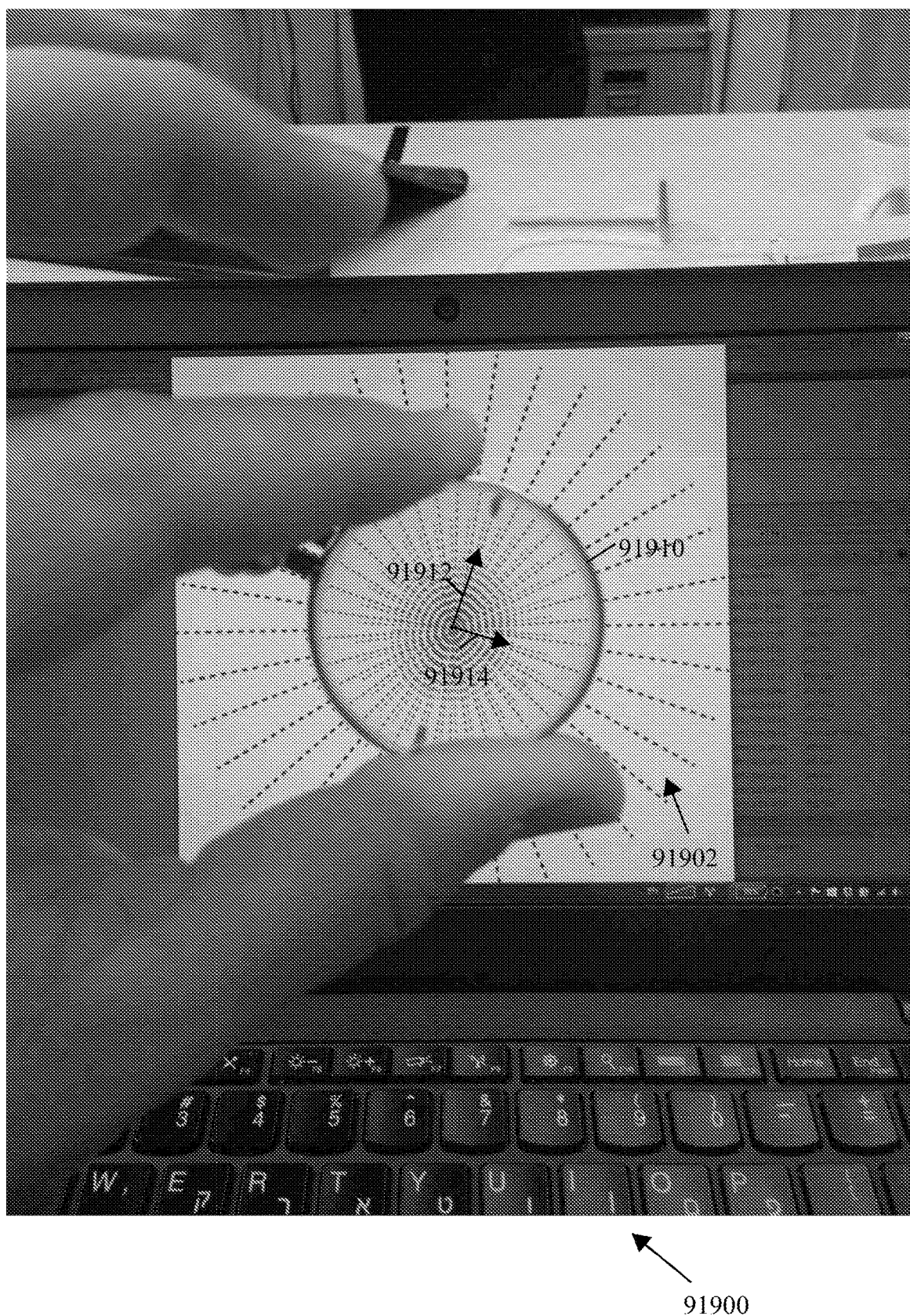
FIG. 26 is a schematic illustration of an image of an object, in accordance with some demonstrative embodiments.

Reference is made to FIG. 26, which schematically illustrates an image 91900 of an object 91902 captured via a lens 91910, in accordance with some demonstrative embodiments. For example, application 160 (FIG. 1) may be configured to determine one or more parameters of lens 91910 based on the image of object 91902.

In some demonstrative embodiments, as shown in FIG. 26, lens 91910 may include a spherical and cylindrical lens.

In some demonstrative embodiments, as shown in FIG. 26, the captured image 91900 of object 91902 may illustrate a change of magnification that creates a maximum magnification at an angle 91912, and a minimum magnification at a perpendicular angle 91914.

In some demonstrative embodiments, as shown in FIG. 26, the captured image 91900 may illustrate a spatial frequency in lines at different meridians, which may be caused by a different magnification per meridian.

In some demonstrative embodiments, it may be apparent that the cylindrical effect causes the equal radial lines to create an elliptical shape.

Figure 27:
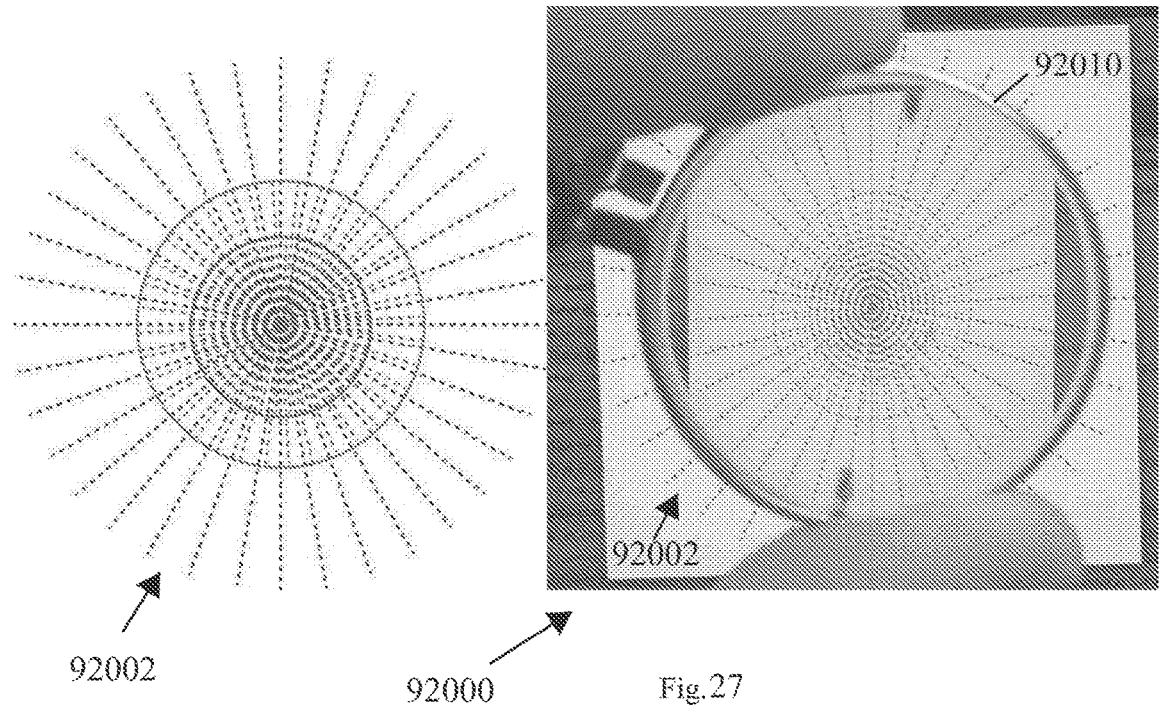
FIG. 27 is a schematic illustration of an image of an object, in accordance with some demonstrative embodiments.

Reference is made to FIG. 27, which schematically illustrates an image 92000 of an object 92002 captured via a lens 92010, in accordance with some demonstrative embodiments.

For example, application 160 (FIG. 1) may be configured to determine one or more parameters of lens 92010 based on the image of object 92002.

In some demonstrative embodiments, as shown in FIG. 27, object 92002 may include outlining of a line connecting all lines with the same radii.

In some demonstrative embodiments, as shown in FIG. 27, image 92000 may show how different perpendicular focal powers of lens 92010 may create two perpendicular magnifications that transform a circular shape into an elliptical shape.

In some demonstrative embodiments, as shown in FIG. 27, the largest magnification may occur at an angle 92012, e.g., the cylindrical axis, and the minimum magnification may occur at a perpendicular angle 92014.

In some demonstrative embodiments, as shown in FIG. 27, the orientation of lens 92010 may be taken under consideration to calculate the absolute axis of the cylinder. For each of the ellipse axes the relative magnification may be determined, and then the power of the lens may be determined.

In some demonstrative embodiments, due to different magnifications, for example, due to a power of lens 92010, the object 92002 may be displayed at different scales on image 92000.

In some demonstrative embodiments, displaying several concentric circular rings each with a different radius may enable to analyze both positive and negative magnification at different powers.

In some demonstrative embodiments, the magnification and cylinder in these concentric rings may be further analyzed, using, for example, a Fourier transform, e.g., by tracking the dominant frequency along different directions.

In some demonstrative embodiments, using several objects may provide the advantage of improving accuracy, e.g., by averaging.

In other embodiments, object 92002 may include a dense grid line.

In some demonstrative embodiments, lens power, cylinder and aberrations can be deduced, for example, by following the distortion within the dense grid line.

In some demonstrative embodiments, object 92002 may include chromo effects, for example, to enable identifying certain features in image 92000. For example, a minor defocus of colors, e.g., such as green and red, may result in a yellow color, e.g., where the two colors are adjacent.

Referring back to FIG. 1, in some demonstrative embodiments, application 160 may be configured to determine that an image captured via the lens is captured through the center of the lens.

In some demonstrative embodiments, application 160 may be configured to perform one or more operations, methods and/or procedure to ensure that a minimum displacement from the center of the lens an image captured via the lens.

Figure 28:
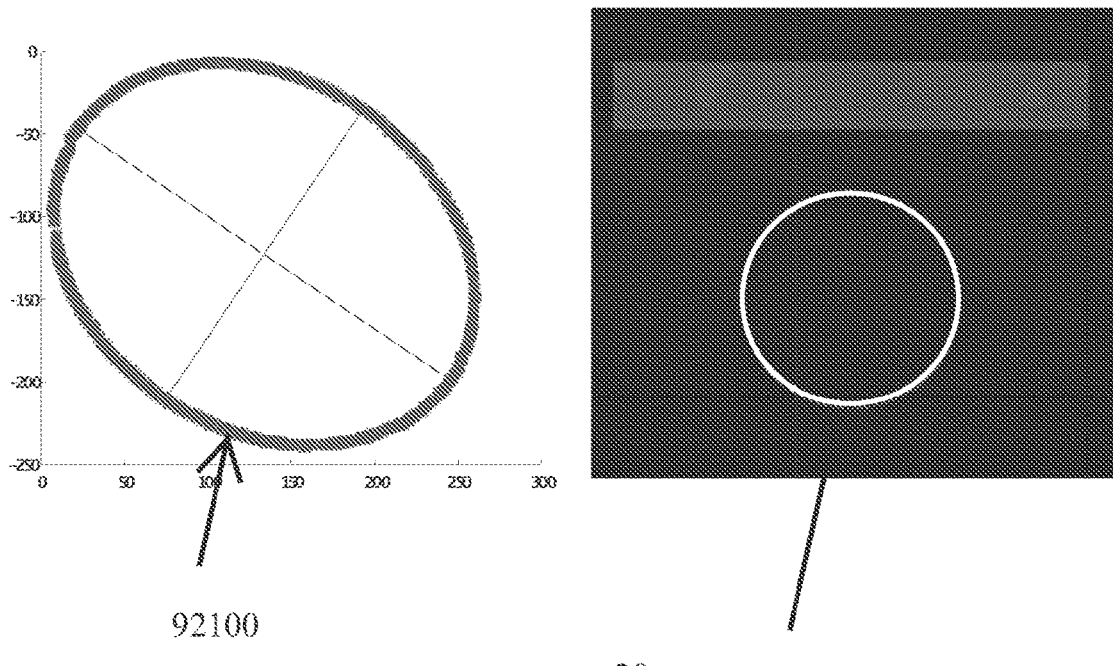
FIG. 28 is a schematic illustration of an ellipse curve fit of a circular ring object, in accordance with some demonstrative embodiments.

Reference is made to FIG. 28, which schematically illustrates an ellipse curve fit 92100 of a circular ring object 92102, in accordance with some demonstrative embodiments.

In some demonstrative embodiments, ellipse curve fit 92100 may result from capturing circular ring object 92102, for example, via a cylindrical lens.

In some demonstrative embodiments, as shown in FIG. 28, an ellipse curve fit 92102 of a circular ring object image 92100 may be captured through a cylindrical test lens.

Referring back to FIG. 1, in some demonstrative embodiments, application 160 may be configured to determine the one or more optical parameters of a lens, for example, even without using display 130. For example, application 160 may be configured to determine a cylindrical power, and/or a cylinder angle and/or a spherical power of the lens, for example, even without using display 130, e.g., as described below.

In some demonstrative embodiments, application 160 may be configured to determine the one or more optical parameters of a lens, for example, even without displaying an image on display 130.

In some demonstrative embodiments, application 160 may be configured to determine the one or more optical parameters of a lens, for example, based on a captured image of an object having a known size, e.g., as described below.

In some demonstrative embodiments, the one or more optical parameters of the lens such as sphere power, cylinder power and/or cylinder angle may be found, for example, by using a camera or a Smartphone device and an object of a known size.

In some demonstrative embodiments, by capturing an image of the object of known size through the lens, the one or more optical parameters of the lens may be found.

In some demonstrative embodiments, the object of known size may include, for example, a coin having a known size, an Iris of the eye or a calibrated iris diameter of the eye, and/or any other object or element.

In some demonstrative embodiments, using the calibration object may allow determining the one or more optical parameters of a lens, for example, even without using a screen to display an object, and/or even without calibration prior to measurement of the one or more optical parameters of the lens.

In some demonstrative embodiments, the lens power and/or cylinder parameters may be deduced from a deformation of the observed image of the calibration object through the tested lens relative to an image of the calibration object, which may be observed directly without the test lens.

In some demonstrative embodiments, spectacle eyeglasses parameters, e.g., a sphere power, a cylinder power and/or a cylinder angle, may be determined, for example, using a camera or a Smartphone device, e.g., even without using an external object of known size.

In some demonstrative embodiments, by capturing an image of an eye of a wearer of the eyeglasses, it may be possible to analyze a change in an Iris size of the Iris of the wearer resulting from the spectacle eyeglasses. For example, an image of the Iris with and without the eyeglasses may be compared and analyzed, e.g., to determine the spectacle eyeglasses parameters.

In some demonstrative embodiments, if needed, a cornea absolute size may be calibrated, for example, using a known size object, e.g., a coin or a credit card.

Referring back to FIG. 1, in some demonstrative embodiments, application 160 may be configured to determine a pupillary distance (PD) between a first lens of eyeglasses and a second lens of the eyeglasses, e.g., as described below.

In some demonstrative embodiments, application 160 may be configured to process an image of an object including a first element and a second element, e.g., as described below. In one example, application 160 may be configured to cause display 130 to display the object.

In some demonstrative embodiments, the image may include a first imaged element of the first element captured via the first lens and a second imaged element of the second element captured via the second lens.

In some demonstrative embodiments, application 160 may be configured to determine the pupillary distance between the first and second lenses, for example, based on at least a first distance between the first and second elements, and a second distance between the first and second imaged elements, e.g., as described below.

Figure 29:
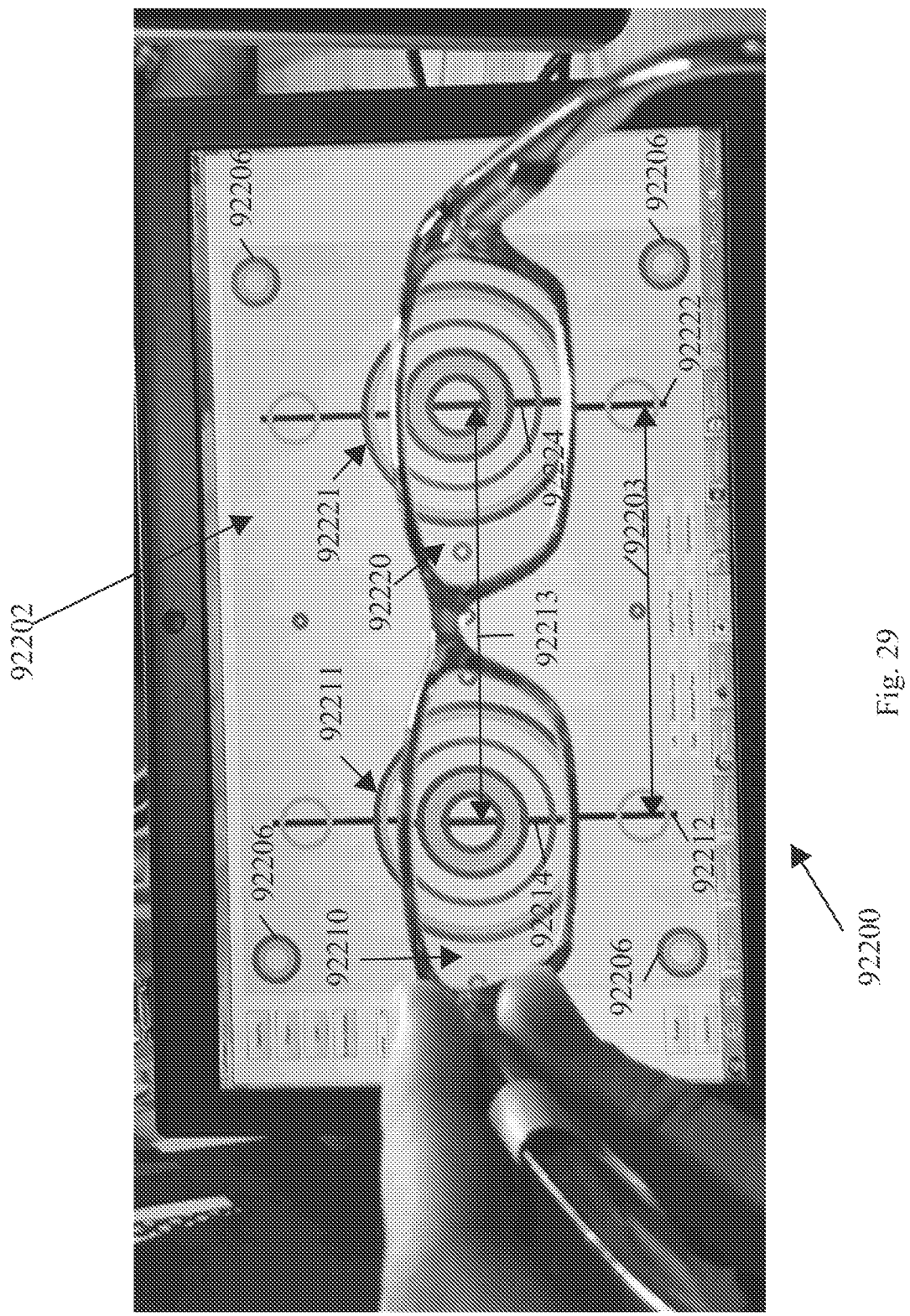
FIG. 29 is a schematic illustration of an image of an object captured via two lenses of eyeglasses, in accordance with some demonstrative embodiments.

Reference is made to FIG. 29, which schematically illustrates an image 92200 of an object 92202, in accordance with some demonstrative embodiments. For example, application 160 (FIG. 1) may cause display 130 (FIG. 1) to display object 92202, and/or control camera 118 (FIG. 1) to capture image 92200.

In some demonstrative embodiments, application 160 (FIG. 1) may be configured to determine a pupillary distance between a first lens 92210 of eyeglasses and a second lens 92220 of the eyeglasses, for example, based on image 92200, e.g., as described below.

In some demonstrative embodiments, as shown in FIG. 29, object 92202 may be displayed on a display device and may include a first circularly symmetric object 92211 and a second circularly symmetric object 92221. In other embodiments, object 92202 may include any other additional or alternative shapes, objects and/or elements.

In some demonstrative embodiments, objects 92211 and 92221 may include a plurality of concentric circular rings. For example, each ring may have a different radius. In other embodiments, objects 92211 and 92221 may include any other additional or alternative shape, object and/or element.

In some demonstrative embodiments, as shown in FIG. 29, object 92202 may include a first line element 92212 and a second line element 92222.

In some demonstrative embodiments, as shown in FIG. 29, line elements 92212 and/or 92222 may include vertical line shape elements. In other embodiments, line elements 92212 and/or 92222 may include any other additional or alternative shape, object and/or element.

In some demonstrative embodiments, as shown in FIG. 29, line element 92212 may cross a center of circularly symmetric object 92211, and/or line element 92222 may cross a center of circularly symmetric object 92221.

In some demonstrative embodiments, a distance 92203 between line elements 92212 and 92222 may be preconfigured or preset. In one example, the distance 92203 may be configured based on a typical PD value or a range of PD values.

In some demonstrative embodiments, as shown in FIG. 29, image 92200 may include a first imaged element 92214 of the first element 92212 captured via the first lens 92210.

In some demonstrative embodiments, as shown in FIG. 29, image 92200 may include a second imaged element 92224 of the second element 92222 captured via the second lens 92220.

In some demonstrative embodiments, application 160 (FIG. 1) may be configured to determine the pupillary distance of the lenses 92210 and 92220 assembled in the eyeglasses, for example, based on at least a first distance 92203 between elements 92212 and 92222, and a second distance 92213 between imaged elements 92214 and 92224, e.g., as described below.

In some demonstrative embodiments, as shown in FIG. 29, line elements 92212 and/or 92222 may assist in recognizing and/or evaluating a change or difference between the distance 92213, e.g., as imaged through lenses 92210 and 92220, and the distance 92203, e.g., imaged not through lenses 92210 and 92220.

In some demonstrative embodiments, application 160 (FIG. 1) may utilize a distance of the eyeglasses from a camera, e.g., camera 118 (FIG. 1), which captures image 92202, and powers of the lenses 92210 and 92220, for example, to evaluate the PD from image 92202.

In some demonstrative embodiments, the distance 92203 may be known or calibrated, e.g., as described above.

In some demonstrative embodiments, application 160 (FIG. 1) may be configured to determine the PD of the eyeglasses including lenses 220 and 92220, for example, based on a first distance of the camera, e.g., camera 118 (FIG. 1) from the display, e.g., display 130 (FIG. 1) ("the camera-display distance"), and a second distance of lenses 92210 and 92220 from the camera ("the camera-glasses distance"), e.g., as described below.

In some demonstrative embodiments, the PD may be determined, for example, based on the camera-display distance and the camera-glasses distance, the powers of lenses 92210 and/or 92220, and/or distances 92203 and 92213.

In some demonstrative embodiments, as shown in FIG. 29, image 2202 may include one or more calibration elements 92206.

In some demonstrative embodiments, calibration elements 92206 may be captured in image 92200 not via lenses 92210 and/or 92220.

In some demonstrative embodiments, one or more features of calibration elements 92206 may be known, and/or measured. For example, distances between calibration elements 92206 may be known and/or measured, diameters of calibration elements 92206 may be known and/or measured, and/or the like.

In some demonstrative embodiments, application 160 (FIG. 1) may be configured, for example, to determine the camera-display distance, e.g., based on image 92200.

In some demonstrative embodiments, circularly symmetric objects 92211 and 92221 may be imaged simultaneously via the lenses 92210 and 92220, respectively, while the eyeglasses are located at the camera-glasses distance, e.g., when image 92200 is captured.

In some demonstrative embodiments, a relative magnification of circularly symmetric objects 92211 and 92221 in image 92202, e.g., with respect to the actual sizes of circularly symmetric objects 92211 and 92221, may be calculated, for example, to determine the spherical power and/or cylindrical power and/or axis of lenses 92210 and/or 92220, e.g., separately.

In some demonstrative embodiments, a lateral displacement of the centers of circularly symmetric objects 92211 and 92221 may be seen, for example, by displacement between line elements 92212 and/or 92222 and imaged line elements 92214 and 92224.

In some demonstrative embodiments, the lateral displacement may be derived from image 92200, for example, even without line elements 92212 and/or 92222, for example, based on the centers of circularly symmetric object 92211 and 92221, e.g., as the locations of the centers may be predefined, e.g., with respect to calibration objects 92206.

In some demonstrative embodiments, a lateral displacement of an image of an object through a lens may be determined, for example, based on one or more parameters, e.g., including a lens lateral displacement from an optical axis of the lens, a distance of the lens from the object, a distance of the camera from the object, and/or a power of the lens.

In some demonstrative embodiments, application 160 (FIG. 1) may be configured to determine the distance between the centers of the lenses 92210 and 92220, the power of the lenses 92210 and/or 92220, and/or the cylinder power and axis of the lens, e.g., simultaneously, for example, based on the one or more parameters.

In some demonstrative embodiments, the distance of the eyeglasses from the camera, e.g., the camera-glasses distance, may be determined, for example, based on a given PD of the eyeglasses, for example, using image 92200, e.g., as described below with reference to FIG. 31.

Figure 30:
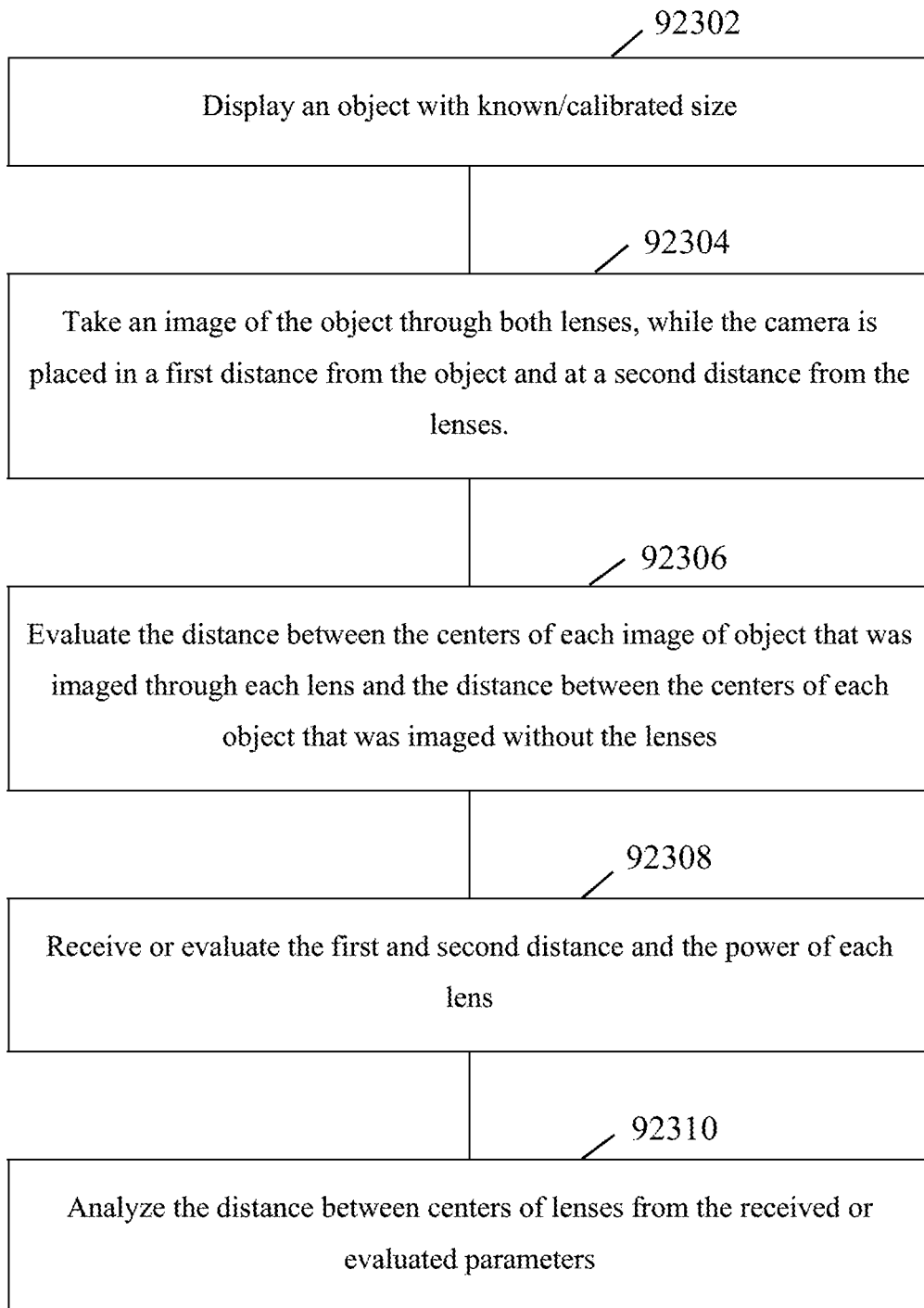
FIG. 30 is a schematic flow-chart illustration of a method of determining a pupillary distance of lenses of eyeglasses, in accordance with some demonstrative embodiments.

Reference is made to FIG. 30, which schematically illustrates a method of determining a pupillary distance of lenses of eyeglasses, in accordance with some demonstrative embodiments. For example, one or operations of the method of FIG. 30 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

As indicated at block 92302, the method may include displaying an object having one or more known or calibrated sizes on a display. For example, application 160 (FIG. 1) may cause display 130 (FIG. 1) to display object 92202 (FIG. 29), e.g., as described above.

As indicated at block 92304, the method may include capturing an image of the object through both lenses of the eyeglasses with a camera, while the camera is placed at a first distance from the object and at a second distance from the lenses. For example, application 160 (FIG. 1) may cause camera 118 (FIG. 1) to capture the image 92200 (FIG. 29) of object 92202 (FIG. 29) via lenses 92210 and 92220 (FIG. 29), for example, while the camera 118 (FIG. 1) is at the camera-display distance and the lens is at the camera-glasses distance, e.g., as described above.

As indicated at block 92306, the method may include determining the distance between imaged centers of the object imaged through each lens, and the distance between the centers of the object imaged without the lenses. For example, application 160 (FIG. 1) may be configured to determine the distance 92213 (FIG. 29) and the distance 92203 (FIG. 29), e.g., as described above.

As indicated at block 92308, the method may include receiving and/or determining one or more parameters to enable a PD calculation, e.g., the first distance, the second distance, and/or the power of each lens. For example, application 160 (FIG. 1) may receive and/or determine the camera-display distance, the camera-glasses distance, and/or the powers of lenses 92210 and 92220 (FIG. 29), e.g., as described above.

As indicated at block 92310, the method may include determining the distance between centers of the lenses, based on the one or more parameters. For example, application 160 (FIG. 1) may determine the PD of the eyeglasses, for example, based on the camera-glasses distance, the camera-display distance, and/or the powers of lenses 92210 and 92220 (FIG. 29), e.g., as described above.

Referring back to FIG. 1, in some demonstrative embodiments, application 160 may be configured to determine a distance between camera 118 and the eyeglasses ("the camera-lens distance"), for example, based on a pupillary distance between lenses of the eyeglasses, e.g., as described below.

Figure 31:
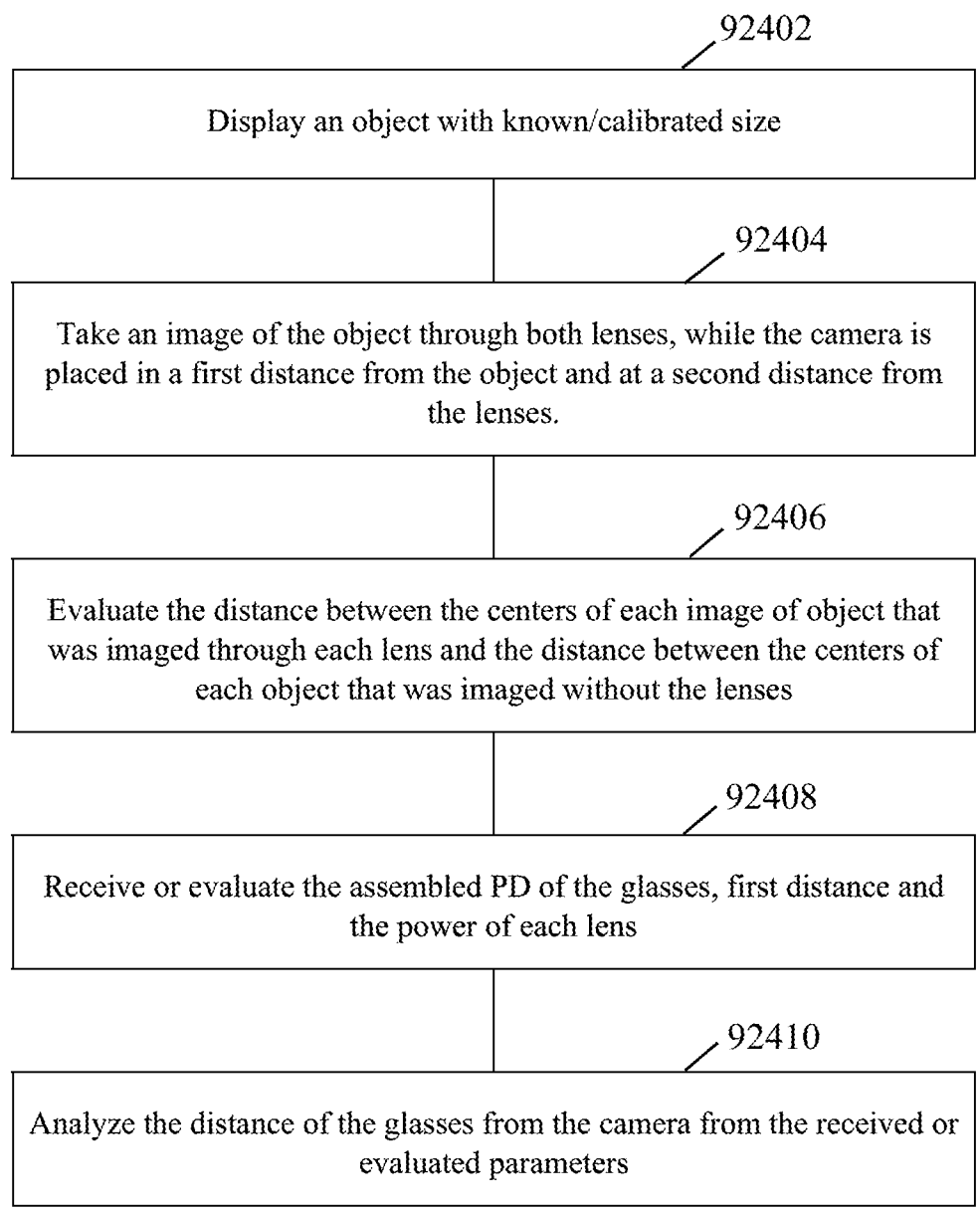
FIG. 31 is a schematic flow-chart illustration of a method of determining a distance between a camera and eyeglasses, in accordance with some demonstrative embodiments.

Reference is made to FIG. 31, which schematically illustrates a method of determining a distance between a camera and eyeglasses, in accordance with some demonstrative embodiments. For example, one or operations of the method of FIG. 31 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

In some demonstrative embodiments, application 160 (FIG. 1) may perform one or more operations of FIG. 31 to determine the camera-lenses distance, for example, based on an estimated or preconfigured pupillary distance of the lenses of the eyeglasses.

As indicated at block 92402, the method may include displaying an object having one or more known or calibrated sizes on a display. For example, application 160 (FIG. 1) may cause display 130 (FIG. 1) to display object 92202 (FIG. 29), e.g., as described above.

As indicated at block 92404, the method may include capturing an image of the object through both lenses of the eyeglasses with a camera, while the camera is placed at a first distance from the object and at a second distance from the lenses. For example, application 160 (FIG. 1) may cause camera 118 (FIG. 1) to capture the image 92200 (FIG. 29) of object 92202 (FIG. 29) via lenses 92210 and 92220 (FIG. 29), for example, while the camera 118 (FIG. 1) is at the camera-display distance and the lens is at the camera-glasses distance, e.g., as described above.

As indicated at block 92406, the method may include determining the distance between imaged centers of the object imaged through each lens, and the distance between the centers of the object imaged without the lenses. For example, application 160 (FIG. 1) may be configured to determine the distance 92213 (FIG. 29) and the distance 92203 (FIG. 29), e.g., as described above.

As indicated at block 92408, the method may include receiving and/or determining one or more parameters, e.g., the PD of the eyeglasses, the first distance, and/or the power of each lens. For example, application 160 (FIG. 1) may receive and/or determine the camera-display distance, the PD of the eyeglasses, and/or the powers of lenses 92210 and 92220 (FIG. 29), e.g., as described above.

As indicated at block 92410, the method may include determining the camera-lens distance, based on the one or more parameters. For example, application 160 (FIG. 1) may determine the camera-glasses distance, for example, based on the camera-display distance, the PD of the eyeglasses, and/or the powers of lenses 92210 and 92220 (FIG. 29), e.g., as described above.

Figure 32:
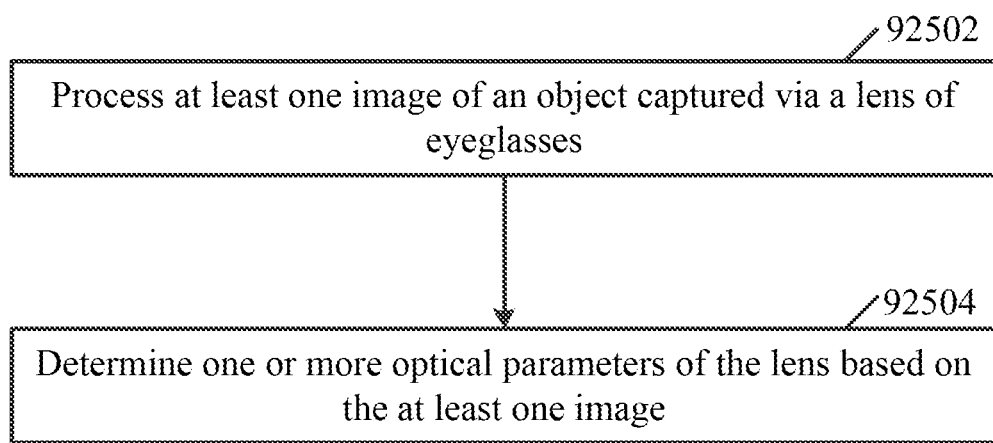
FIG. 32 is a schematic flow-chart illustration of a method of determining one or more optical parameters of a lens, in accordance with some demonstrative embodiments.

Reference is made to FIG. 32, which schematically illustrates a method of determining one or more optical parameters of a lens, in accordance with some demonstrative embodiments. For example, one or operations of the method of FIG. 29 may be performed by a system, e.g., system 100 (FIG. 1); a mobile device, e.g., device 102 (FIG. 1); a server, e.g., server 170 (FIG. 1); a display, e.g., display 130 (FIG. 1); and/or an application, e.g., application 160 (FIG. 1).

As indicated at block 92502, the method may include processing at least one image of an object captured via the lens. For example, application 160 (FIG. 1) may process the at least one image captured via the lens of the object displayed over display 130 (FIG. 1), e.g., as described above.

As indicated at block 92504, the method may include determining the one or more optical parameters of the lens based on the at least one image. For example, application 160 (FIG. 1) may determine the one or more optical parameters of the lens based on the at least one image, e.g., by performing one or more operations as described above with respect to one or more of FIGS. 1-21.

Figure 33:
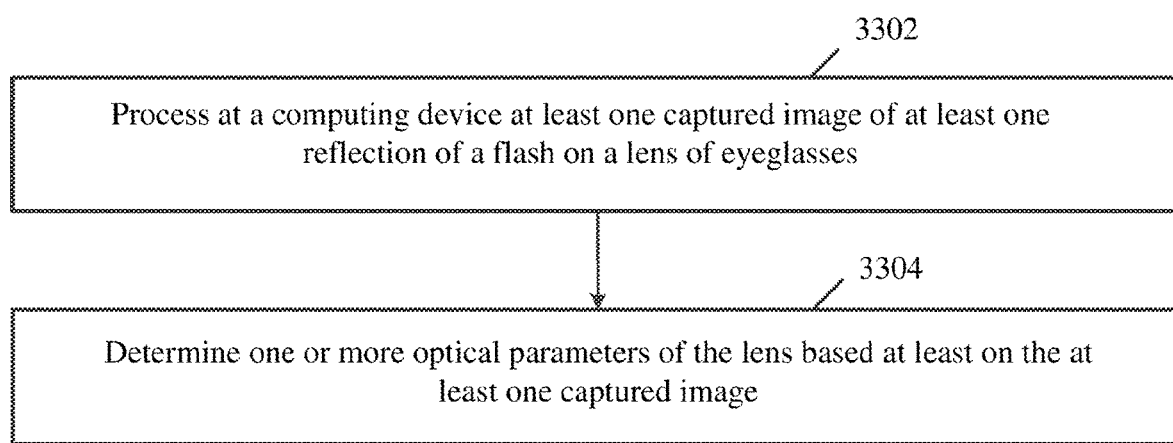
FIG. 33 is a schematic flow-chart illustration of a method of determining one or more optical parameters of a lens, in accordance with some demonstrative embodiments.

Reference is made to FIG. 33, which schematically illustrates a method of determining one or more optical parameters of a lens of eyeglasses, in accordance with some demonstrative embodiments. For example, one or operations of the method of FIG. 33 may be performed by a system, e.g., system 100 (FIG. 1); a computing device, e.g., device 102 (FIG. 1); a server, e.g., server 170 (FIG. 1); a display, e.g., display 130 (FIG. 1); and/or an application, e.g., application 160 (FIG. 1).

As indicated at block 3302, the method may include processing at least one captured image of at least one reflection of a flash on a lens of eyeglasses. For example, application 160 (FIG. 1) may process the at least one captured image of the at least one reflection of the flash 122 (FIG. 1) on the lens of the eyeglasses, e.g., as described above.

As indicated at block 3304, the method may include determining one or more optical parameters of the lens based at least on the at least one captured image. For example, application 160 (FIG. 1) may determine the one or more optical parameters of the lens based at least on the at least one captured image, e.g., as described above.

Figure 34:
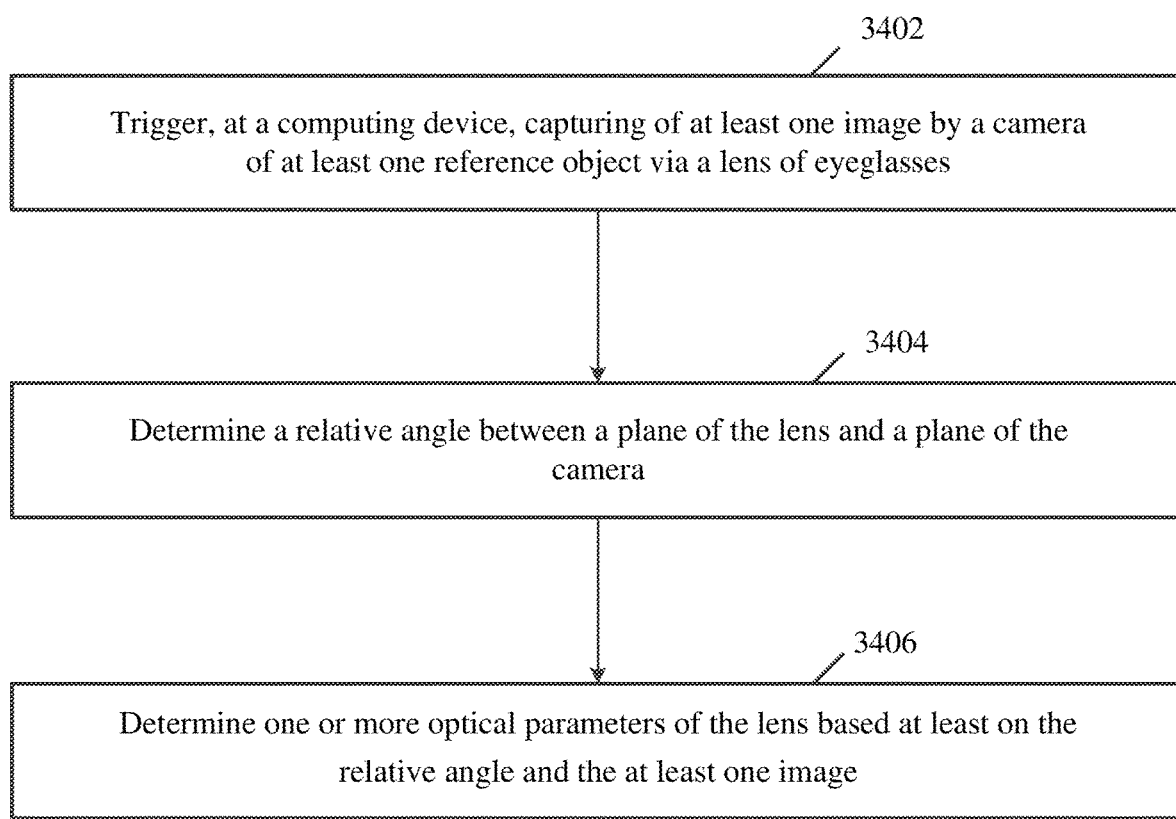
FIG. 34 is a schematic flow-chart illustration of a method of determining one or more optical parameters of a lens, in accordance with some demonstrative embodiments.

Reference is made to FIG. 34, which schematically illustrates a method of determining one or more optical parameters of a lens of eyeglasses, in accordance with some demonstrative embodiments. For example, one or operations of the method of FIG. 34 may be performed by a system, e.g., system 100 (FIG. 1); a computing device, e.g., device 102 (FIG. 1); a server, e.g., server 170 (FIG. 1); a display, e.g., display 130 (FIG. 1); and/or an application, e.g., application 160 (FIG. 1).

As indicated at block 3402, the method may include triggering capturing of at least one image by a camera of at least one reference object via a lens of eyeglasses. For example, application 160 (FIG. 1) may trigger the capturing of the at least one image by the camera 118 (FIG. 1) of the at least one reference object via the lens of the eyeglasses, e.g., as described above.

As indicated at block 3404, the method may include determining a relative angle between a plane of the lens and a plane of the camera. For example, application 160 (FIG. 1) may determine the relative angle between the plane of the lens and the plane of the camera 118 (FIG. 1), e.g., as described above.

As indicated at block 3406, the method may include determining one or more optical parameters of the lens based at least on the relative angle and the at least one image. For example, application 160 (FIG. 1) may determine the one or more optical parameters of the lens based at least on the relative angle and the at least one captured image, e.g., as described above.

Figure 35:
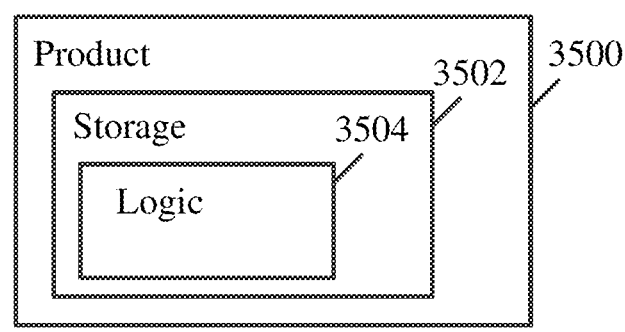
FIG. 35 is a schematic illustration of a product, in accordance with some demonstrative embodiments.

Reference is made to FIG. 35, which schematically illustrates a product of manufacture 3500, in accordance with some demonstrative embodiments. Product 3500 may include one or more tangible computer-readable non-transitory storage media 3502, which may include computer-executable instructions, e.g., implemented by logic 3504, operable to, when executed by at least one computer processor, enable the at least one computer processor to implement one or more operations at device 102 (FIG. 1), server 170 (FIG. 1), display 130 (FIG. 1), and/or application 160 (FIG. 1), and/or to perform, trigger and/or implement one or more operations, communications and/or functionalities according to one or more FIGS. 1-34, and/or one or more operations described herein. The phrase "non-transitory machine-readable medium" is directed to include all computer-readable media, with the sole exception being a transitory propagating signal.

In some demonstrative embodiments, product 3500 and/or machine-readable storage medium 3502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 3502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD- ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 3504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 3504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a product comprising one or more tangible computer-readable non-transitory storage media comprising computer-executable instructions operable to, when executed by at least one computer processor, enable the at least one computer processor to cause a computing device to process at least one captured image of at least one reflection of a flash on a lens of eyeglasses; and determine one or more optical parameters of the lens based at least on the at least one captured image.

Example 2 includes the subject matter of Example 1, and optionally, wherein the captured image comprises an image captured by a camera, the instructions, when executed, cause the computing device to determine the one or more optical parameters of the lens based on the at least one reflection and a relative angle between a plane of the lens and a plane of the camera.

Example 3 includes the subject matter of Example 2, and optionally, wherein the instructions, when executed, cause the computing device to determine the relative angle based on the at least one reflection.

Example 4 includes the subject matter of Example 2 or 3, and optionally, wherein the at least one reflection comprises a first reflection of the flash on a front surface of the lens and a second reflection of the flash on a back surface of the lens, the instructions, when executed, cause the computing device to determine the relative angle based on at least one displacement between the first and second reflections.

Example 5 includes the subject matter of Example 4, and optionally, wherein the at least one displacement comprises at least one of a vertical displacement or a horizontal displacement.

Example 6 includes the subject matter of any one of Examples 2-5, and optionally, wherein the instructions, when executed, cause the computing device to determine the relative angle based on a relative location of the at least one reflection relative to a center of the lens.

Example 7 includes the subject matter of Example 6, and optionally, wherein the captured image comprises a first reference object image of a first reference object captured via the lens and a second reference object image of a second reference object captured not via the lens, the instructions, when executed, cause the computing device to determine the center of the lens based on the first reference object image and the second reference object image.

Example 8 includes the subject matter of any one of Examples 1-7, and optionally, wherein the instructions, when executed, cause the computing device to determine a spherical power of the lens based on a diameter size of the at least one reflection in the captured image.

Example 9 includes the subject matter of any one of Examples 1-8, and optionally, wherein the instructions, when executed, cause the computing device to determine at least one of a cylindrical power of the lens or a cylindrical axis of the lens based on a deformation of the at least one reflection in the captured image.

Example 10 includes the subject matter of any one of Examples 1-9, and optionally, wherein the captured image comprises a reference object image of a reference object captured by a camera via the lens, the instructions, when executed, cause the computing device to determine one or more estimated optical parameters of the lens based on a comparison between the reference object and the reference object image; to determine a relative angle between a plane of the lens and a plane of the camera based on the at least one reflection; and to determine the one or more optical parameters of the lens based on the relative angle and the one or more estimated optical parameters.

Example 11 includes the subject matter of Example 10, and optionally, wherein the instructions, when executed, cause the computing device to determine an estimated spherical power of the lens based on a magnification between a reference dimension of the reference object and an imaged dimension of the reference dimension in the reference object image, and to determine a spherical power of the lens based on the relative angle and the estimated spherical power.

Example 12 includes the subject matter of Example 10 or 11, and optionally, wherein the instructions, when executed, cause the computing device to determine at least one of an estimated cylindrical power of the lens or an estimated cylindrical axis of the lens based on a deformation between one or more reference dimensions of the reference object and one or more respective imaged dimensions of the one or more reference dimensions in the reference object image, and to determine at least one of a cylindrical power of the lens or a cylindrical axis of the lens based on the relative angle and at least one of the estimated cylindrical power or the estimated cylindrical axis.

Example 13 includes the subject matter of any one of Examples 1-12, and optionally, wherein the at least one reflection comprises a first reflection of the flash from a front surface of the lens, and a second reflection of the flash from a back surface of the lens.

Example 14 includes the subject matter of Example 13, and optionally, wherein the captured image comprises a reference object image of a reference object captured via the lens, the instructions, when executed, cause the computing device to determine the one or more optical parameters of the lens based on a comparison between the reference object and the reference object image when the first and second reflections coincide in the captured image.

Example 15 includes the subject matter of Example 14, and optionally, wherein the instructions, when executed, cause the computing device to trigger an instruction to a user to rotate the eyeglasses at least until the first and second reflections coincide.

Example 16 includes the subject matter of any one of Examples 1-15, and optionally, wherein the instructions, when executed, cause the computing device to trigger capturing of the at least one captured image.

Example 17 includes the subject matter of any one of Examples 1-16, and optionally, wherein the one or more optical parameters comprise at least a spherical power of the lens.

Example 18 includes the subject matter of any one of Examples 1-17, and optionally, wherein the one or more optical parameters comprise at least one of a cylindrical power or a cylindrical axis of the lens.

Example 19 includes a mobile device comprising a camera to capture at least one image of at least one reflection of a flash on a lens of eyeglasses; and a lensometer module to determine one or more optical parameters of the lens based at least on the at least one captured image.

Example 20 includes the subject matter of Example 19, and optionally, wherein the captured image comprises an image captured by a camera, the lensometer module to determine the one or more optical parameters of the lens based on the at least one reflection and a relative angle between a plane of the lens and a plane of the camera.

Example 21 includes the subject matter of Example 20, and optionally, wherein the lensometer module is to determine the relative angle based on the at least one reflection.

Example 22 includes the subject matter of Example 20 or 21, and optionally, wherein the at least one reflection comprises a first reflection of the flash on a front surface of the lens and a second reflection of the flash on a back surface of the lens, the lensometer module to determine the relative angle based on at least one displacement between the first and second reflections.

Example 23 includes the subject matter of Example 22, and optionally, wherein the at least one displacement comprises at least one of a vertical displacement or a horizontal displacement.

Example 24 includes the subject matter of any one of Examples 20-23, and optionally, wherein the lensometer module is to determine the relative angle based on a relative location of the at least one reflection relative to a center of the lens.

Example 25 includes the subject matter of Example 24, and optionally, wherein the captured image comprises a first reference object image of a first reference object captured via the lens and a second reference object image of a second reference object captured not via the lens, the lensometer module to determine the center of the lens based on the first reference object image and the second reference object image.

Example 26 includes the subject matter of any one of Examples 19-25, and optionally, wherein the lensometer module is to determine a spherical power of the lens based on a diameter size of the at least one reflection in the captured image.

Example 27 includes the subject matter of any one of Examples 19-26, and optionally, wherein the lensometer module is to determine at least one of a cylindrical power of the lens or a cylindrical axis of the lens based on a deformation of the at least one reflection in the captured image.

Example 28 includes the subject matter of any one of Examples 19-27, and optionally, wherein the captured image comprises a reference object image of a reference object captured by a camera via the lens, the lensometer module to determine one or more estimated optical parameters of the lens based on a comparison between the reference object and the reference object image; to determine a relative angle between a plane of the lens and a plane of the camera based on the at least one reflection; and to determine the one or more optical parameters of the lens based on the relative angle and the one or more estimated optical parameters.

Example 29 includes the subject matter of Example 28, and optionally, wherein the lensometer module is to determine an estimated spherical power of the lens based on a magnification between a reference dimension of the reference object and an imaged dimension of the reference dimension in the reference object image, and to determine a spherical power of the lens based on the relative angle and the estimated spherical power.

Example 30 includes the subject matter of Example 28 or 29, and optionally, wherein the lensometer module is to determine at least one of an estimated cylindrical power of the lens or an estimated cylindrical axis of the lens based on a deformation between one or more reference dimensions of the reference object and one or more respective imaged dimensions of the one or more reference dimensions in the reference object image, and to determine at least one of a cylindrical power of the lens or a cylindrical axis of the lens based on the relative angle and at least one of the estimated cylindrical power or the estimated cylindrical axis.

Example 31 includes the subject matter of any one of Examples 19-30, and optionally, wherein the at least one reflection comprises a first reflection of the flash from a front surface of the lens, and a second reflection of the flash from a back surface of the lens.

Example 32 includes the subject matter of Example 31, and optionally, wherein the captured image comprises a reference object image of a reference object captured via the lens, the lensometer module to determine the one or more optical parameters of the lens based on a comparison between the reference object and the reference object image when the first and second reflections coincide in the captured image.

Example 33 includes the subject matter of Example 32, and optionally, wherein the lensometer module is to trigger an instruction to a user to rotate the eyeglasses at least until the first and second reflections coincide.

Example 34 includes the subject matter of any one of Examples 19-33, and optionally, wherein the lensometer module is to trigger capturing of the at least one captured image.

Example 35 includes the subject matter of any one of Examples 19-34, and optionally, wherein the one or more optical parameters comprise at least a spherical power of the lens.

Example 36 includes the subject matter of any one of Examples 19-35, and optionally, wherein the one or more optical parameters comprise at least one of a cylindrical power or a cylindrical axis of the lens.

Example 37 includes a method of determining one or more optical parameters of a lens of eyeglasses, the method comprising processing at least one captured image of at least one reflection of a flash on the lens of the eyeglasses; and determining the one or more optical parameters of the lens based at least on the at least one captured image.

Example 38 includes the subject matter of Example 37, and optionally, wherein the captured image comprises an image captured by a camera, the method comprising determining the one or more optical parameters of the lens based on the at least one reflection and a relative angle between a plane of the lens and a plane of the camera.

Example 39 includes the subject matter of Example 38, and optionally, comprising determining the relative angle based on the at least one reflection.

Example 40 includes the subject matter of Example 38 or 39, and optionally, wherein the at least one reflection comprises a first reflection of the flash on a front surface of the lens and a second reflection of the flash on a back surface of the lens, the method comprising determining the relative angle based on at least one displacement between the first and second reflections.

Example 41 includes the subject matter of Example 40, and optionally, wherein the at least one displacement comprises at least one of a vertical displacement or a horizontal displacement.

Example 42 includes the subject matter of any one of Examples 38-41, and optionally, comprising determining the relative angle based on a relative location of the at least one reflection relative to a center of the lens.

Example 43 includes the subject matter of Example 42, and optionally, wherein the captured image comprises a first reference object image of a first reference object captured via the lens and a second reference object image of a second reference object captured not via the lens, the method comprising determining the center of the lens based on the first reference object image and the second reference object image.

Example 44 includes the subject matter of any one of Examples 37-43, and optionally, comprising determining a spherical power of the lens based on a diameter size of the at least one reflection in the captured image.

Example 45 includes the subject matter of any one of Examples 37-44, and optionally, comprising determining at least one of a cylindrical power of the lens or a cylindrical axis of the lens based on a deformation of the at least one reflection in the captured image.

Example 46 includes the subject matter of any one of Examples 37-45, and optionally, wherein the captured image comprises a reference object image of a reference object captured by a camera via the lens, the method comprising determining one or more estimated optical parameters of the lens based on a comparison between the reference object and the reference object image; determining a relative angle between a plane of the lens and a plane of the camera based on the at least one reflection; and determining the one or more optical parameters of the lens based on the relative angle and the one or more estimated optical parameters.

Example 47 includes the subject matter of Example 46, and optionally, comprising determining an estimated spherical power of the lens based on a magnification between a reference dimension of the reference dimension and an imaged dimension of the reference dimension in the reference object image, and determining a spherical power of the lens based on the relative angle and the estimated spherical power.

Example 48 includes the subject matter of Example 46 or 47, and optionally, comprising determining at least one of an estimated cylindrical power of the lens or an estimated cylindrical axis of the lens based on a deformation between one or more reference dimensions of the reference object and one or more respective imaged dimensions of the one or more reference dimensions in the reference object image, and determining at least one of a cylindrical power of the lens or a cylindrical axis of the lens based on the relative angle and at least one of the estimated cylindrical power or the estimated cylindrical axis.

Example 49 includes the subject matter of any one of Examples 37-48, and optionally, wherein the at least one reflection comprises a first reflection of the flash from a front surface of the lens, and a second reflection of the flash from a back surface of the lens.

Example 50 includes the subject matter of Example 49, and optionally, wherein the captured image comprises a reference object image of a reference object captured via the lens, the method comprising determining the one or more optical parameters of the lens based on a comparison between the reference object and the reference object image when the first and second reflections coincide in the captured image.

Example 51 includes the subject matter of Example 50, and optionally, comprising triggering an instruction to a user to rotate the eyeglasses at least until the first and second reflections coincide.

Example 52 includes the subject matter of any one of Examples 37-51, and optionally, comprising triggering capturing of the at least one captured image.

Example 53 includes the subject matter of any one of Examples 37-52, and optionally, wherein the one or more optical parameters comprise at least a spherical power of the lens.

Example 54 includes the subject matter of any one of Examples 37-53, and optionally, wherein the one or more optical parameters comprise at least one of a cylindrical power or a cylindrical axis of the lens.

Example 55 includes an apparatus to determine one or more optical parameters of a lens of eyeglasses, the apparatus comprising means for processing at least one captured image of at least one reflection of a flash on the lens of the eyeglasses; and means for determining the one or more optical parameters of the lens based at least on the at least one captured image.

Example 56 includes the subject matter of Example 55, and optionally, wherein the captured image comprises an image captured by a camera, the apparatus comprising means for determining the one or more optical parameters of the lens based on the at least one reflection and a relative angle between a plane of the lens and a plane of the camera.

Example 57 includes the subject matter of Example 56, and optionally, comprising means for determining the relative angle based on the at least one reflection.

Example 58 includes the subject matter of Example 55 or 57, and optionally, wherein the at least one reflection comprises a first reflection of the flash on a front surface of the lens and a second reflection of the flash on a back surface of the lens, the apparatus comprising means for determining the relative angle based on at least one displacement between the first and second reflections.

Example 59 includes the subject matter of Example 58, and optionally, wherein the at least one displacement comprises at least one of a vertical displacement or a horizontal displacement.

Example 60 includes the subject matter of any one of Examples 56-59, and optionally, comprising means for determining the relative angle based on a relative location of the at least one reflection relative to a center of the lens.

Example 61 includes the subject matter of Example 60, and optionally, wherein the captured image comprises a first reference object image of a first reference object captured via the lens and a second reference object image of a second reference object captured not via the lens, the apparatus comprising means for determining the center of the lens based on the first reference object image and the second reference object image.

Example 62 includes the subject matter of any one of Examples 55-61, and optionally, comprising means for determining a spherical power of the lens based on a diameter size of the at least one reflection in the captured image.

Example 63 includes the subject matter of any one of Examples 55-62, and optionally, comprising means for determining at least one of a cylindrical power of the lens or a cylindrical axis of the lens based on a deformation of the at least one reflection in the captured image.

Example 64 includes the subject matter of any one of Examples 55-63, and optionally, wherein the captured image comprises a reference object image of a reference object captured by a camera via the lens, the apparatus comprising means for determining one or more estimated optical parameters of the lens based on a comparison between the reference object and the reference object image; determining a relative angle between a plane of the lens and a plane of the camera based on the at least one reflection; and determining the one or more optical parameters of the lens based on the relative angle and the one or more estimated optical parameters.

Example 65 includes the subject matter of Example 64, and optionally, comprising means for determining an estimated spherical power of the lens based on a magnification between a reference dimension of the reference object and an imaged dimension of the reference dimension in the reference object image, and determining a spherical power of the lens based on the relative angle and the estimated spherical power.

Example 66 includes the subject matter of Example 64 or 65, and optionally, comprising means for determining at least one of an estimated cylindrical power of the lens or an estimated cylindrical axis of the lens based on a deformation between one or more reference dimensions of the reference object and one or more respective imaged dimensions of the one or more reference dimensions in the reference object image, and determining at least one of a cylindrical power of the lens or a cylindrical axis of the lens based on the relative angle and at least one of the estimated cylindrical power or the estimated cylindrical axis.

Example 67 includes the subject matter of any one of Examples 55-66, and optionally, wherein the at least one reflection comprises a first reflection of the flash from a front surface of the lens, and a second reflection of the flash from a back surface of the lens.

Example 68 includes the subject matter of Example 67, and optionally, wherein the captured image comprises a reference object image of a reference object captured via the lens, the apparatus comprising means for determining the one or more optical parameters of the lens based on a comparison between the reference object and the reference object image when the first and second reflections coincide in the captured image.

Example 69 includes the subject matter of Example 68, and optionally, comprising means for triggering an instruction to a user to rotate the eyeglasses at least until the first and second reflections coincide.

Example 70 includes the subject matter of any one of Examples 55-69, and optionally, comprising means for triggering capturing of the at least one captured image.

Example 71 includes the subject matter of any one of Examples 55-70, and optionally, wherein the one or more optical parameters comprise at least a spherical power of the lens.

Example 72 includes the subject matter of any one of Examples 55-71, and optionally, wherein the one or more optical parameters comprise at least one of a cylindrical power or a cylindrical axis of the lens Example 73 includes a product comprising one or more tangible computer-readable non-transitory storage media comprising computer-executable instructions operable to, when executed by at least one computer processor, enable the at least one computer processor to cause a computing device to trigger capturing of at least one image by a camera of at least one reference object via a lens of eyeglasses; determine a relative angle between a plane of the lens and a plane of the camera; and determine one or more optical parameters of the lens based at least on the relative angle and the at least one image.

Example 74 includes the subject matter of Example 73, and optionally, wherein the instructions, when executed, cause the computing device to determine the relative angle based on a comparison between the reference object and at least one object image of the reference object in the at least one image.

Example 75 includes the subject matter of Example 74, and optionally, wherein the at least one image comprises at least one reflection of a flash on the lens, the instructions, when executed, cause the computing device to determine one or more estimated optical parameters of the lens based on the at least one reflection, and to determine the one or more optical parameters of the lens based on the relative angle and the one or more estimated optical parameters of the lens.

Example 76 includes the subject matter of Example 75, and optionally, wherein the instructions, when executed, cause the computing device to determine an estimated spherical power of the lens based on a diameter size of the at least one reflection in the image.

Example 77 includes the subject matter of Example 75 or 76, and optionally, wherein the instructions, when executed, cause the computing device to determine at least one of an estimated cylindrical power of the lens or an estimated cylindrical axis of the lens based on a deformation of the at least one reflection in the image.

Example 78 includes the subject matter of any one of Examples 73-77, and optionally, wherein the at least one image comprises at least one reflection of a flash on the lens, the instructions, when executed, cause the computing device to determine the relative angle based on the at least one reflection.

Example 79 includes the subject matter of Example 78, and optionally, wherein the at least one reflection comprises a first reflection of the flash on a front surface of the lens and a second reflection of the flash on a back surface of the lens, the instructions, when executed, cause the computing device to determine the relative angle based on at least one displacement between the first and second reflections.

Example 80 includes the subject matter of Example 79, and optionally, wherein the at least one displacement comprises at least one of a vertical displacement or a horizontal displacement.

Example 81 includes the subject matter of any one of Examples 78-80, and optionally, wherein the instructions, when executed, cause the computing device to determine the relative angle based on a relative location of the at least one reflection relative to a center of the lens.

Example 82 includes the subject matter of Example 81, and optionally, wherein the image comprises a first reference object image of a first reference object captured via the lens and a second reference object image of a second reference object captured not via the lens, the instructions, when executed, cause the computing device to determine the center of the lens based on the first reference object image and the second reference object image.

Example 83 includes the subject matter of any one of Examples 78-82, and optionally, wherein the instructions, when executed, cause the computing device to determine one or more estimated optical parameters of the lens based on a comparison between the reference object and at least one object image of the reference object in the at least one image, and to determine the one or more optical parameters of the lens based on the relative angle and the one or more estimated optical parameters of the lens.

Example 84 includes the subject matter of Example 83, and optionally, wherein the instructions, when executed, cause the computing device to determine an estimated spherical power of the lens based on a magnification between a reference dimension of the reference object and an imaged dimension of the reference dimension in the reference object image, and to determine a spherical power of the lens based on the relative angle and the estimated spherical power.

Example 85 includes the subject matter of Example 83 or 84, and optionally, wherein the instructions, when executed, cause the computing device to determine at least one of an estimated cylindrical power of the lens or an estimated cylindrical axis of the lens based on a deformation between one or more reference dimensions of the reference object and one or more respective imaged dimensions of the one or more reference dimensions in the reference object image, and to determine at least one of a cylindrical power of the lens or a cylindrical axis of the lens based on the relative angle and at least one of the estimated cylindrical power or the estimated cylindrical axis.

Example 86 includes the subject matter of any one of Examples 73-85, and optionally, wherein the one or more optical parameters comprise at least a spherical power of the lens.

Example 87 includes the subject matter of any one of Examples 73-86, and optionally, wherein the one or more optical parameters comprise at least one of a cylindrical power or a cylindrical axis of the lens.

Example 88 includes a mobile device comprising a camera to capture at least one image of at least one reference object via a lens of eyeglasses; and a lensometer module to determine a relative angle between a plane of the lens and a plane of the camera, and to determine one or more optical parameters of the lens based at least on the relative angle and the at least one image.

Example 89 includes the subject matter of Example 88, and optionally, wherein the lensometer module is to determine the relative angle based on a comparison between the reference object and at least one object image of the reference object in the at least one image.

Example 90 includes the subject matter of Example 89, and optionally, wherein the at least one image comprises at least one reflection of a flash on the lens, the lensometer module to determine one or more estimated optical parameters of the lens based on the at least one reflection, and to determine the one or more optical parameters of the lens based on the relative angle and the one or more estimated optical parameters of the lens.

Example 91 includes the subject matter of Example 90, and optionally, wherein the lensometer module is to determine an estimated spherical power of the lens based on a diameter size of the at least one reflection in the image.

Example 92 includes the subject matter of Example 90 or 91, and optionally, wherein the lensometer module is to determine at least one of an estimated cylindrical power of the lens or an estimated cylindrical axis of the lens based on a deformation of the at least one reflection in the image.

Example 93 includes the subject matter of any one of Examples 88-92, and optionally, wherein the at least one image comprises at least one reflection of a flash on the lens, the lensometer module to determine the relative angle based on the at least one reflection.

Example 94 includes the subject matter of Example 93, and optionally, wherein the at least one reflection comprises a first reflection of the flash on a front surface of the lens and a second reflection of the flash on a back surface of the lens, the lensometer module to determine the relative angle based on at least one displacement between the first and second reflections.

Example 95 includes the subject matter of Example 94, and optionally, wherein the at least one displacement comprises at least one of a vertical displacement or a horizontal displacement.

Example 96 includes the subject matter of any one of Examples 93-95, and optionally, wherein the lensometer module is to determine the relative angle based on a relative location of the at least one reflection relative to a center of the lens.

Example 97 includes the subject matter of Example 96, and optionally, wherein the image comprises a first reference object image of a first reference object captured via the lens and a second reference object image of a second reference object captured not via the lens, the lensometer module to determine the center of the lens based on the first reference object image and the second reference object image.

Example 98 includes the subject matter of any one of Examples 93-97, and optionally, wherein the lensometer module is to determine one or more estimated optical parameters of the lens based on a comparison between the reference object and at least one object image of the reference object in the at least one image, and to determine the one or more optical parameters of the lens based on the relative angle and the one or more estimated optical parameters of the lens.

Example 99 includes the subject matter of Example 98, and optionally, wherein the lensometer module is to determine an estimated spherical power of the lens based on a magnification between a reference dimension of the reference object and an imaged dimension of the reference dimension in the reference object image, and to determine a spherical power of the lens based on the relative angle and the estimated spherical power.

Example 100 includes the subject matter of Example 99 or 99, and optionally, wherein the lensometer module is to determine at least one of an estimated cylindrical power of the lens or an estimated cylindrical axis of the lens based on a deformation between one or more reference dimensions of the reference object and one or more respective imaged dimensions of the one or more reference dimensions in the reference object image, and to determine at least one of a cylindrical power of the lens or a cylindrical axis of the lens based on the relative angle and at least one of the estimated cylindrical power or the estimated cylindrical axis.

Example 101 includes the subject matter of any one of Examples 88-100, and optionally, wherein the one or more optical parameters comprise at least a spherical power of the lens.

Example 102 includes the subject matter of any one of Examples 88-101, and optionally, wherein the one or more optical parameters comprise at least one of a cylindrical power or a cylindrical axis of the lens.

Example 103 includes a method of determining one or more optical parameters of a lens of eyeglasses, the method comprising capturing at least one image by a camera of at least one reference object via a lens of eyeglasses; determining a relative angle between a plane of the lens and a plane of the camera; and determining one or more optical parameters of the lens based at least on the relative angle and the at least one image.

Example 104 includes the subject matter of Example 103, and optionally, comprising determining the relative angle based on a comparison between the reference object and at least one object image of the reference object in the at least one image.

Example 105 includes the subject matter of Example 104, and optionally, wherein the at least one image comprises at least one reflection of a flash on the lens, the method comprising determining one or more estimated optical parameters of the lens based on the at least one reflection, and determining the one or more optical parameters of the lens based on the relative angle and the one or more estimated optical parameters of the lens.

Example 106 includes the subject matter of Example 105, and optionally, comprising determining an estimated spherical power of the lens based on a diameter size of the at least one reflection in the image.

Example 107 includes the subject matter of Example 105 or 106, and optionally, comprising determining at least one of an estimated cylindrical power of the lens or an estimated cylindrical axis of the lens based on a deformation of the at least one reflection in the image.

Example 108 includes the subject matter of any one of Examples 103-107, and optionally, wherein the at least one image comprises at least one reflection of a flash on the lens, the method comprising determining the relative angle based on the at least one reflection.

Example 109 includes the subject matter of Example 108, and optionally, wherein the at least one reflection comprises a first reflection of the flash on a front surface of the lens and a second reflection of the flash on a back surface of the lens, the method comprising determining the relative angle based on at least one displacement between the first and second reflections.

Example 110 includes the subject matter of Example 109, and optionally, wherein the at least one displacement comprises at least one of a vertical displacement or a horizontal displacement.

Example 111 includes the subject matter of any one of Examples 108-110, and optionally, comprising determining the relative angle based on a relative location of the at least one reflection relative to a center of the lens.

Example 112 includes the subject matter of Example 111, and optionally, wherein the image comprises a first reference object image of a first reference object captured via the lens and a second reference object image of a second reference object captured not via the lens, the method comprising determining the center of the lens based on the first reference object image and the second reference object image.

Example 113 includes the subject matter of any one of Examples 108-112, and optionally, comprising determining one or more estimated optical parameters of the lens based on a comparison between the reference object and at least one object image of the reference object in the at least one image, and determining the one or more optical parameters of the lens based on the relative angle and the one or more estimated optical parameters of the lens.

Example 114 includes the subject matter of Example 113, and optionally, comprising determining an estimated spherical power of the lens based on a magnification between a reference dimension of the reference object and an imaged dimension of the reference dimension in the reference object image, and determining a spherical power of the lens based on the relative angle and the estimated spherical power.

Example 115 includes the subject matter of Example 113 or 114, and optionally, comprising determining at least one of an estimated cylindrical power of the lens or an estimated cylindrical axis of the lens based on a deformation between one or more reference dimensions of the reference object and one or more respective imaged dimensions of the one or more reference dimensions in the reference object image, and determining at least one of a cylindrical power of the lens or a cylindrical axis of the lens based on the relative angle and at least one of the estimated cylindrical power or the estimated cylindrical axis.

Example 116 includes the subject matter of any one of Examples 103-115, and optionally, wherein the one or more optical parameters comprise at least a spherical power of the lens.

Example 117 includes the subject matter of any one of Examples 103-116, and optionally, wherein the one or more optical parameters comprise at least one of a cylindrical power or a cylindrical axis of the lens.

Example 118 includes an apparatus to determine one or more optical parameters of a lens of eyeglasses, the apparatus comprising means for capturing at least one image by a camera of at least one reference object via a lens of eyeglasses; means for determining a relative angle between a plane of the lens and a plane of the camera; and means for determining one or more optical parameters of the lens based at least on the relative angle and the at least one image.

Example 119 includes the subject matter of Example 118, and optionally, comprising means for determining the relative angle based on a comparison between the reference object and at least one object image of the reference object in the at least one image.

Example 120 includes the subject matter of Example 119, and optionally, wherein the at least one image comprises at least one reflection of a flash on the lens, the apparatus comprising means for determining one or more estimated optical parameters of the lens based on the at least one reflection, and determining the one or more optical parameters of the lens based on the relative angle and the one or more estimated optical parameters of the lens.

Example 121 includes the subject matter of Example 120, and optionally, comprising means for determining an estimated spherical power of the lens based on a diameter size of the at least one reflection in the image.

Example 122 includes the subject matter of Example 120 or 121, and optionally, comprising means for determining at least one of an estimated cylindrical power of the lens or an estimated cylindrical axis of the lens based on a deformation of the at least one reflection in the image.

Example 123 includes the subject matter of any one of Examples 118-122, and optionally, wherein the at least one image comprises at least one reflection of a flash on the lens, the apparatus comprising means for determining the relative angle based on the at least one reflection.

Example 124 includes the subject matter of Example 123, and optionally, wherein the at least one reflection comprises a first reflection of the flash on a front surface of the lens and a second reflection of the flash on a back surface of the lens, the apparatus comprising means for determining the relative angle based on at least one displacement between the first and second reflections.

Example 125 includes the subject matter of Example 124, and optionally, wherein the at least one displacement comprises at least one of a vertical displacement or a horizontal displacement.

Example 126 includes the subject matter of any one of Examples 123-125, and optionally, comprising means for determining the relative angle based on a relative location of the at least one reflection relative to a center of the lens.

Example 127 includes the subject matter of Example 126, and optionally, wherein the image comprises a first reference object image of a first reference object captured via the lens and a second reference object image of a second reference object captured not via the lens, the apparatus comprising means for determining the center of the lens based on the first reference object image and the second reference object image.

Example 128 includes the subject matter of any one of Examples 123-127, and optionally, comprising means for determining one or more estimated optical parameters of the lens based on a comparison between the reference object and at least one object image of the reference object in the at least one image, and determining the one or more optical parameters of the lens based on the relative angle and the one or more estimated optical parameters of the lens.

Example 129 includes the subject matter of Example 128, and optionally, comprising means for determining an estimated spherical power of the lens based on a magnification between a reference dimension of the reference object and an imaged dimension of the reference dimension in the reference object image, and determining a spherical power of the lens based on the relative angle and the estimated spherical power.

Example 130 includes the subject matter of Example 128 or 129, and optionally, comprising means for determining at least one of an estimated cylindrical power of the lens or an estimated cylindrical axis of the lens based on a deformation between one or more reference dimensions of the reference object and one or more respective imaged dimensions of the one or more reference dimensions in the reference object image, and determining at least one of a cylindrical power of the lens or a cylindrical axis of the lens based on the relative angle and at least one of the estimated cylindrical power or the estimated cylindrical axis.

Example 131 includes the subject matter of any one of Examples 118-130, and optionally, wherein the one or more optical parameters comprise at least a spherical power of the lens.

Example 132 includes the subject matter of any one of Examples 118-131, and optionally, wherein the one or more optical parameters comprise at least one of a cylindrical power or a cylindrical axis of the lens.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A product comprising one or more tangible computer-readable non-transitory storage media comprising computer-executable instructions operable to, when executed by at least one computer processor, enable the at least one computer processor to cause a computing device to:

process at least one captured image of at least one reflection of a flash on a lens of eyeglasses, the captured image comprises a reference object image of a reference object captured by a camera via said lens; and determine one or more optical parameters of said lens based at least on said at least one captured image, wherein the instructions, when executed, cause the computing device to determine one or more estimated optical parameters of said lens based on a comparison between said reference object and said reference object image: to determine a relative angle between a plane of said lens and a plane of said camera based on said at least one reflection; and to determine the one or more optical parameters of said lens based on said relative angle and said one or more estimated optical parameters, wherein the instructions, when executed, cause the computing device to determine an estimated spherical power of said lens based on a magnification between a reference dimension of said reference object and an imaged dimension of said reference dimension in said reference object image, and to determine a spherical power of said lens based on said relative angle and the estimated spherical power.

2. The product of claim 1, wherein the instructions, when executed, cause the computing device to trigger capturing of said at least one captured image.

3. A product comprising one or more tangible computer-readable non-transitory storage media comprising computer-executable instructions operable to, when executed by at least one computer processor, enable the at least one computer processor to cause a computing device to:

process at least one captured image of at least one reflection of a flash on a lens of eyeglasses, the captured image comprises a reference object image of a reference object captured by a camera via said lens; and determine one or more optical parameters of said lens based at least on said at least one captured image, wherein the instructions, when executed, cause the computing device to determine one or more estimated optical parameters of said lens based on a comparison between said reference object and said reference object image: to determine a relative angle between a plane of said lens and a plane of said camera based on said at least one reflection; and to determine the one or more optical parameters of said lens based on said relative angle and said one or more estimated optical parameters, wherein the instructions, when executed, cause the computing device to determine at least one of an estimated cylindrical power of said lens or an estimated cylindrical axis of said lens based on a deformation between one or more reference dimensions of said reference object and one or more respective imaged dimensions of said one or more reference dimensions in said reference object image, and to determine at least one of a cylindrical power of said lens or a cylindrical axis of said lens based on said relative angle and at least one of the estimated cylindrical power or the estimated cylindrical axis.

4. The product of claim 3, wherein the instructions, when executed, cause the computing device to trigger capturing of said at least one captured image.

5. A product comprising one or more tangible computer-readable non-transitory storage media comprising computer-executable instructions operable to, when executed by at least one computer processor, enable the at least one computer processor to cause a computing device to:
capture at least one image by a camera of at least one reference object via a lens of eyeglasses;
determine a relative angle between a plane of said lens and a plane of said camera; and
determine one or more optical parameters of said lens based at least on said relative angle and said at least one image.

6. The product of claim 5, wherein the instructions, when executed, cause the computing device to determine the relative angle based on a comparison between said reference object and at least one object image of said reference object in said at least one image.

7. The product of claim 6, wherein the at least one image comprises at least one reflection of a flash on the lens, the instructions, when executed, cause the computing device to determine one or more estimated optical parameters of said lens based on said at least one reflection, and to determine the one or more optical parameters of said lens based on said relative angle and the one or more estimated optical parameters of said lens.

8. The product of claim 7, wherein the instructions, when executed, cause the computing device to determine an estimated spherical power of said lens based on a diameter size of said at least one reflection in said image.

9. The product of claim 7, wherein the instructions, when executed, cause the computing device to determine at least one of an estimated cylindrical power of said lens or an estimated cylindrical axis of said lens based on a deformation of the at least one reflection in said image.

10. The meth product of claim 5, wherein the at least one image comprises at least one reflection of a flash on the lens, the instructions, when executed, cause the computing device to determine the relative angle based on said at least one reflection.

11. The product of claim 10, wherein said at least one reflection comprises a first reflection of said flash on a front surface of said lens and a second reflection of said flash on a back surface of said lens, the instructions, when executed, cause the computing device to determine the relative angle based on at least one displacement between said first and second reflections.

12. The product of claim 10, wherein the instructions, when executed, cause the computing device to determine one or more estimated optical parameters of said lens based on a comparison between said reference object and at least one object image of said reference object in said at least one image, and to determine the one or more optical parameters of said lens based on said relative angle and the one or more estimated optical parameters of said lens.

* * * * *